United States Patent
Takebe et al.

(10) Patent No.: US 7,943,261 B2
(45) Date of Patent: May 17, 2011

(54) METHOD OF OPERATING FUEL CELL SYSTEM AND FUEL CELL SYSTEM

(75) Inventors: Yasuo Takebe, Uji (JP); Kazuhito Hatoh, Osaka (JP); Hiroki Kusakabe, Sakai (JP); Teruhisa Kanbara, Toyonaka (JP); Makoto Uchida, Hirakata (JP); Shinya Kosako, Kobe (JP); Yoichiro Tsuji, Katano (JP); Yasushi Sugawara, Higashiosaka (JP)

(73) Assignee: Panasonic Corporation, Osaka (JP)

( * ) Notice: Subject to any disclaimer, the term of this patent is extended or adjusted under 35 U.S.C. 154(b) by 831 days.

(21) Appl. No.: 10/696,505

(22) Filed: Oct. 30, 2003

(65) Prior Publication Data

US 2004/0137292 A1   Jul. 15, 2004

(30) Foreign Application Priority Data

Oct. 31, 2002   (JP) ................................ 2002-317794

(51) Int. Cl.
  *H01M 8/04*   (2006.01)
(52) U.S. Cl. ........ 429/429; 429/430; 429/432; 429/444; 429/454
(58) Field of Classification Search .................... 429/13, 429/17, 24, 23
  See application file for complete search history.

(56) References Cited

U.S. PATENT DOCUMENTS

| | | | |
|---|---|---|---|
| 4,963,443 A | 10/1990 | Kamoshita | |
| 5,302,471 A | 4/1994 | Ito et al. | |
| 5,677,073 A | 10/1997 | Kawatsu | |
| 5,763,113 A | 6/1998 | Meltser et al. | |
| 6,068,941 A * | 5/2000 | Fuller et al. | 429/13 |
| 6,068,942 A | 5/2000 | Strasser et al. | |
| 6,399,231 B1 | 6/2002 | Donahue et al. | |
| 6,632,552 B2 | 10/2003 | Yamanashi | |
| 6,635,370 B2 | 10/2003 | Condit et al. | |
| 2001/0001287 A1* | 5/2001 | Ueno et al. | 429/22 |
| 2002/0098393 A1* | 7/2002 | Dine et al. | 429/13 |
| 2003/0211372 A1 | 11/2003 | Adams et al. | |
| 2003/0224228 A1 | 12/2003 | Reiser et al. | |
| 2009/0104482 A1* | 4/2009 | Miyazaki | 429/17 |
| 2009/0104486 A1* | 4/2009 | Kanao | 429/20 |
| 2009/0117421 A1* | 5/2009 | Yoshida et al. | 429/13 |
| 2009/0123796 A1* | 5/2009 | Takahashi et al. | 429/17 |

FOREIGN PATENT DOCUMENTS

| | | |
|---|---|---|
| EP | 1 164 048 A2 | 12/2001 |
| JP | 59-211970 | 11/1984 |
| JP | 63-026962 | 2/1988 |
| JP | 05-258762 | 10/1993 |
| JP | 06-333586 | 12/1994 |

(Continued)

OTHER PUBLICATIONS

Japanese Office Action issued in Japanese Patent Application No. JP 2003-369860 dated Feb. 23, 2009.

(Continued)

*Primary Examiner* — Raymond Alejandro
(74) *Attorney, Agent, or Firm* — McDermott Will & Emery LLP

(57) ABSTRACT

A method of operating a fuel cell capable of suppressing degradation of a fuel cell caused by starting and stopping of the fuel cell, including carrying out a restoring operation by decreasing a voltage of the cathode following termination of the fuel cell.

1 Claim, 28 Drawing Sheets

FOREIGN PATENT DOCUMENTS

| | | |
|---|---|---|
| JP | 2542096 | 7/1996 |
| JP | 08-222259 | 8/1996 |
| JP | 08-293314 * | 11/1996 |
| JP | 09-147895 | 6/1997 |
| JP | 11-67252 * | 3/1999 |
| JP | 11-067254 | 3/1999 |
| JP | 11-154529 | 6/1999 |
| JP | 11-219715 | 8/1999 |
| JP | P2000-260454 A | 9/2000 |
| JP | P2002-93448 A | 3/2002 |
| JP | P3297125 | 4/2002 |
| JP | 2002-208421 A | 7/2002 |
| JP | 2002-208422 | 7/2002 |
| JP | 2003-229156 * | 8/2003 |

OTHER PUBLICATIONS

Japanese Office Action issued in Japanese Patent Application No. 2003-369967, dated Mar. 30, 2010.

Japanese Office Action issued in Japanese Patent Application No. 2003-369967, dated Nov. 16, 2010.

* cited by examiner

FIG. 13A
FIG. 13B
FIG. 13C
FIG. 13D
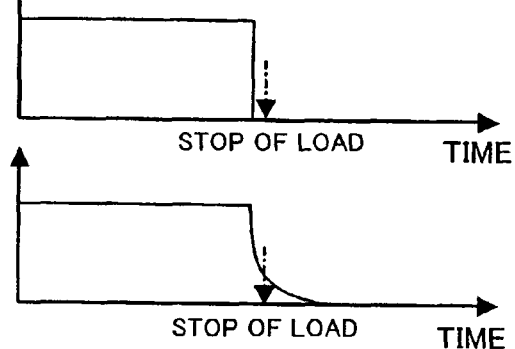
FIG. 13E
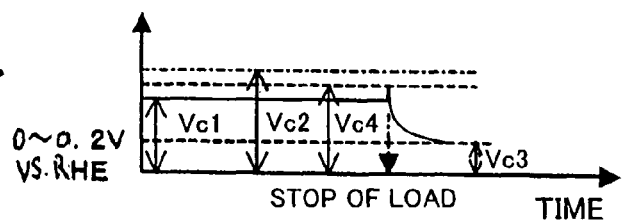
FIG. 13F

METHOD OF OPERATING FUEL CELL SYSTEM AND FUEL CELL SYSTEM

BACKGROUND OF THE INVENTION

1. Field of the Invention

The present invention relates to fuel cells and their operation.

2. Description of the Related Art

A fuel cell generates electric power through reaction of a fuel gas fed to a fuel electrode and an oxygen-containing gas fed to an oxygen electrode. As the fuel gas, hydrogen supplied from a hydrogen cylinder or a reformed gas obtained by reforming a city gas to enrich the hydrogen content are used. As the oxygen-containing gas, air is generally fed with a compressor or a blower. An electrode of a fuel cell is generally made of an electroconductive carbon having a noble metal carried on the surface thereof. In a fuel cell using a polyelectrolyte, a fuel gas containing hydrogen electrochemically reacts with an oxidizing agent gas such as oxygen-containing air, thereby simultaneously generating an electric power and heat.

A catalyst used on the electrode of the fuel cell is gradually oxidized on the surface thereof upon being exposed to an oxidative atmosphere, and adsorbs contaminants in the air and contaminants leaked from the apparatus on the surface of the catalyst. The reaction efficiency of the catalyst is lowered thereby, and thus the generated voltage is lowered with the lapse of time. In order to solve the problem, it has been proposed that in the shutdown period of the fuel cell, an inert gas, such as a nitrogen gas, is charged to prevent oxidation of the electrodes, and the fed gas is fed through a filter to decrease the amount of contaminants in the gas. However, these measures cannot restore the voltage having been once lowered although the lowering of the generated voltage can be suppressed to prolong the service life. Furthermore, a fuel cell has such a nature that the generated voltage thereof is eventually lowered despite of the effect of prolonging the service life.

In the case where the gas is fed through a filter, it is necessary to exchange the filter on a regular schedule to cause such a problem of consuming labor and cost for exchanging the filter. Furthermore, additional energy is necessary in the compressor or the blower corresponding to the pressure loss of the filter.

In the case where the cathode is at a high potential, due to the event that the fuel cell holds a very high voltage exceeding 0.9 V, which is close to the open circuit state, it is already understood that problems such as elution of the Pt catalyst of the cathode and reduction in reaction area of the Pt catalyst due to sintering (enlargement of Pt particles) occur.

Similarly, in the case where the fuel cell holds a very high voltage, which is close to the open circuit state, there occurs a problem that the polyelectrolyte decomposes. It is considered that such problems are caused by the following reasons.

An open circuit voltage of the fuel cell utilizing hydrogen and oxygen as reaction seeds is theoretically considered to be 1.23 V. However, the actual open circuit voltage is a mixed potential of impurities in the respective electrodes, i.e., an anode and a cathode, and adsorption seeds and is from about 0.93 V to 1.1 V. Also, the open circuit voltage is lowered from the theoretical value due to the event that hydrogen and oxygen are slightly diffused in the polyelectrolyte membrane. Assuming that no dissolution of impurities such as radical metal seeds occurs, the potential of the anode is greatly influenced by the adsorption seeds of the cathode and is considered to become a mixed potential of chemical reactions expressed by the following reaction equations 1 to 5 as described in H. Wroblowa, et al., *J. Electroanal. Chem.*, 15, pp. 139-150 (1967), "Adsorption and Kinetics at Platinum Electrodes in the Presence of Oxygen at Zero Net Current". Incidentally, the voltage expressed as corresponding to each of the reaction equations shows the standard electrode potential against a standard hydrogen electrode when the reaction expressed by the subject reaction equation occurs. In the case where the potential of the anode is high in this way, it is considered that hydroxide radical (OH.), super oxide ($O_2^-$.), and hydrogen radical (H.) are generated in high concentrations, whereby these radicals attack a part having high reactivity in the polyelectrolyte to decompose the polyelectrolyte.

| | |
|---|---|
| Reaction equation 1<br>$O_2 + 4H^+ + 4e^- = 2H_2O$ | 1.23 V |
| Reaction equation 2<br>$PtO_2 + 2H^+ + 2e^- = Pt(OH)_2$ | 1.11 V |
| Reaction equation 3<br>$Pt(OH)_2 + 2H^+ + 2e^- = Pt + 2H_2O$ | 0.98 V |
| Reaction equation 4<br>$PtO + 2H^+ + 2e^- = Pt + H_2O$ | 0.88 V |
| Reaction equation 5<br>$O_2 + 2H^+ + 2e^- = H_2O_2$ | 0.68 V |

In order to avoid the foregoing problems caused by the event that the fuel cell becomes in the state of open circuit voltage, there have hitherto been proposed some operation methods of fuel cell system.

For example, there is proposed an operation method of a fuel cell system in which an electric power consumption measure for consuming an electric power is provided within the fuel cell system individually from an external load, and the fuel cell and the electric power consumption measure are connected during a period of time until the fuel cell and the external load are connected after the fuel cell starts power generation, whereby the electric power formed in the fuel cell is consumed by the electric power consumption measure, thereby avoiding that the fuel cell approaches the state of open circuit voltage (for example, see JP-A-5-251101).

Also, there is proposed an operation method of a fuel cell system in which a discharge measure for suppressing an open circuit voltage is provided within the fuel cell system, thereby avoiding the event that the fuel cell becomes in the state of open circuit voltage (for example, see JP-A-8-222258).

According to these operation methods of fuel cell systems, it is possible to avoid the foregoing elution of the Pt catalyst of the cathode and reduction in reaction area of the catalyst due to sintering. Also, it is possible to avoid the event that the polyelectrolyte is decomposed due to the formation of radicals.

However, in the case of the foregoing operation method of a fuel cell system by purging with an inert gas such as nitrogen, there arises a problem that not only a gas cylinder of the inert gas is necessary, leading to enlargement in size of the fuel cell system, but also the maintenance such as exchange of the gas cylinder is expensive, leading to an increase in costs.

Also, in the foregoing operation method of a fuel cell system by purging with water or a moistened inert gas, since the temperature of the fuel cell is lowered at the time of stopping the power generation of the fuel cell, dew condensation occurs inside the fuel cell, and the volume is reduced. Accordingly, since the inside of the fuel cell becomes in the state of negative pressure, there arises problems that oxygen enters from the outside and that the polyelectrolyte membrane breaks, leading to potential occurrence of a short circuit of the electrodes.

Also, in the case where the cell is subjected to power generation in the state of stopping feeding of the oxidizing agent gas to consume oxygen of the cathode, and the anode is then purged with an inert gas, there is a problem in that since the Pt catalyst of the cathode is oxidized with oxygen remaining without being consumed and air incorporated due to diffusion and leakage, the cathode is degraded. Moreover, there arises a problem that since oxygen is forcedly consumed by power generation, the potential of the cathode is not uniform, and the activation state of the cathode varies every time when the power generation of the fuel cell is stopped, leading to scattering of the cell voltage at the time of start.

In addition, in the case of the foregoing operation method of a fuel cell system by avoiding the matter that the fuel cell becomes in the state of open circuit voltage, the fuel cell is always in the state of power generation. However, in the case of a fuel cell system for household use using a raw material gas such as town gas containing methane as the major component, in order to suppress the heating and lighting expenses, it is desired to control the motions of the fuel cell so as to stop the power generation in a time period where the electric consumption is small and carry out the power generation in a time period where the electric consumption is large. For example, according to the DSS (Daily Start-up & Shut-down) wherein the power generation is carried out in the daytime and is stopped in the middle of the night, it is possible to avoid an increase in the heating and lighting expenses. Therefore, it is desired to control the fuel cell so as to repeat the power generation state and the non-power generation state, and an operation method of a fuel cell system capable of avoiding the matter that the fuel cell approaches open circuit voltage even when repeat the power generation state and the non-power generation state, is desirable.

All references, patents and priority documents, particularly Japanese Patent Application 2002-317794 filed Oct. 31, 2002, referred to herein, are hereby incorporated by reference for the entirety of their disclosure for all purposes.

SUMMARY OF THE INVENTION

The invention solves the aforementioned problems associated with the prior art, and an object thereof is to provide a method for operating a fuel cell for maintaining a high generated voltage for a long period of time by carrying out a restoring operation for restoring the generated voltage upon decreasing the generated voltage of the fuel cell.

One aspect of the invention relates to a method for operating a fuel cell comprising an electrolyte, an anode and a cathode sandwiching the electrolyte, and one pair of separator plates each having a gas flow path for feeding and discharging a fuel gas to the anode and for feeding and discharging an oxygen-containing gas to the cathode, the method comprising a step of carrying out a restoring operation by decreasing a voltage of the cathode, upon decreasing a voltage of the fuel cell to a threshold voltage or lower, or upon lapsing a prescribed period of time from a preceding restoring operation.

Another aspect of the invention relates to a method for operating a fuel cell comprising a plurality of cells each containing an electrolyte, an anode and a cathode sandwiching the electrolyte, and one pair of separator plates each having a gas flow path for feeding and discharging a fuel gas to the anode and for feeding and discharging an oxygen-containing gas to the cathode, the method comprising steps of carrying out a restoring operation by decreasing a voltage of the cathode of at least one of the plurality of cells, and after restoring a voltage of the cells, sequentially carrying out a restoring operation for the remaining cells.

Another aspect of the invention relates to a fuel cell system comprising a stack of cells each containing an electrolyte, an anode and a cathode sandwiching the electrolyte, and one pair of separator plates each having a gas flow path for feeding and discharging a fuel gas to the anode and for feeding and discharging an oxygen-containing gas to the cathode, the fuel cell system further comprising a voltage detecting device for detecting a voltage of the cells or the stack, and a controlling device for controlling the feed of the oxygen-containing gas to the cells or the stack based on the voltage detected by the voltage detecting device.

Another aspect of the invention relates to a fuel cell system comprising a stack of cells each containing an electrolyte, an anode and a cathode sandwiching the electrolyte, and one pair of separator plates each having a gas flow path for feeding and discharging a fuel gas to the anode and for feeding and discharging an oxygen-containing gas to the cathode, the fuel cell system further comprising a voltage detecting device for detecting a voltage of the cells or the stack, a feeding means for feeding water to the cells or the stack, and a controlling device for controlling the feeding means based on the voltage detected by the voltage detecting device.

Another aspect of the invention relates to a fuel cell system comprising a stack of cells each containing an electrolyte, one pair of electrodes sandwiching the electrolyte, and one pair of separator plates each having a gas flow path for feeding and discharging a fuel gas to the anode and for feeding and discharging an oxygen-containing gas to the cathode, the fuel cell system further comprising a voltage detecting device for detecting a voltage of the cells or the stack, a feeding means for feeding an inert gas, a hydrocarbon gas or a reducing agent to the cells or the stack instead of the oxygen-containing gas, and a controlling device for controlling the feeding means based on the voltage detected by the voltage detecting device.

Another aspect of the invention relates to a fuel cell system comprising a stack of cells each containing an electrolyte, an anode and a cathode sandwiching the electrolyte, and one pair of separator plates each having a gas flow path for feeding and discharging a fuel gas to the anode and for feeding and discharging an oxygen-containing gas to the cathode, the fuel cell system further comprising a voltage detecting device for detecting a voltage of the cells or the stack, an electric current adjusting device for increasing and decreasing an electric current applied to the cells or the stack, and a controlling device for controlling the electric current adjusting device based on the voltage detected by the voltage detecting device.

Another aspect of the invention relates to a method of operating a fuel cell system which is provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively, and which switches connection and disconnection between the fuel cell and a load, wherein; feeding of the oxidizing agent gas into the cathode and feeding of the fuel gas into the anode are continued until a prescribed period of time elapses after disconnection between the fuel cell and the load, and thereafter, feeding of each of the oxidizing agent gas and the fuel gas is stopped, thereby controlling the operation such that the time when the cell of the fuel cell has a voltage of about 0.9 V or more is less than about 10 minutes after either gas is stopped.

Another aspect of the invention relates to a method of operating a fuel cell system which is provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively and which switches connection and disconnection between the fuel cell and a load, wherein; before disconnection between the fuel cell and the load, at least one of feeding of the oxidizing agent gas into the cathode and feeding of the fuel gas into the anode is stopped, and thereafter, disconnection between the fuel cell and the load is carried out.

Another aspect of the invention relates to a fuel cell system which is provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively and a control unit of controlling switch of connection and disconnection between the fuel cell and a load, wherein; the control unit is constructed such that feeding of the oxidizing agent gas into the cathode and feeding of the fuel gas into the anode are continued until a prescribed period of time elapses after disconnection between the fuel cell and the load, and thereafter, feeding of each of the oxidizing agent gas and the fuel gas is stopped, thereby controlling the time when the cell of the fuel cell has a voltage of about 0.9 V or more to fall within about 10 minutes after either gas is stopped.

Another aspect of the invention relates to a fuel cell system which is provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively and a control unit of controlling switch of connection and disconnection between the fuel cell and a load, wherein the control unit is constructed such that before disconnection between the fuel cell and the load, at least one of feeding of the oxidizing agent gas into the cathode and feeding of the fuel gas into the anode is stopped, and thereafter, disconnection between the fuel cell and the load is carried out.

Another aspect of the invention relates to a method of operating a fuel cell system provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively, wherein; when the fuel cell stops power generation, the cathode is controlled so as to have a voltage with respect to a standard hydrogen electrode within the range of from about 0.6 V to about 0.8 V.

Another aspect of the invention relates to a fuel cell system provided with a fuel cell having at least one cell provided with an electrolyte, an anode and a cathode each having a platinum based metallic catalyst, the electrolyte being put between the anode and the cathode, and a pair of separator plates having gas passages for feeding a fuel gas into the anode and feeding an oxidizing agent gas into the cathode, respectively and a control unit for controlling feeding of the fuel gas into the anode and feeding of the oxidizing agent gas into the cathode, wherein an external electric source of applying a prescribed voltage between the anode and the cathode is provided; and the control unit is constructed such that when the fuel cell stops power generation, in the state of exposing the anode to the fuel gas, feeding of the oxidizing agent gas into the cathode is stopped, and the external electric source are controlled so as to apply a prescribed voltage between the anode and the cathode, thereby controlling the cathode so as to have a voltage against a standard hydrogen electrode within the range of from about 0.6 V to about 0.8 V.

One aspect of the present invention relates to a fuel cell system comprising at least one anode comprising a gas diffusion layer and a catalyst, the anode connected to a fuel gas control unit controlling a flow of an fuel gas; at least one cathode comprising a gas diffusion layer and a catalyst, the cathode connected to an oxidizing gas control unit controlling a flow of an oxidizing gas; an electrolyte membrane disposed between the anode and the cathode; a load; at least one cell voltage detection unit; at least one external electric source capable applying a current to control the voltage of the cathode; and a control unit receiving information from and/or capable of controlling the fuel gas control unit, oxidizing gas control unit, cell voltage detection unit, load and the external electric source.

Another aspect of the invention relates to a method of operating a fuel cell system comprising at least one anode and cathode pair, comprising; starting fuel cell power generation; and stopping fuel cell power generation, by stopping flow of an oxidizing gas; maintaining flow of a fuel gas to avoid degradation of the anode; applying current from an external voltage source to maintain a voltage between the anode and/or the cathode of about 0.6V to about 0.8V; and decreasing flow of a fuel gas.

Another aspect of the invention relates to a method of operating a fuel cell system comprising at least one anode and cathode pair, comprising; starting fuel cell power generation; stopping fuel cell power generation by stopping the flow of a fuel gas or an oxidizing gas to the cell, while applying a current from an external voltage source such that the voltage between the anode and cathode does not decrease to more than a threshold level and decreasing a flow of a fuel gas.

Another aspect of the invention relates to a fuel cell system comprising at least one anode comprising a gas diffusion layer and a catalyst, the anode connected to a fuel gas control unit controlling a flow of a fuel gas; at least one cathode comprising a gas diffusion layer and a catalyst, the cathode connected to an oxidizing gas control unit controlling a flow of an oxidizing gas; an electrolyte membrane disposed between the anode and the cathode; a load; at least one cell voltage detection unit; a purging gas control unit controlling a flow of a purging gas to purge the anode; and a control unit receiving information from and/or capable of controlling the fuel gas control unit, oxidizing gas control unit, cell voltage detection unit, load, and the purging gas control unit.

Another aspect of the invention relates to a method of operating a fuel cell system comprising at least one anode and cathode pair comprising; starting fuel cell power generation; disconnection of a load; stopping fuel cell power generation, by; stopping a flow of an oxidizing gas and a flow of a fuel gas after a prescribed period of time following the disconnection of the load; and purging the anode with a flow of a purging gas after the prescribed period of time has elapsed.

Another aspect of the invention relates to a method of operating a fuel cell system comprising at least one anode and cathode pair comprising starting fuel cell power generation; disconnection of a load; stopping fuel cell power generation, by; gradually reducing a flow of an oxidizing gas after a prescribed period of time following the disconnection of the load, until the flow of the oxidizing gas has stopped; gradually reducing a flow of a fuel gas after the stopping the flow of oxidizing gas; and purging the anode with a flow of a purging gas after the flow of the fuel gas has stopped.

Another aspect of the invention relates to a method of operating a fuel cell system comprising at least one anode and cathode pair comprising starting fuel cell power generation; disconnection of a load; stopping fuel cell power generation, by; gradually reducing a flow of a fuel gas after a prescribed period of time following the disconnection of the load, until the flow of the fuel gas has stopped; gradually reducing a flow of a oxidizing gas after the stopping the flow of fuel gas; and purging the anode with a flow of a purging gas after the flow of the fuel gas has stopped.

Another aspect of the invention relates to a method of operating a fuel cell system comprising at least one anode and cathode pair comprising starting fuel cell power generation; stopping fuel cell power generation, by decreasing flow of an oxidizing gas and decreasing flow of an fuel gas a prescribed period of time before disconnection of a load; purging the anode with a flow of a purging gas after the flow of the fuel gas has stopped.

Another aspect of the invention relates to a method of operating a fuel cell system comprising at least one anode and cathode pair comprising starting fuel cell power generation; stopping fuel cell power generation, by; decreasing flow of an oxidizing gas a prescribed period of time before disconnection of a load; disconnecting the load; decreasing a flow of a fuel gas; and purging the anode with a flow of a purging gas after the flow of the fuel gas has stopped.

Another aspect of the invention relates to a method of operating a fuel cell system comprising at least one anode and cathode pair comprising starting fuel cell power generation; stopping fuel cell power generation, by; continuing a flow of an oxidizing gas for a prescribed first period of time following a disconnection of a load; then decreasing the flow of the oxidizing gas; decreasing a flow of a fuel gas a second prescribed period of time prior to the disconnection of the load; and purging the anode with a flow of purging gas after the flow of the fuel gas has stopped.

Another aspect of the invention relates to a method of operating a fuel cell system comprising at least one anode and cathode pair comprising starting fuel cell power generation; stopping fuel cell power generation, by continuing a flow of an oxidizing gas for a prescribed first period of time following a disconnection of a load; then decreasing the flow of the oxidizing gas; decreasing a flow of a fuel gas a second prescribed period of time prior to the disconnection of the load; and purging the anode with a flow of purging gas after the flow of the fuel gas has stopped.

Another aspect of the invention relates to a method of operating a fuel cell system comprising at least one anode and cathode pair; starting fuel cell power generation; stopping fuel cell power generation by; disconnecting a load; decreasing a flow of an oxidizing gas; applying a current from an external voltage source to maintain a voltage between the anode and the cathode; increasing the fuel cell temperature; and restarting fuel cell power generation by increasing a flow of an oxidizing gas and removing the current.

Another aspect of the invention relates to a fuel cell system comprising at least one anode comprising a gas diffusion layer and a catalyst, the anode connected to a fuel gas control unit controlling a flow of a fuel gas; at least one cathode comprising a gas diffusion layer and a catalyst, the cathode connected to an oxidizing gas control unit controlling a flow of an oxidizing gas; an electrolyte membrane disposed between the anode and the cathode; a load; at least one cell voltage detection unit; at least one temperature sensing unit; at least one external electric source capable applying a current to control the voltage of the cathode; and a control unit receiving information from and/or capable of controlling the fuel gas control unit, oxidizing gas control unit, cell voltage detection unit, temperature sensing unit, load and the external electric source.

Another aspect of the invention relates to a method of operating a fuel cell system comprising at least one anode and cathode pair comprising starting fuel cell power generation; stopping fuel cell power generation, by decreasing a flow of an oxidizing gas; applying an external current from an external electric source capable control the voltage of the cathode; determining a temperature of the pair; and decreasing a flow of a fuel gas and purging the pair with air if the temperature of the pair is falls below a threshold temperature.

Another aspect of the invention relates to a method of operating a fuel cell system comprising at least one anode and cathode pair comprising starting fuel cell power generation; disconnecting a load; stopping fuel cell power generation, by decreasing a flow of an oxidizing gas; applying an external current from an external electric source capable control the voltage of the cathode; determining a temperature of the pair; and decreasing a flow of a fuel gas and purging the pair with air if the temperature of the pair is falls below a threshold temperature; increasing flow of oxidizing gas and the flow of fuel gas; and starting fuel cell power generation.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. The present invention may be practiced without some or all of these specific details. In other instances, well known process operations have not been described in detail, in order not to unnecessarily obscure the present invention. Accordingly, the drawings and description are to be regarded as illustrative in nature, and not as restrictive.

BRIEF DESCRIPTION OF THE DRAWINGS

FIGS. 13A-F are timing charts illustrating the operations of a fuel cell system according to Embodiment 5 of the invention in the case where a fuel cell stack stops power generation.

DETAILED DESCRIPTION OF THE INVENTION

Figure 1:
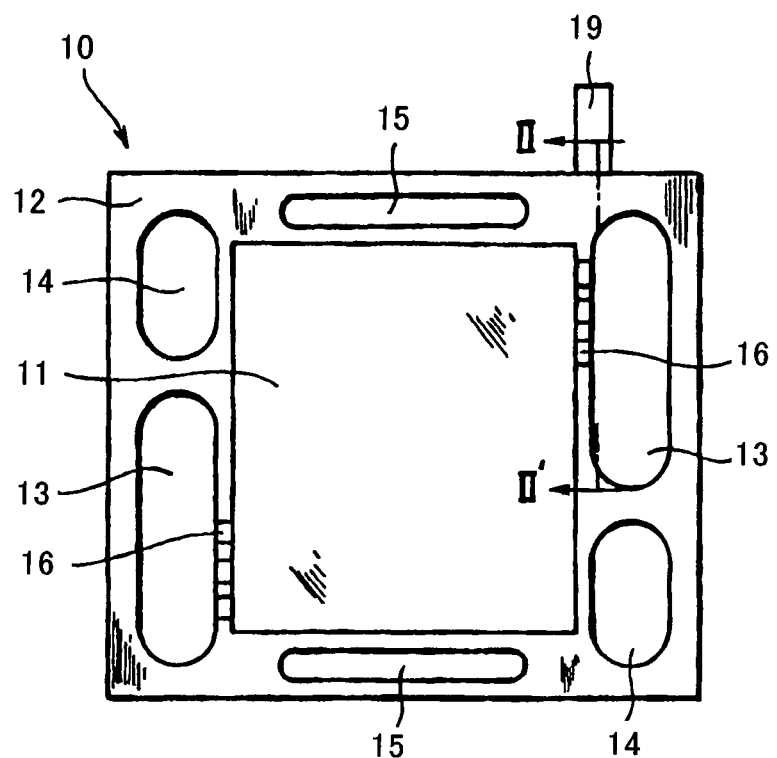
FIG. 1 is an elevational view showing an embodiment of the invention, where a part of a stack is removed.

A fuel cell is constituted essentially with an electrolyte membrane and electrode disposed on both side thereof. The electrode for a fuel cell is constituted with a gas diffusion layer for feeding a reaction gas and a catalyst layer for actually effecting a chemical reaction. A noble metal catalyst carried on carbon is used as the catalyst layer.

A fuel cell generates electric power by reacting a fuel gas fed to a fuel electrode and an oxygen-containing gas fed to an oxygen electrode. As the oxygen-containing gas, air is generally fed with a compressor or a blower. However, air contains a nitrogen oxide and a sulfur oxide, which deteriorate the electric power generation reaction. Furthermore, members constituting the apparatus leak organic substances, such as a solvent.

These contaminants are gradually accumulated on the surface of the catalyst during the operation of the fuel cell and, as a result deteriorate the generated voltage. Most parts of the contaminants can be decomposed or removed by changing the electric potential on the surface of the catalyst. The accumulation of contaminants may occur on both the fuel electrode and the oxygen electrode, but the electric potential of the fuel electrode receives less influence of the accumulation of contaminants due to the small overvoltage thereof. Therefore, the deterioration of the generated voltage occurring on the operation of the fuel cell is mainly ascribed to the accumulation of contaminants on the oxygen electrode. Preferably, a noble metal, such as platinum, is used as the catalyst. Pt is generally hard to be oxidized, but because a fuel cell using a polymer electrolyte is in a strongly acidic atmosphere, the surface of the catalyst is oxidized in the case where the electric potential of the oxygen electrode is high in the fuel cell. The surface of platinum is oxidized in the case where the electric potential of the fuel electrode is 0.7 V or more with respect to the standard hydrogen electrode in a pH range of from 1 to 2. When the surface of the catalyst is oxidized, the rate of the redox reaction of oxygen is decreased, and thus the generated voltage is lowered. Furthermore, since the oxide has a large adsorption power to the contaminants, it promotes the accumulation of contaminants to accelerate lowering of the generated voltage.

In order to remove the accumulation of contaminants and the oxidation on the surface of the catalyst to restore the generated voltage, it is effective to carry out the restoring operation for lowering the electric potential of the oxygen electrode.

The term "voltage" as used herein and as commonly used in the art refers to the difference in electrical charge between two points in a circuit expressed in volts or the rate at which energy is drawn from a source that produces a flow of electricity in a circuit; expressed in volts. The terms electric potential, electromotive force, emf, potential, potential difference, potential drop are all used interchangeably herein.

An embodiment of the constitution of a fuel cell enabling the restoring operation according to the invention is described with reference to FIGS. 1 and 2.

A fuel cell 10 is constituted by alternately accumulating an MEA 11 and a separator plate 12. The MEA 11 is constituted with a polymer electrolyte membrane, a fuel electrode and an oxygen electrode sandwiching the electrolyte membrane, and a gasket sandwiching the electrolyte membrane at peripheries of the electrodes. The MEA 11 and the separator plate 12 each is provided with manifold holes 13 for an oxygen-containing gas, manifold holes 14 for a fuel gas and manifold holes 15 for cooling water. FIG. 1 shows only an electrode part of the MEA 11, and it is understood therefrom that air as the oxygen-containing gas fed from one of the manifold holes 13 of the separator plate 12 is fed to the oxygen electrode of the MEA through a gas flow path 16 and discharged to the outside through the other of the manifold holes 13. A gas blocking means for closing an inlet of the gas flow path 16 is provided on the manifold hole 13 on the inlet side of the oxygen-containing gas as shown in FIG. 2. The gas blocking means is constituted with two screws 17, a plug body 18 screwed in the screws, and a means (not shown in the figure) for rotating the screws, and closes the inlet of the gas flow path 16 by sliding the plug body backward and forward in the manifold hole upon rotating the screws 17. The plug bodies are sequentially moved to enable the restoring operation for the respective cells by ones.

A fuel cell system that is suitable for carrying out the restoring operation will be described.

In a preferred embodiment, as described in the foregoing, the fuel cell system comprising a stack of cells has a voltage detecting means for detecting a voltage of the cells or the stack, and a controlling means for controlling the feed of the oxygen-containing gas to the cells or the stack based on the voltage detected by the voltage detecting means.

In another preferred embodiment, the fuel cell system has a voltage detecting means for detecting a voltage of the cells or the stack, a feeding means for feeding an inert gas, a hydrocarbon gas, a reducing agent or water instead of the oxygen-containing gas to the cells or the stack, and a controlling means for controlling the feeding means based on the voltage detected by the voltage detecting means.

In still another preferred embodiment, the fuel cell system has a voltage detecting means for detecting a voltage of the cells or the stack, an electric current adjusting means for increasing and decreasing an electric current applied to the cells or the stack, and a controlling means for controlling the electric current adjusting means based on the voltage detected by the voltage detecting means.

Figure 3:
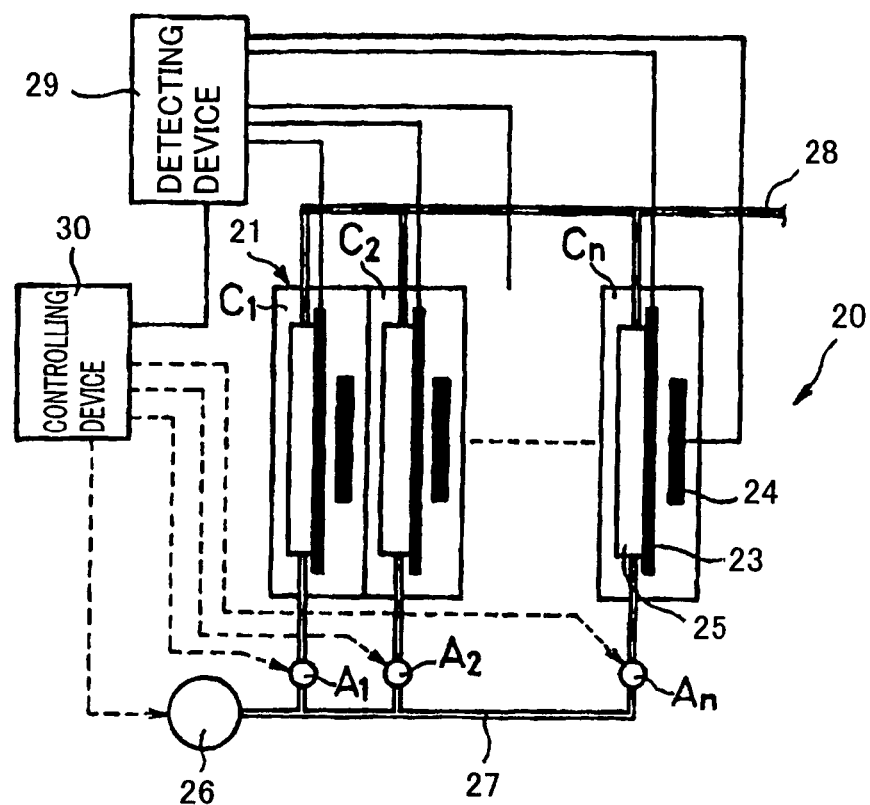
FIG. 3 is a diagram showing a schematic constitution of a fuel cell system of another embodiment of the invention.

FIG. 3 shows a schematic constitution of a fuel cell system having a controlling means for controlling the feed of the oxygen-containing gas to the cells or the stack. The fuel cell system 20 has a stack 21 formed by accumulating cells $C_1$, $C_2$, . . . and $C_n$, a detecting device 29 connected to oxygen electrodes 23 of the respective electrodes and a fuel electrode 24 of the terminatory cell with lead wires for detecting voltages of the respective cells and the stack, and a controlling device 30 operated based on signals from the detecting device. Inlet ends of gas flow paths 25 for feeding the oxygen-containing gas to the oxygen electrodes 23 of the respective cells are connected to an inlet manifold 27 through switching valves $A_1$, $A_2$, . . . and $A_n$, and outlet ends thereof are connected to an outlet manifold 28. A blower 26 feeds the oxygen-containing gas to the manifold 27. In the case where the detecting device 29 detects that the voltage of one or plural cells is lowered to the threshold value or lower, the controlling device 30 controls the switching valve on the oxygen-containing gas feeding path to the one or plural cells to decrease the feeding amount of the oxygen-containing gas to the oxygen electrode, so as to begin the restoring operation. After restoring the voltage of the cell to the prescribed value, it is detected by the detecting device 29, and the switching valve is restored to the former state. The fuel gas feeding path and the load are omitted in FIG. 3.

While the controlling device in this embodiment controls a resistance value of a resistor, it is possible that a relay or a transistor is used instead of the resistor, and the voltage of the cell to be restored is forcedly lowered.

Figure 4:
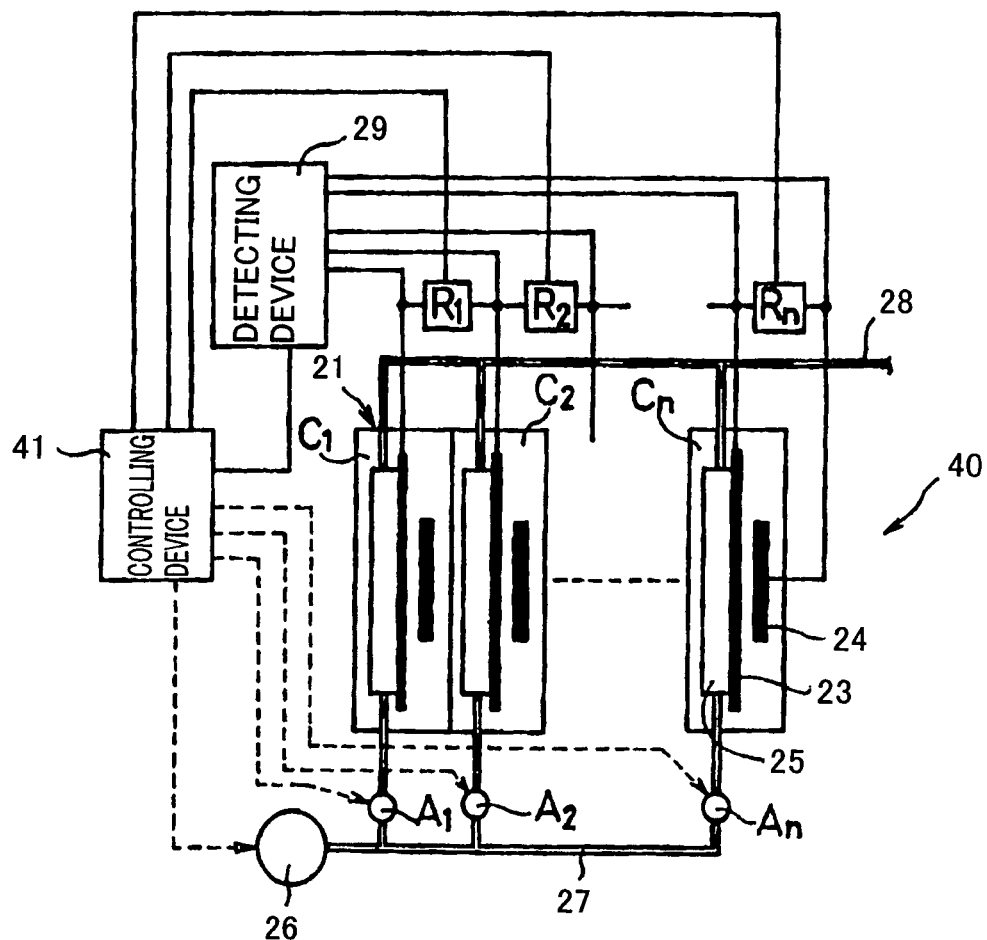
FIG. 4 is a diagram showing a schematic constitution of a fuel cell system of still another embodiment of the invention.

FIG. 4 shows a fuel cell system 40 according to another embodiment, which has the same constitution as in the system shown in FIG. 3 except that a controlling device 41 controls resistance values of resistors $R_1$, $R_2$, . . . and $R_n$ connected among the respective cells. In the fuel cell system of this embodiment, the cell voltage of the cell to be restored, e.g., $C_1$ herein, is forcedly lowered by shorting out the corresponding resistor $R_1$ by the signal from the detecting device 29, whereby the electric potential of the oxygen electrode of the cell $C_1$ is lowered to attain the restoring operation. Accordingly, the restoring operation can be attained sequentially for the respective cells $R_2$, $R_3$, . . . and $R_n$.

In a fuel cell using a polymer electrolyte, the cell voltage upon normal operation under no load is about 0.95 V, and the cell voltage upon operation with a load is lowered to 0.8 to 0.6 V. The electric potential of the fuel electrode is substantially equal to the electric potential of the standard hydrogen electrode in the case where a hydrogen-containing gas is used as the fuel gas. Furthermore, the electric potential of the oxygen electrode (with respect to the fuel electrode) is substantially equal to the cell voltage owing to the low overvoltage of the fuel electrode. Accordingly, the electric potential of the oxygen electrode can be comprehended by detecting the cell voltage to find completion of the restoring operation. The threshold value of the cell voltage, which is an indication for carrying out the restoring operation of the invention, is preferably 95% of the aforementioned initial voltage. In the case where the threshold value is too high, it is complicated since the restoring operation should be frequently carried out. In the case where the threshold value is too low, on the other hand, there is such a possibility that the electric generation efficiency is lowered, and sufficient restoration cannot be attained.

The electric potential where the restoring operation is carried out may be less than 0.7 V (with respect to the fuel electrode) in the case where restoration is attained by reducing the oxidized and deteriorated catalyst. In particular, it is also effective that the fuel cell is electrically shorted out for several tens seconds. In the case where deterioration due to adsorbed contaminants is restored by reduction and desorption, it is preferably 0.4 V or less (with respect to the fuel electrode). Both the deterioration due to oxidation of the catalyst and the deterioration due to adsorption of contaminants can be resolved by setting the restoring electric potential at 0.4 V (with respect to the fuel electrode).

Figure 5:
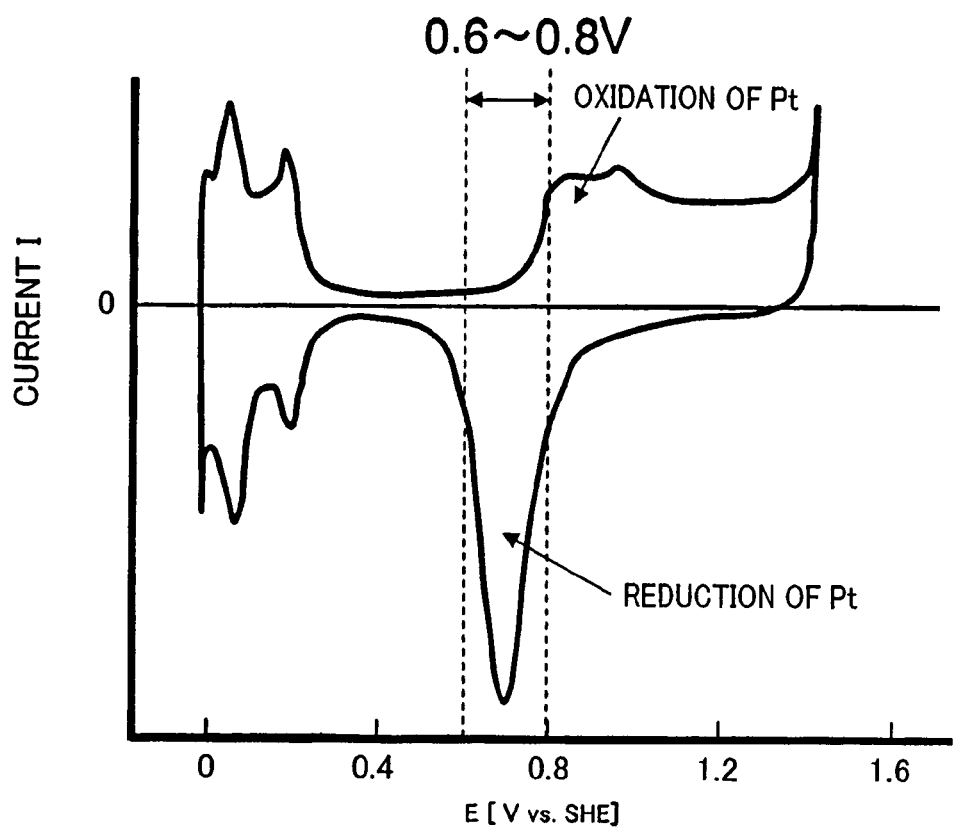
FIG. 5 is a cyclic voltammogram of Pt.

FIG. 5 is a cyclic voltammogram of Pt. In FIG. 5, the ordinate stands for a current value, and the abscissa stands for a potential against a standard hydrogen electrode (SHE), respectively. As shown in FIG. 5, oxidation of PT starts at a potential in the vicinity of 0.7 V against SHE and reaches a peak at a potential in the vicinity of 0.8 V. Here, if the potential is further increased, then the oxidation of Pt also proceeds from divalent to tetravalent with the progress of the oxidation of Pt.

On the other hand, reduction of oxidized Pt on the cathode reaches a peak at a potential in the vicinity of 0.7 V against SHE and similarly proceeds up to a potential in the vicinity of 0.5 V against SHE.

In the case of the usual stationary type, the operation voltage of the fuel cell is in the vicinity of 0.7 to 0.75 V. Here, in the case where the fuel cell carries out power generation, the potential of the anode is closed to that of SHE, and hence, the potential of the cathode is approximately equal to the operation voltage of the fuel cell. Accordingly, as is also clear by referring to the cyclic voltammogram of FIG. 5, when the fuel cell carries out power generation, it is considered that the surface of Pt of the cathode is in the oxidized state.

Whe the current is stopped while feeding a fuel gas and an oxidizing agent gas into the fuel cell, the potential of the cathode rises to about 1 V, and oxidation proceeds inside Pt, whereby the catalytic activity is lowered. On the other hand, for the sake of recovering the activity of the oxidized Pt catalyst, when the potential of the cathode is held at a low potential, the surface of Pt is reduced, whereby the catalytic activity is recovered.

However, as described previously, when oxidation and reduction are repeated on the surface of Pt, fluctuation occurs on the surface of Pt, and expansion and contraction of the surface, rearrangement of atoms, and the like occur. As a result, the catalytic activity is gradually lowered.

Accordingly, even in the case where the fuel cell repeats the power generation state and the non-power generation state, it is necessary to prevent repetition of oxidation and reduction on the surface of Pt of the cathode.

The restoring operation may be carried out simultaneously to all the cells constituting a stack, or in alternative, it may be carried out for the respective cells one-by-one or for a part of the cells, and then sequentially carried out for other cells. In the case where the restoring operation is carried out simultaneously for all the cells, detection of the voltage of the entire stack can be substituted for the detection of the cell voltage. In the case where the restoring operation is carried out for the respective cells one-by-one, such an advantage can be obtained that the restoring operation can be carried out more certainly, although a complicated constitution of the stack is required for detecting the voltages of the respective cells.

Examples of the restoring operation include the following methods. (1) Electric power generation is carried out under such a state that the feeding amount of oxygen is lowered to consume oxygen, (2) a hydrocarbon gas, an inert gas or water is fed for replacing oxygen, (3) a reducing agent is fed, and (4) the load of the fuel cell is increased. These methods will be described in more detail below.

In a preferred embodiment of the invention, the restoring operation contains such an operation that electric power generation is continued while the feeding amount of the oxygen-containing gas on the oxygen electrode is decreased, and after lowering the cell voltage to the restoring voltage of the oxygen electrode (with respect to the fuel electrode), the feeding amount of the oxygen-containing gas is then increased.

In another preferred embodiment, the restoring operation contains such an operation that the electric power generation is continued while the feed of the oxygen-containing gas is terminated, and after lowering the cell voltage to the restoring voltage of the oxygen electrode (with respect to the fuel electrode), feed of the oxygen-containing gas is restarted.

In still another preferred embodiment, the restoring operation contains such an operation that an inert gas or a hydrocarbon gas is fed to the oxygen electrode, and after lowering the cell voltage to the restoring voltage of the oxygen electrode (with respect to the fuel electrode), feed of the oxygen-containing gas is restarted.

In a further preferred embodiment, the restoring operation contains such an operation that water is fed to the oxygen electrode, and after lowering the cell voltage to the restoring voltage of the oxygen electrode (with respect to the fuel electrode), feed of water is terminated. During the restoring operation of this method, feed of the oxygen-containing gas may be continued.

In a still further preferred embodiment, the restoring operation contains such an operation that an inert gas, a hydrocarbon gas or a reducing agent is fed to the oxygen electrode instead of the oxygen-containing gas, i.e., feed of the oxygen-containing gas is terminated, and after lowering the cell voltage to the restoring voltage of the oxygen electrode (with respect to the fuel electrode), feed of the oxygen-containing gas is restarted.

In a still further preferred embodiment, the restoring operation contains such an operation that the load of the fuel cell is increased, and after lowering the cell voltage to the restoring voltage of the oxygen electrode (with respect to the fuel electrode), the load is decreased.

In the method of the restoring operation by decreasing the feeding amount of oxygen, oxygen deficit occurs in a logical sense in the case where the utilization ratio of oxygen, i.e., four times the number of electrons flowing in the cell per the number of oxygen molecules fed to the cell, exceeds 100%, whereby the potential of the oxygen electrode is lowered. However, in an actual situation, even in the case where the utilization ratio is less than 100%, the potential of the oxygen electrode is lowered due to nonuniformity of gas feed and inhibition of gas diffusion to enable the restoring operation. The utilization ratio enabling the restoring operation is typically 70% or more while it varies depending on the constitution of the gas flow path and the constitution of the gas diffusion layer. The utilization ratio can be increased by decreasing the feeding amount of oxygen, and the same effect can be obtained by increasing the load to increase the electric current flowing in the cell. In the case where the utilization ratio of oxygen is increased by increasing the electric current, the feeding amount of hydrogen should be increased in an amount corresponding to the electric current, so as to prevent the utilization ratio of hydrogen from being increased.

In the method of the restoring operation by feeding a hydrocarbon gas, an inert gas or water for replacing oxygen, the oxygen partial pressure is decreased to lower the electric potential of the oxygen electrode.

Examples of the hydrocarbon gas include a city gas desulfurized with a desulfurizer, a propane gas and a butane gas.

Examples of the inert gas include nitrogen, argon and carbon dioxide.

Water used herein may be in a vapor state or in a liquid state.

In the method of the restoring operation by feeding a reducing agent, the oxygen partial pressure is lowered by reacting oxygen with the reducing agent to lower the electric potential of the oxygen electrode. Furthermore, the deteriorated catalyst is reduced with the reducing agent to decompose contaminants. Examples of the reducing agent include a hydrogen gas, a sodium borohydride aqueous solution and hydrazine.

In the method of the restoring operation by increasing the load of the fuel cell, the electric current flowing in the cell is temporarily increased to lower the cell voltage, whereby lowering the electric potential of the oxygen electrode. In a typical situation, while depending on the constitution of the cell and the constitution of the electrode, when the electric current is increased to 0.4 A per 1 $cm^2$ of the electrode area, the cell voltage becomes 0.7 V or less to enable the restoring operation.

The restoring operation having been described in the foregoing is carried out in such a state that a load is applied to the cell. However, although the efficiency is reduced, such an operation can also be employed that an inert gas, a hydrocarbon gas, water or a reducing agent is fed to the oxygen electrode in a state where the electric power generation is terminated, i.e., the load is detached, to effect the restoring operation of lowering the electric potential of the oxygen electrode, and then the operation of the fuel cell is terminated.

The method of operating the fuel cell having at least one cell provided with an electrolyte, an anode and a cathode each having a platinum based metallic catalyst, the electrolyte being placed between the anode and the cathode, and a pair of separator plates having formed thereon gas passages for feeding a fuel gas into the anode and feeding an oxidizing agent gas into the cathode, respectively, wherein when the fuel cell stops power generation, the cathode is controlled so as to have a potential against a standard hydrogen electrode within the range of 0.6 V to 0.8 V.

In this way, even when the fuel cell repeats the power generation state and the non-power generation state, it is possible to avoid repetition of oxidation and reduction of Pt of the cathode, whereby degradation of the fuel cell can be prevented.

In the fuel cell operation method it is preferable that the state of exposing the anode to the fuel gas, feeding of the oxidizing agent gas into the cathode is stopped, and a prescribed voltage is applied between the anode and the cathode using an external electric source, thereby controlling the cathode so as to have a potential against a standard hydrogen electrode within the range of from 0.6 V to 0.8 V.

By utilizing the external electric source in the state of exposing the anode to the fuel gas, it is possible to easily control the potential of the cathode.

Also, in the operation method of a fuel cell system according to the foregoing invention, it is preferable that the fuel cell is a fuel cell stack comprising a laminate of plural cells, and in the state of exposing the anode of each cell to the fuel gas, feeding of the oxidizing agent gas into the cathode of each cell is stopped, and a prescribed voltage is applied between the anode and the cathode of each cell using an external electric source, thereby controlling the cathode of each cell so as to have a potential against a standard hydrogen electrode within the range of from 0.6 V to 0.8 V.

Also, in the operation method of a fuel cell system according to the foregoing invention, it is preferable that after stopping the power generation of the fuel cell until the cell temperature of the fuel cell drops to below about 50° C., the cathode is controlled so as to have a potential against a standard hydrogen electrode within the range of from 0.6 V to 0.8 V.

Also, in the operation method of a fuel cell system according to the foregoing invention, it is preferable that in the case where the fuel cell stops the power generation, when the cell temperature of the fuel cell drops to below about 50° C., the cathode and the anode are purged with air.

Also, in the operation method of a fuel cell system according to the foregoing invention, it is preferable that the purge is carried out using dry air.

Also, the fuel cell system of the invention is preferably a fuel cell system provided with a fuel cell having at least one cell provided with an electrolyte, an anode and a cathode each having a platinum based metallic catalyst, the electrolyte being put between the anode and the cathode, and a pair of separator plates having formed thereon gas passages for feeding a fuel gas into the anode and feeding an oxidizing agent gas into the cathode, respectively, and a control unit for controlling feeding of the fuel gas into the anode and feeding of the oxidizing agent gas into the cathode, wherein an external electric source of applying a prescribed voltage between the anode and the cathode is provided, and the control unit is constructed such that in the case where the fuel cell stops power generation, in the state of exposing the anode to the fuel gas, feeding of the oxidizing agent gas into the cathode is stopped, and the motions of the external electric source are controlled so as to apply a prescribed voltage between the anode and the cathode, thereby controlling the cathode so as to have a potential against a standard hydrogen electrode within the range of from 0.6 V to 0.8 V.

Also, in the fuel cell system according to the foregoing invention, it is preferable that the fuel cell is a fuel cell stack comprising a laminate of plural cells, and the control unit is constructed such that in the case where the fuel cell stack stops power generation, in the state of exposing the anode of each cell to the fuel gas, feeding of the oxidizing agent gas into the cathode of each cell is stopped, and the motions of the external electric source are controlled so as to apply a prescribed voltage between the anode and the cathode of each cell, thereby controlling the cathode of each cell so as to have a potential against a standard hydrogen electrode within the range of from 0.6 V to 0.8 V.

Also, in the fuel cell system according to the foregoing invention, it is preferable that the fuel cell system is further provided with a temperature sensor for measuring the cell temperature of the fuel cell; and the control unit judges whether or not the cell temperature of the fuel cell measured by the temperature sensor drops to below about 50° C., and as a result, in the case where the control unit judges that the cell temperature of the fuel cell drops to below about 50° C., the motions of the external electric source are controlled so as to stop the application of a voltage between the anode and the cathode.

Also, in the fuel cell system according to the foregoing invention, it is preferable that the control unit judges whether or not the cell temperature of the fuel cell measured by the temperature sensor drops to below about 50° C., and as a result, in the case where the control unit judges that the cell temperature of the fuel cell drops to below about 50° C., the cathode and the anode are purged with air.

In addition, in the fuel cell system according to the foregoing invention, it is preferable that the purge is carried out using dry air.

In the operation method of the fuel cell system and fuel cell system for carrying out the method according to the invention, even in the case where the fuel cell repeats the power generation state and the non-power generation state, it is possible to avoid degradation of the fuel cell.

The mode for carrying out the invention will be described below in detail with reference to the drawings.

EXAMPLE 1

Embodiment 1

Figure 6:
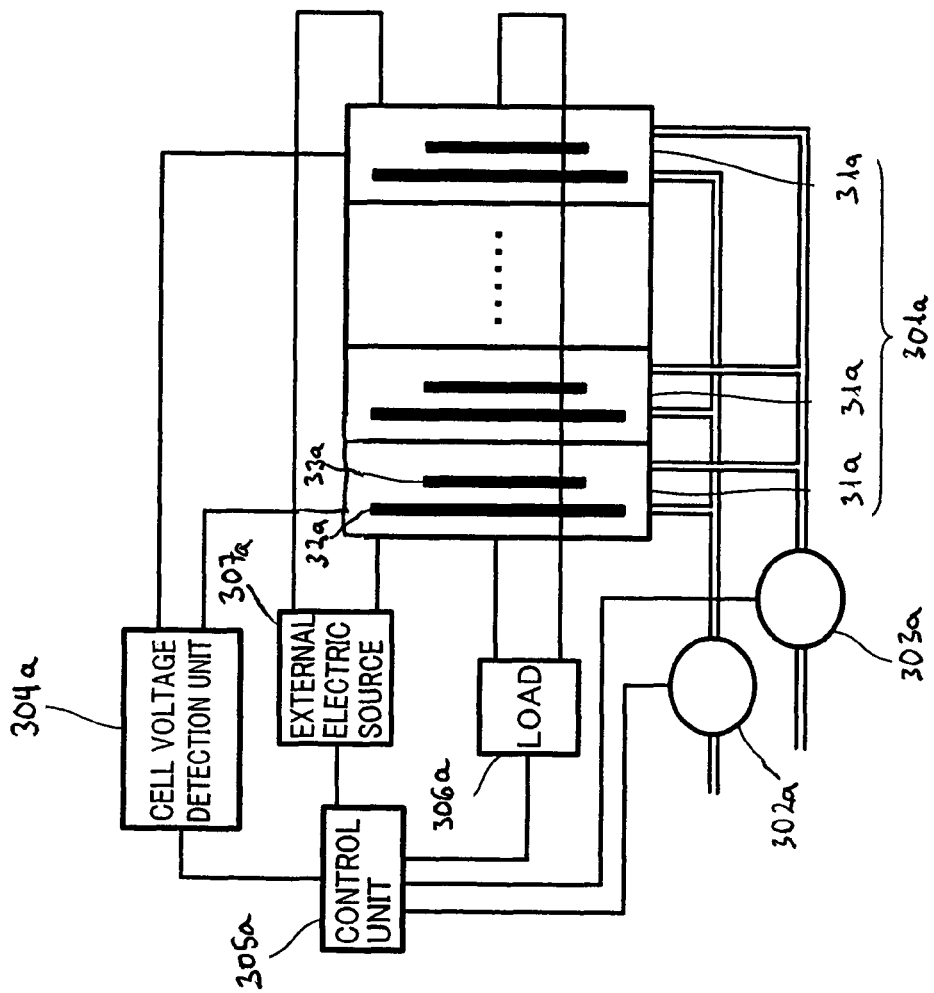
FIG. 6 is a block diagram to show one example of the construction of a fuel cell system according to Embodiment 1 of the invention.

FIG. 6 is a block diagram to show one example of the construction of a fuel cell system according to Embodiment 1 of the invention. In FIG. 6, 301a stands for a fuel cell stack. This fuel cell stack 301a is constituted of stacked plural cells 31a, 31a . . . . The respective cells 31a are provided with a pair of electrodes, i.e., an anode 32a and a cathode 33a, and are connected in series.

Incidentally, the construction of the fuel cell stack 301a is the same as a usual polyelectrolyte type fuel cell stack. Accordingly, a polyelectrolyte membrane is disposed between the anode 32a and the cathode 33a. Also, the anode 32a and the cathode 33a are each comprised of a gas diffusion layer and a catalyst layer, and the catalyst layer has a Pt catalyst.

The fuel cell stack 301a is connected to a load 306a and a cell voltage detection unit 304a for detecting the voltage of each cell 31a. Also, the fuel cell stack 301a is connected to an external electric source 307a for controlling the potential of the cathode 33a as described later.

The anode 32a of each cell 31a is connected to a fuel gas control unit 302a for controlling feeding of a fuel gas. On the other hand, the cathode 33a of each cell 31a is connected to an oxidizing agent gas control unit 303a for controlling feeding of an oxidizing agent gas.

The fuel gas control unit 302a, the oxidizing agent gas control unit 303a, the cell voltage detection unit 304a, the load 306a, and the external electric source 307a are connected to a control unit 305a.

For the sake of starting and stopping feeding of a fuel gas at a proper timing, the control unit 305a controls the motions of the fuel gas control unit 302a. Similarly, for the sake of starting and stopping feeding of an oxidizing agent gas at a proper timing, the control unit 305a controls the motions of the oxidizing agent gas control unit 303a.

Also, the control unit 305a receives a signal showing a voltage of each cell 31a detected by the cell voltage detection unit 304a and controls the motions of the external electric source 307a on a basis of the voltage of each cell 31a shown by the received signal as described later.

In addition, the control unit 305a monitors the state of the load 306a and controls the motions of the units including the fuel gas control unit 302a and the oxidizing agent gas control unit 303a corresponding to the state of the load 306a.

The foregoing system construction is an example in which in the case of controlling the potential of the cathode 33a as described later, the voltage of the whole fuel cell stack 301a is controlled. However, there may be employed a system construction in which the voltage of each cell 31 can be controlled in the following manner.

Figure 7:
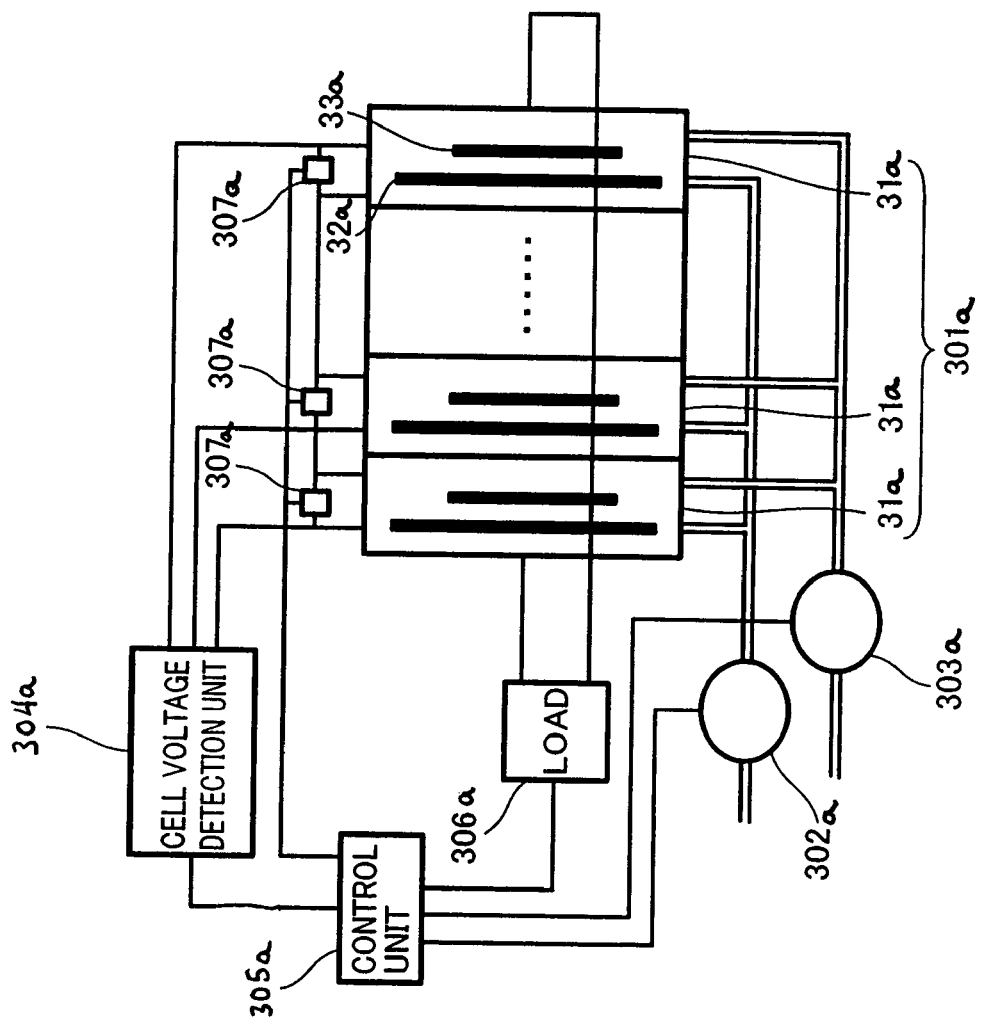
FIG. 7 is a block diagram to show another example of the construction of a fuel cell system according to Embodiment 1 of the invention.

FIG. 7 is a block diagram to show another example of the construction of the fuel cell system according to Embodiment 1 of the invention. As shown in FIG. 7, the cell voltage detection unit 304a is connected to the respective cells 31 constituting the fuel cell stack 301a. Also, the external electric sources 307a are provided as corresponding to the respective cells 31a, and each external electric source 307a is connected to each cell 31a.

In the case of the system construction of controlling the voltage of the whole fuel cell stack 301a as shown in FIG. 6, there are advantages of simplifying the system construction such that the cell voltage detection unit 304a is not required to be connected to each cell 31a and that only one external electric source 307a is sufficient. However, in the case where the resistance value is scattered among the respective cells 31, there is a defect that it is impossible to accurately control the voltage of each cell 31a.

On the other hand, in the case of the system construction capable of controlling the voltage of each cell 31a as shown in FIG. 7, the cell voltage detection unit 304a must be connected to the respective cells 31a, and a plurality of the external electric sources 307a must be provided. Therefore, it involves a defect that the system construction becomes complicated. However, since it is possible to control the voltage of each cell 31a more accurately, it can be expected that durability of each cell 31a is more improved as described later.

These system constructions are properly chosen depending upon the required durability and costs.

Next, in the fuel cell system in this embodiment thus constructed, the procedures stopping the power generation of the fuel cell stack 301a will be described below.

As described previously, the control unit 305a provided with the fuel cell system of this embodiment monitors the state of the load 306a. And when it is detected that the load 306a stops, for the sake of stopping the power generation of the fuel cell system 301a, the following processings are executed.

Figure 8:
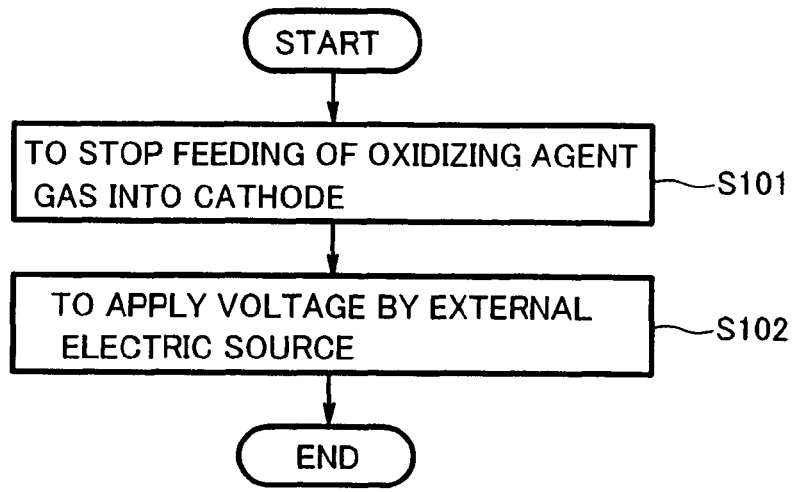
FIG. 8 is a flow chart to show the processing procedures of a control unit with which a fuel cell system according to Embodiment 1 of the invention is provided in the case where a fuel cell stack stops power generation.

FIG. 8 is a flow chart to show the processing procedures of the control unit 305a with which the fuel cell system according to Embodiment 1 of the invention is provided in the case where a fuel cell stack stops power generation. First of all, the control unit 305a controls the motions of the oxidizing agent gas control unit 303a so as to stop feeding of an oxidizing agent gas into the cathode 33a (S101). As a result, the oxidizing agent gas is not fed into the cathode 33a of each cell 31a.

In this state, similarly to the case where the fuel cell stack 301a causes power generation, the control unit 305a controls the fuel gas control unit 302a so as to feed a fuel gas into the anode 32a. In this way, when the fuel cell stack 301 causes power generation, the potential of the anode 32a is held.

As described previously, when the fuel cell causes power generation, the potential of the anode is close to that of SHE. Specifically, for example, in the case where an electric current of 0.2 A/cm$^2$ flows in the fuel cell, the anode is in the polarized state with a potential from 10 to 20 mV against SHE. Accordingly, even in the case where the power generation of the fuel cell stack 301a stops as described previously, by feeding the fuel gas into the anode 32a, it is possible to hold the potential of the anode 32a at a value close to that of SHE.

In the case where a Pt—Ru (ruthenium) alloy is used as a catalyst in the anode 32a, when the potential of the anode 32a rises, Ru is oxidized and eluted from the Pt—Ru alloy, thereby causing degradation of the fuel cell stack 301. However, in this embodiment, since the potential of the anode 32 is held at a low value, it is possible to avoid such degradation.

Incidentally, in this embodiment, the control unit 305a controls the motions of the fuel gas control unit 302a so as to continuously feed the fuel gas into the anode 32a. However, it is required only to hold the state that the anode 32a is exposed to the fuel gas. Accordingly, for example, the sealed state of the gas may be realized by providing a valve capable of controlling opening and closing of the control unit 305a disposed on piping to connect the anode 32a to the fuel gas control unit 302a and making the control unit 305 close the valve at a proper timing.

Since fluctuations in the potential of the anode 32a are prevented by changes in gas formulation within the anode 32a, it is desired to continuously feed the fuel gas into the anode 32a. However, when the fuel gas is fed into the anode 32a in the state in which the fuel cell stack 301a does not cause power generation, the fuel gas is wastefully consumed. In the case where the fuel gas is sealed as described previously, since hydrogen leaked on the side of the cathode 33a is returned to the anode side due to application of a voltage by the external electric source, the changes in gas formulation within the anode 32a are relatively small.

Next, the control unit 305a controls the external electric source 307a so as to apply a voltage of about 0.6 V to about 0.8 V between the anode 32a and the cathode 33a (S102). As a result, the potential of the cathode 33a of each cell 31a is from about about 0.6 V to about 0.8 V against SHE. At this time, since the feeding of the oxidizing agent gas into the cathode 33a is stopped, after oxygen within the cathode 33a is consumed, an electric current to flow for holding the potential of the cathode 33a is very little.

Until the fuel cell stack 301a starts the power generation, the control unit 305a controls the motions of the external electric source 307a on a basis of signals output from the cell voltage detection unit 304a so as to hold the state in which the potential of the cathode 33a of each cell 31a is from about 0.6 V to 0.8 V against SHE.

During a period of time when the fuel cell stack 301a stops the power generation, when the control unit 305a executes the foregoing processes, it is possible to hold the state in which the potential of the cathode 33a is from about 0.6 V to 0.8 V against SHE. As a result, since it is possible to avoid the event that Pt of the cathode 33a repeats oxidation and reduction, the degradation of the Pt catalyst of the cathode 33a can be prevented.

EXAMPLE 2

Embodiment 2

In the fuel cell system according to Embodiment 2 of the invention, after stopping of the load, feeding of the oxidizing agent gas and feeding of the fuel gas are carried out approximately simultaneously, thereby avoiding degradation of the fuel cell.

Figure 9:
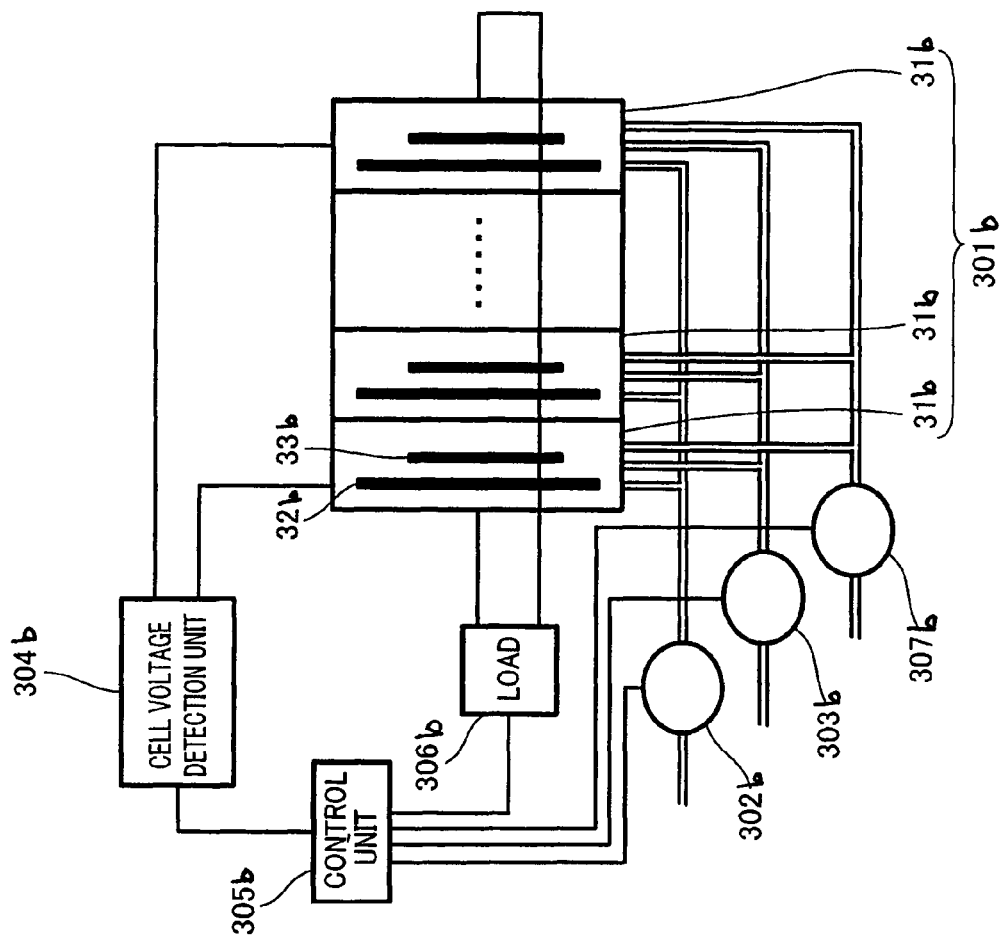
FIG. 9 is a block diagram to show another example of the construction of a fuel cell system according to Embodiment 2 of the invention.

FIG. 9 is a block diagram to show one example of the construction of a fuel cell system according to Embodiment 2 of the invention. In FIG. 9, 301b stands for a fuel cell stack. This fuel cell stack 301b is constituted of stacked plural cells 31b, 31b . . . . The respective cells 31b are provided with a pair of electrodes, i.e., an anode 32b and a cathode 33b, and are connected in series.

Incidentally, the construction of the fuel cell stack 301b is the same as a usual polyelectrolyte type fuel cell stack. Accordingly, a polyelectrolyte membrane is disposed between the anode 32b and the cathode 33b of each cell 31b. Also, the anode 32b and the cathode 33b are each comprised of a gas diffusion layer and a catalyst layer, and the catalyst layer has a Pt catalyst.

The fuel cell stack 301b is connected to a load 306b and a cell voltage detection unit 304b for detecting the voltage of each cell 31b.

Also, the anode 32b of each cell 31b is connected to a fuel gas control unit 302b for controlling feeding of a fuel gas. On the other hand, the cathode 33b of each cell 31b is connected to an oxidizing agent gas control unit 303b for controlling feeding of an oxidizing agent gas.

In addition, the anode 32b of each cell 31b is connected to an inert gas control unit 307b for controlling feeding of an inert gas such as nitrogen. In the fuel cell system of this embodiment, after stop of the load 306b, the anode 32b is purged with an inert gas as described later.

The fuel gas control unit 302b, the oxidizing agent gas control unit 303b, the cell voltage detection unit 304b, the load 306b, and the inert gas control unit 307b are connected to a control unit 305b.

For the sake of starting and stopping feeding of a fuel gas at a proper timing, the control unit 305b controls the operations of the fuel gas control unit 302b. Similarly, for the sake of starting and stopping feeding of an oxidizing agent gas at a proper timing, the control unit 305b controls the operations of the oxidizing agent gas control unit 303b.

Also, the control unit 305b switches connection and disconnection between the fuel cell stack 301b and the load 306b.

Next, when the fuel cell stack 301b of the fuel cell system of this embodiment as thus constructed, the timing of stopping feeding of the oxidizing agent gas and the fuel gas will be described.

FIG. 10 is a timing chart to show the operations of the fuel cell system according to Embodiment 2 of the invention in the case where the fuel cell stack 301b stops power generation. In FIG. 10, FIG. 10A shows the timing that the oxidizing agent gas control unit 303b stops feeding the oxidizing agent gas into the cathode 33b; and FIG. 10B shows the changes in amount of the oxidizing agent gas to be fed into the cathode 33b, respectively. On the other hand, in FIG. 10, FIG. 10C shows the timing that the fuel gas control unit 302b stops feeding the fuel gas into the anode 32b; and FIG. 10D shows the changes in amount of the fuel gas to be fed into the anode 32b, respectively. Also, in FIG. 10, FIG. 10E shows the changes in voltage of the cell 31b; and FIG. 10F shows the changes in potential of the cathode 33b, respectively. Incidentally, a value against a reversible hydrogen electrode (RHE) is employed as the potential of the cathode 33b as referred to herein.

Figure 10A:
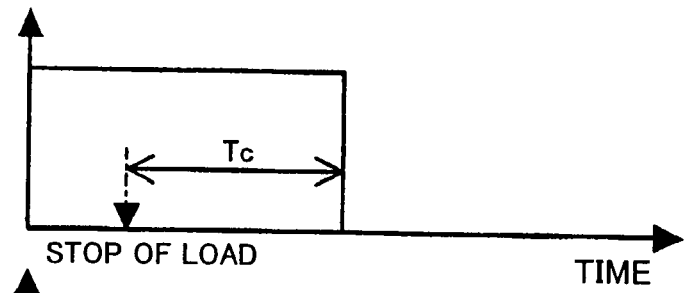
FIGS. 10A-F are timing charts illustrating the operations of a fuel cell system according to Embodiment 2 of the invention in the case where a fuel cell stack stops power generation.
Figure 10B:
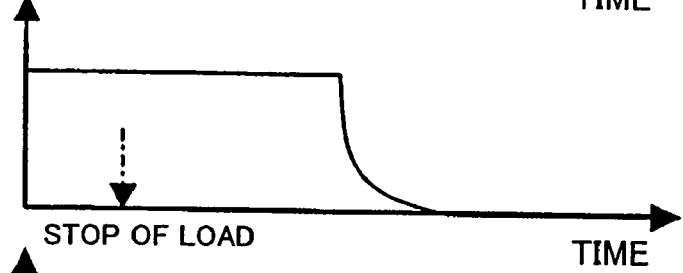

As shown in FIG. 10A, in this embodiment, the control unit 305b controls the operations of the oxidizing agent gas control unit 303b such that during a period from disconnection between the fuel cell stack 301b and the load 306b, i.e., stopping of the load 306b, until a lapse of a prescribed period of time Ta, the oxidizing agent gas is fed into the cathode 33b. In this case, as shown in FIG. 10B, the amount of the oxidizing agent gas to be fed into the cathode 33b gradually decreases after stopping feeding of the oxidizing agent gas.

Figure 10C:
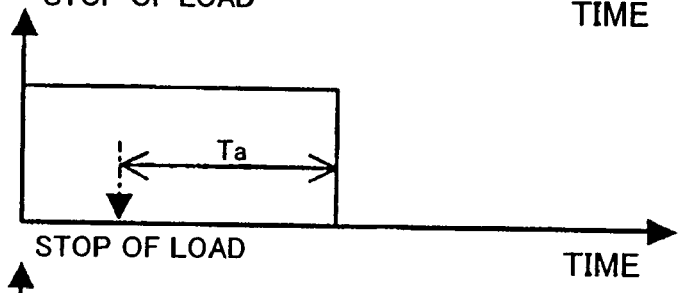
Figure 10D:
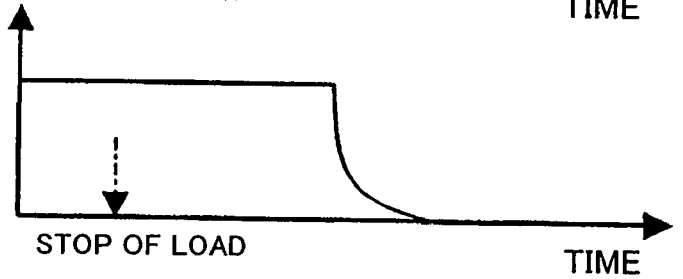
Figure 10E:
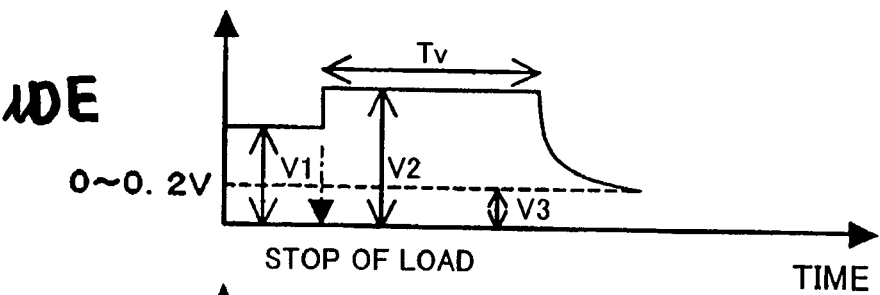

On the other hand, as shown in FIG. 10C, the control unit 305b controls the operations of the fuel gas control unit 302b such that during a period of from stop of the load 306b until a lapse of a prescribed period of time Tc, the fuel gas is fed into the anode 32b. In this case, as shown in FIG. 10D, the amount of the fuel gas to be fed into the anode 32b gradually decreases after stopping feeding of the fuel gas.

In the case of this embodiment, the time Ta and the time Tc are approximately equal to each other. For this reason, after stopping of the load 306b, feeding of the oxidizing agent gas into the cathode 33b and feeding of the fuel gas into the anode 32b are carried out for a period of time approximately equal to each other.

When feeding of the oxidizing agent gas and the fuel gas is carried out in the way described previously, as shown in FIG. 5E, the voltage of the cell 31b instantaneously rises from a voltage V1 (from about 0.7 to 0.75 V) when the load 306b increases to an open circuit voltage V2 (a value exceeding 0.9 V) when the load 306b stops. Thereafter, the voltage of the cell 31b keeps a value of the open circuit voltage V2 for a period of time Tv. And, after stopping feeding of the oxidizing agent gas and the fuel gas, the voltage of the cell 31b gradually decreases and finally reaches a voltage V3 of about 0 to 0.2 V.

Figure 10F:
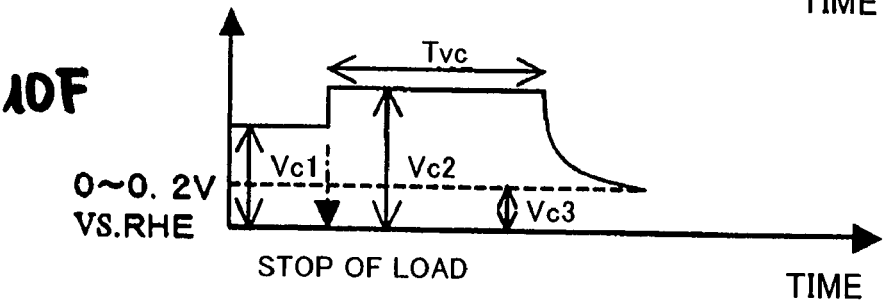

At this time, the potential of the cathode 33b changes likewise the voltage of the cell 31b as shown in FIG. 10F. That is, the potential of the cathode 33b instantaneously rises from a potential Vc1 (from about 0.7 to 0.75 V) when the load 306b increases to an open circuit potential Vc2 (a value exceeding 0.9 V) when the load 306b stops. Thereafter, the potential of the cathode 33b maintains a value of the open circuit potential Vc2 for a period of time Tvc. And, after stopping feeding of the oxidizing agent gas and the fuel gas, the potential of the cathode 33b gradually decreases and finally reaches a voltage Vc3 of from about 0 to 0.2 V.

By stopping feeding of the fuel gas and the oxidizing agent gas at the timing as described previously, it is possible to decrease the potential of the cathode 33b by hydrogen ions having penetrated into the polyelectrolyte membrane in each cell 31b. As a result, reduction of oxidized Pt and elimination of adsorbed oxidation seeds proceed in the cathode 33b, whereby the catalytic activity of the catalyst layer is recovered.

Incidentally, as shown in FIG. 10F, in the case of this embodiment, since the potential of the cathode 33b becomes the open circuit potential only for the period of time Tvc, there are problems such as a decrease in catalyst reaction area caused due to elution and sintering of the Pt catalyst of the cathode 33b, and a decrease in reaction area caused due to oxidation of Pt and adsorption of oxidation seeds. Also, there is some possibility that as described previously, the state in which the radicals are generated in high concentrations is caused, leading to decomposition of the polyelectrolyte that the fuel cell stack 301b has.

However, by defining the foregoing times Tc and Ta such that the time Tvc is shortened as quickly as possible, it is possible to suppress degradation of the Pt catalyst and decomposition of the polyelectrolyte. The value of the time Tv varies depending on the elution rate of Pt and the thickness of the cathode 33b, it is generally within 10 minutes, and preferably within one minute.

Then, in this embodiment, the control unit 305b controls the foregoing times Tc and Ta such that the time Tv when the cell 31b has a voltage of 0.9 V or more is less than one minute. Thus, the time Tvc similarly less than 10 minutes. Thus, it is possible to effectively suppress degradation of the Pt catalyst and decomposition of the polyelectrolyte.

In the case of this embodiment, after a lapse of the time Tv, the control unit 305b controls the operations of the inert gas control unit 307b such that the anode 32b of each cell 31b is purged with an inert gas. By this purge, it is possible to prevent oxidation of Pt and to safely stop the fuel cell stack 301b.

Incidentally, in this embodiment, the purge of the anode 32b is carried out using an inert gas such as nitrogen, but it should not be construed that the invention is limited thereto. For example, the purge may be carried out using, for example, a hydrocarbon gas or a reducing agent.

EXAMPLE 3

Embodiment 3

In the fuel cell system according to Embodiment 3 of the invention, after stopping of the load, feeding of the fuel gas is carried out for a longer period of time as compared with feeding of the oxidizing agent gas, thereby avoiding degradation of the fuel cell.

Incidentally, since the construction of the fuel cell system of this embodiment is the same as in the case of Embodiment 2, its explanation is omitted. In the case where the fuel cell stack 301b of the fuel cell system of this embodiment stops power generation, the timing of stopping feeding of the oxidizing agent gas and the fuel gas will be described below while referring to FIG. 9.

FIG. 11 is a timing chart to show the operations of the fuel cell system according to Embodiment 3 of the invention in the case where the fuel cell stack 301b stops power generation. In FIG. 11, FIGS. 11A to 11F correspond to FIGS. 10A to 10F in FIG. 10.

Figure 11A:
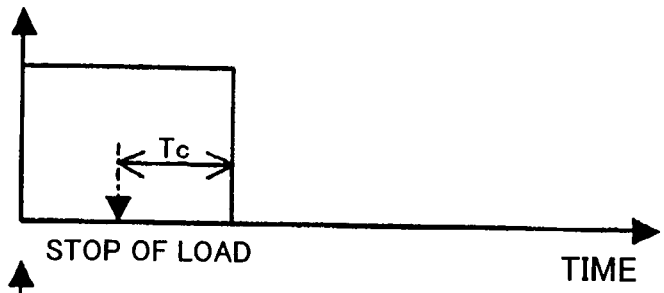
FIGS. 11A-F are timing charts illustrating the operations of a fuel cell system according to Embodiment 3 of the invention in the case where a fuel cell stack stops power generation.
Figure 11B:
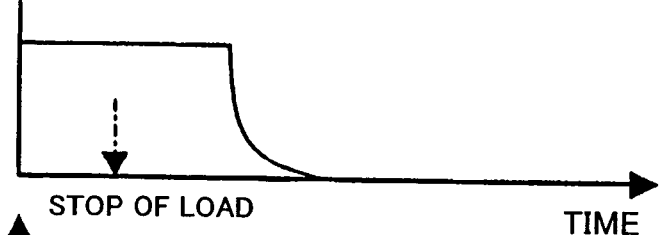

As shown in FIG. 11A, in this embodiment, the control unit 305b controls the operations of the oxidizing agent gas control unit 303b such that during a period of from disconnection between the fuel cell stack 301b and the load 306b, i.e., stopping of the load 306b, until a lapse of a prescribed period of time Tc, the oxidizing agent gas is fed into the cathode 33b. In this case, as shown in FIG. 11B, the amount of the oxidizing agent gas to be fed into the cathode 33b gradually decreases after stopping feeding of the oxidizing agent gas.

Figure 11C:
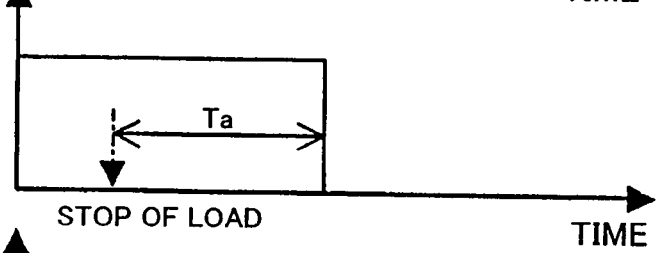
Figure 11D:
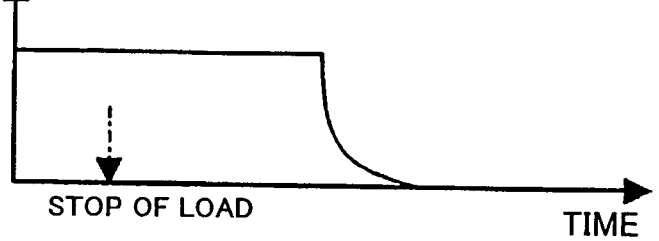
Figure 11E:
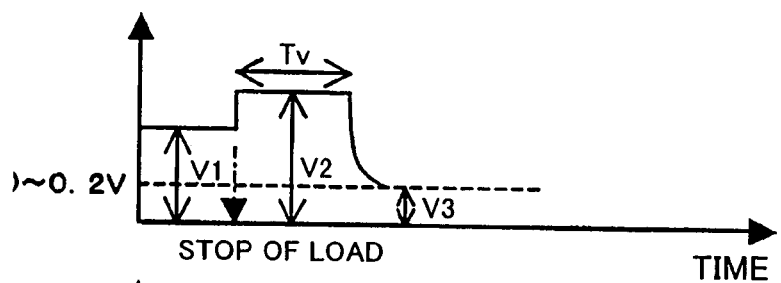
Figure 11F:
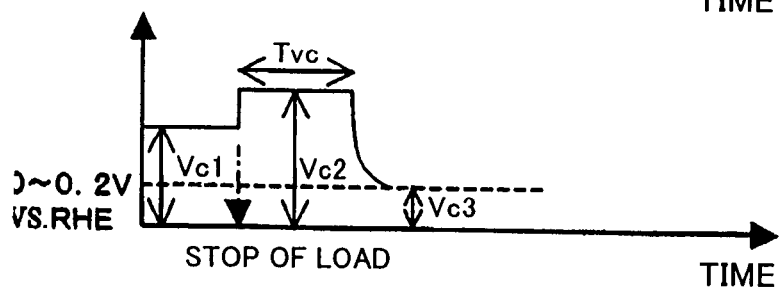

On the other hand, as shown in FIG. 11C, the control unit 305b controls the operations of the fuel gas control unit 302b such that during a period of from stopping of the load 306b until a lapse of a prescribed period of time Ta, the fuel gas is fed into the anode 32b. In this case, as shown in FIG. 11D, the amount of the fuel gas to be fed into the anode 32b gradually decreases after stopping feeding of the fuel gas.

In the case of this embodiment, the time Ta is longer than the time Tc. That is, after stopping of the load 306b, feeding of the oxidizing agent gas into the cathode 33b is stopped when the time Tc elapses, and feeding of the fuel gas into the anode 32b is then stopped when the time Ta elapses. For this reason, the gas is fed into only the anode 32b during a period of time of (Ta−Tc) which is a value obtained by subtracting the time Tc from the time Ta.

When feeding of the oxidizing agent gas and the fuel gas is carried out in the way described previously, as shown in FIG. 11E, the voltage of the cell 31b instantaneously rises from a voltage V1 (from about 0.7 to 0.75 V) when the load 306b increases to an open circuit voltage V2 (a value exceeding 0.9 V) when the load 306b stops. Thereafter, the voltage of the cell 31b keeps a value of the open circuit voltage V2 for a period of time Tv. And, after stopping feeding of the oxidizing agent gas, the voltage of the cell 31b gradually decreases and finally reaches a voltage V3 of from about 0 to 0.2 V.

At this time, the potential of the cathode 33b changes likewise the voltage of the cell 31b as shown in FIG. 6F. That is, the potential of the cathode 33b instantaneously rises from a potential Vc1 (from about 0.7 to 0.75 V) when the load 306b increases to an open circuit potential Vc2 (a value exceeding 0.9 V) when the load 306b stops. Thereafter, the potential of the cathode 33b keeps a value of the open circuit potential Vc2 for a period of time Tvc. And, after stopping feeding of the oxidizing agent gas, the potential of the cathode 33b gradually decreases and finally reaches a voltage Vc3 of about 0 to 0.2 V.

Likewise the case of Embodiment 2, by stopping feeding of the fuel gas and the oxidizing agent gas at the timing as described previously, it is possible to decrease the potential of the cathode 33b by hydrogen ions having penetrated into the polyelectrolyte membrane in each cell 31b. As a result, reduction of oxidized Pt and elimination of adsorbed oxidation seeds proceed in the cathode 33b, whereby the catalytic activity of the catalyst layer is recovered.

In this embodiment, the decrease in voltage of the cell 31b after a lapse of the time Tv and the decrease in potential of the cathode 33b after a lapse of the time Tvc proceed quickly as compared with the case of Embodiment 2. This is caused from the following reasons. That is, in the case of this embodiment, even after stopping feeding of the oxidizing agent gas, feeding of the fuel gas is continued, and therefore, the hydrogen concentration in the fuel gas is kept. Thus, the rate of hydrogen ions to diffuse and penetrate into the polyelectrolyte membrane is high as compared with the case of Embodiment 2, and as a result, the decrease in potential of the cathode 33b proceeds quickly.

Incidentally, by defining the foregoing times Tc and Ta such that the time Tv is shortened as quickly as possible, specifically less than one minute, it is possible to suppress degradation of the Pt catalyst and decomposition of the polyelectrolyte likewise the case of Embodiment 2.

Also, what the anode 32b is purged with an inert gas is the same as in the case of Embodiment 2.

EXAMPLE 4

Embodiment 4

In the fuel cell system according to Embodiment 4 of the invention, after stopping of the load, feeding of the oxidizing agent gas is carried out for a longer period of time as compared with feeding of the fuel gas, thereby avoiding degradation of the fuel cell.

Incidentally, since the construction of the fuel cell system of this embodiment is the same as in the case of Embodiment 2, its explanation is omitted. When the fuel cell stack 301b of the fuel cell system of this embodiment stops power generation, the timing of stopping feeding of the oxidizing agent gas and the fuel gas will be described below while referring to FIG. 9.

FIG. 12 is a timing chart to show the operations of the fuel cell system according to Embodiment 3 of the invention in the case where the fuel cell stack 301b stops power generation. In FIG. 12, FIGS. 12A to 12F correspond to FIGS. 10A to 10F in FIG. 10.

Figure 12A:
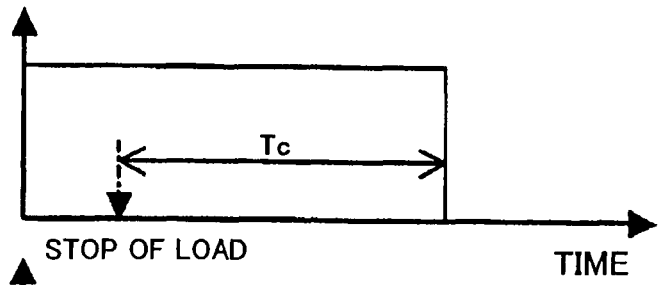
FIGS. 12A-F are timing charts illustrating the operations of a fuel cell system according to Embodiment 4 of the invention in the case where a fuel cell stack stops power generation.
Figure 12B:
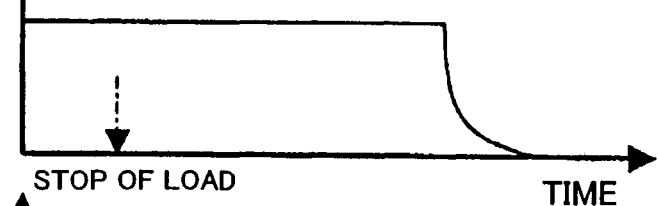

As shown in FIG. 12A, in this embodiment, the control unit 305b controls the operations of the oxidizing agent gas control unit 303b such that during a period of from disconnection between the fuel cell stack 301b and the load 306b, i.e., stopping of the load 306b, until a lapse of a prescribed period of time Tc, the oxidizing agent gas is fed into the cathode 33b. In this case, as shown in FIG. 12B, the amount of the oxidizing agent gas to be fed into the cathode 33b gradually decreases after stopping feeding of the oxidizing agent gas.

Figure 12C:
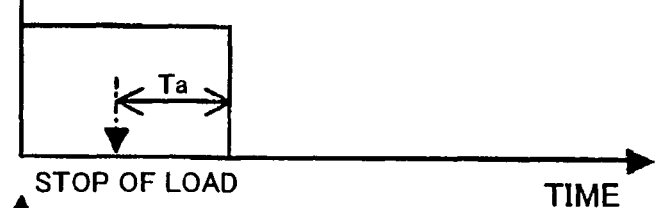
Figure 12D:
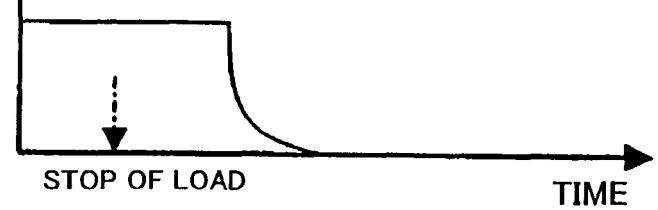

On the other hand, as shown in FIG. 12C, the control unit 305b controls the operations of the fuel gas control unit 302b such that during a period of from stopping of the load 306b until a lapse of a prescribed period of time Ta, the fuel gas is fed into the anode 32b. In this case, as shown in FIG. 12D, the amount of the fuel gas to be fed into the anode 32b gradually decreases after stopping feeding of the fuel gas.

In the case of this embodiment, the time Tc is longer than the time Ta. That is, after stopping of the load 306b, feeding of the fuel gas into the anode 32b is stopped when the time Ta elapses, and feeding of the oxidizing agent gas into the cathode 33b is then stopped when the time Tc elapses. For this reason, the gas is fed into only the cathode 33b during a period of time of (Tc−Ta) which is a value obtained by subtracting the time Ta from the time Tc.

When feeding of the oxidizing agent gas and the fuel gas is carried out in the way described previously, as shown in FIG. 12E, the voltage of the cell 31b instantaneously rises from a voltage V1 (from about 0.7 to 0.75 V) when the load 306b increases to an open circuit voltage V2 (a value exceeding 0.9 V) when the load 306b stops. Thereafter, the voltage of the cell 31b keeps a value of the open circuit voltage V2 for a period of time Tv. And, after stopping feeding of the fuel gas, the voltage of the cell 31 gradually decreases and finally reaches a voltage V3 of from about 0 to 0.2 V.

Figure 12E:
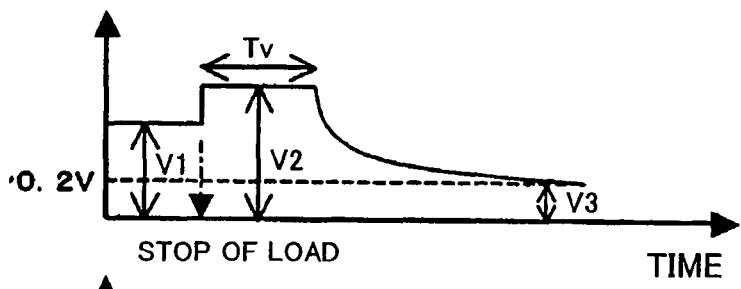
Figure 12F:
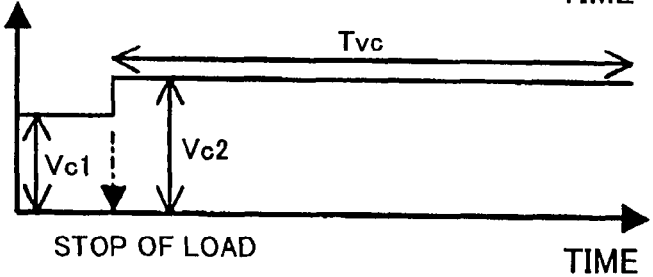

At this time, as shown in FIG. 12F, the potential of the cathode 33b instantaneously rises from a potential Vc1 (from about 0.7 to 0.75 V) when the load 306b increases to an open circuit potential Vc2 (a value exceeding 0.9 V) when the load 306b stops. Thereafter, since feeding of the oxidizing agent gas into the cathode 33b is still continued, the potential of the cathode 33b keeps a value of the open circuit potential Vc2.

Incidentally, as shown in FIG. 12E, the reason why after a lapse of the time Tv, the voltage of the cell 31b decreases resides in the event that the potential of the anode 32b increases with a decrease in hydrogen concentration of the fuel gas. In this case, the decrease in voltage of the cell 31b proceeds slowly as compared with the cases of Embodiments 2 and 3.

In this embodiment, by defining the foregoing times Tc and Ta such that the time Tv is shortened as quickly as possible, specifically less than one minute, it is possible to suppress degradation of the Pt catalyst and decomposition of the polyelectrolyte.

Incidentally, what the anode 32b is purged with an inert gas is the same as in the case of Embodiment 2.

EXAMPLE 5

Embodiment 5

In the fuel cell systems according to the foregoing Embodiments 2 to 4, feeding of the fuel gas and the oxidizing agent gas is stopped after stopping of the load. On the other hand, in the fuel cell system according to Embodiment 5 of the invention, immediately before stopping of the load, feeding of the oxidizing agent gas and feeding of the fuel gas are stopped, thereby avoiding degradation of the fuel cell.

Incidentally, since the construction of the fuel cell system of this embodiment is the same as in the case of Embodiment 2, its explanation is omitted. When the fuel cell stack 301b of the fuel cell system of this embodiment stops power generation, the timing of stopping feeding of the oxidizing agent gas and the fuel gas will be described below while referring to FIG. 9.

FIG. 13 is a timing chart to show the operations of the fuel cell system according to Embodiment 5 of the invention in the case where the fuel cell stack 301 stops power generation. In FIG. 13, FIGS. 13A to 13F correspond to FIGS. 10A to 10F in FIG. 10.

As shown in FIG. 13A, in this embodiment, the control unit 305b controls the operations of the oxidizing agent gas control unit 303b such that immediately before disconnection between the fuel cell stack 301b and the load 306b (preferably within one minute), i.e., immediately before stopping of the load 306b, feeding of the oxidizing agent gas into the cathode 33b is stopped. In this case, as shown in FIG. 13B, the amount of the oxidizing agent gas to be fed into the cathode 33b gradually decreases after stopping feeding of the oxidizing agent gas.

Similarly, as shown in FIG. 13C, the control unit 305b controls the operations of the fuel gas control unit 302b such that feeding of the fuel gas into the anode 32b is stopped immediately before stopping of the load 306b. In this case, as shown in FIG. 13D, the amount of the fuel gas into the anode 32b gradually decreases after stopping feeding of the fuel gas.

After stopping feeding of the oxidizing agent and the fuel gas, the control unit 305b disconnects the fuel cell stack 301b and the load 306b from each other.

When feeding of the oxidizing agent gas and the fuel gas is carried out in the way described previously, as shown in FIG. 13E, the voltage of the cell 31b instantaneously rises from a voltage V1 (from about 0.7 to 0.75 V) when the load 306b starts to a voltage V4 (a value lower than an open circuit voltage V2 (a value exceeding 0.9 V)) when the load 306b stops. Thereafter, the voltage of the cell 31b gradually decreases and finally reaches a voltage V3 of about 0 to 0.2 V.

At this time, as shown in FIG. 13F, the potential of the cathode 33 in changed similarly to the potential of the cell 31b, that is, the potential of the cathode 33b instantaneously rises from a potential Vc1 (from about 0.7 to 0.75 V) when the load 306b increases to a potential Vc4 (a value lower than an open circuit potential Vc2 (a value exceeding 0.9 V)) when the load 306b stops. Thereafter, the potential of the cathode 33b gradually decreases and finally reaches a potential Vc3 of about 0 to 0.2 V.

By stopping feeding of the fuel gas and the oxidizing agent gas at the timing described previously, it is possible to decrease the potential of the cathode 33b by hydrogen ions having penetrated into the polyelectrolyte membrane in each cell 31 similarly to the Embodiment 2. As a result, reduction of oxidized Pt and elimination of adsorbed oxidation seeds proceed in the cathode 33b, whereby the catalytic activity of the catalyst layer is recovered.

Incidentally, what the anode 32b is purged with an inert gas is the same as in the case of Embodiment 2.

Now, in the case of stopping of the load 306b, it is desired that the fuel cell system of this embodiment takes the following operations. In FIG. 13, is illustrated an enlarged view of the portion to show the changes in voltage of the cell 31b when the load 306b of FIG. 13E stops. As shown in this enlarged view, after stopping feeding of the oxidizing agent gas into the cathode 33b, the voltage of the cell 31b decreases from a voltage V1. When loading is continued in this state, a current flows exceeding the liming current of electrode, thereby resulting in breakage of the cell 31b. Accordingly, when the voltage of the cell 31b reaches a prescribed voltage V5, the control unit 305b disconnects the load 306b and the fuel cell stack 301b from each other. Immediately thereafter, the voltage of the cell 31b is recovered. However, when the voltage of the cell 31b rises to 0.9 V or more, the foregoing problem occurs. Accordingly, when the voltage of the cell 31b reaches a voltage V4, the control unit 305b connects the load 306b to the fuel cell stack 301b.

As a result, the voltage of the cell 31b decreases. And, when the voltage of the cell 31b again reaches the voltage V5, the control unit 305b disconnects the load 306b and the fuel cell stack 301b from each other.

When such operations are repeated several times, the voltage of the cell 31b does not reach V4, and the load 306b stays as it is disconnected from the fuel cell stack 301b.

By these operations, it is possible to prevent the event that the voltage of the cell 31b immediately after it has become in the open circuit state exceeds V4. Thus, it is possible to suppress elution of Pt caused by an increase in potential of the cathode 33b.

EXAMPLE 6

Embodiment 6

In the fuel cell system according to Embodiment 6 of the invention, immediately before stopping of the load (preferably within about one minute before stopping of the load), feeding of the oxidizing agent gas is stopped, thereby avoiding degradation of the fuel cell.

Incidentally, since the construction of the fuel cell system of this embodiment is the same as in the case of Embodiment 2, its explanation is omitted. When the fuel cell stack 301b of the fuel cell system of this embodiment stops power generation, the timing of stopping feeding of the oxidizing agent gas and the fuel gas will be described below while referring to FIG. 14.

FIG. 14 is a timing chart to show the operations of the fuel cell system according to Embodiment 6 of the invention in the case where the fuel cell stack 301b stops power generation. In FIG. 14, FIGS. 14A to 14F correspond to FIGS. 10A to 10F in FIG. 10.

Figure 14A:
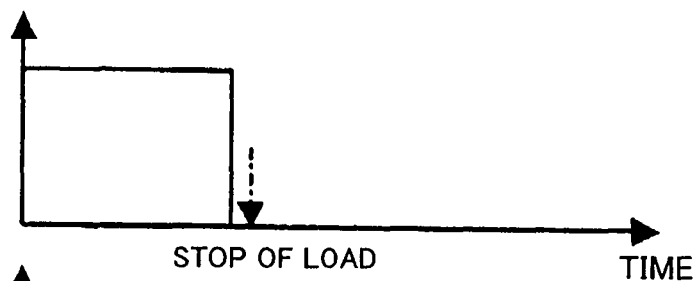
FIGS. 14A-F are timing charts illustrating the operations of a fuel cell system according to Embodiment 6 of the invention in the case where a fuel cell stack stops power generation.
Figure 14B:
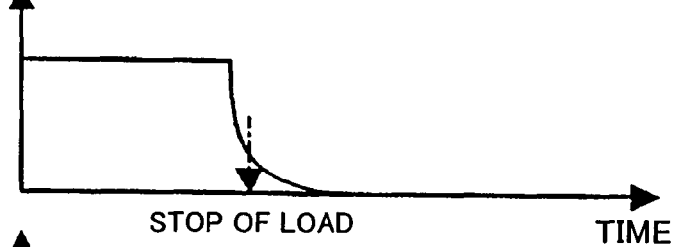

As shown in FIG. 10A, in this embodiment, the control unit 305 controls the operations of the oxidizing agent gas control unit 303 such that immediately before disconnection between the fuel cell stack 301b and the load 306b, i.e., immediately before stopping of the load 306b, feeding of the oxidizing agent gas into the cathode 33b is stopped. In this case, as shown in FIG. 14B, the amount of the oxidizing agent gas to be fed into the cathode 33b gradually decreases after stopping feeding of the oxidizing agent gas.

Figure 14C:
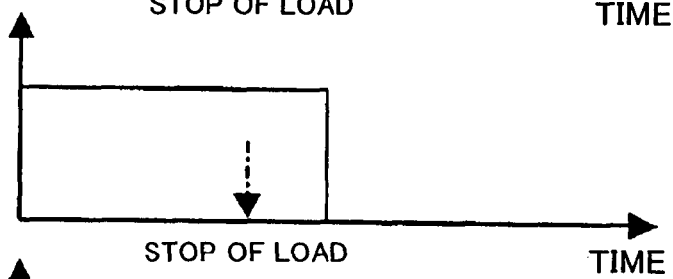
Figure 14D:
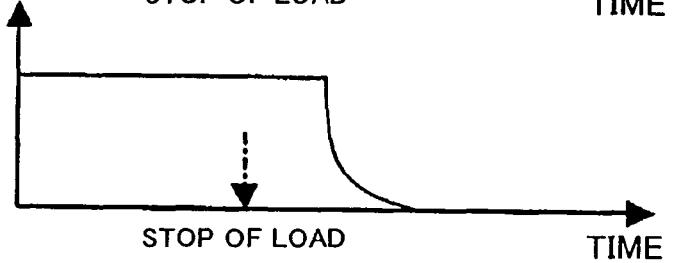

On the other hand, as shown in FIG. 14C, the control unit 305b controls the operations of the fuel gas control unit 302b such that feeding of the fuel gas into the anode 32b is continued for a prescribed period of time after stopping of the load 306b. In this case, as shown in FIG. 14D, the amount of the fuel gas into the anode 32b gradually decreases after stopping feeding of the fuel gas.

Where feeding of the oxidizing agent gas and the fuel gas is carried out in the way described previously, as shown in FIG. 14E, the voltage of the cell 31b instantaneously rises from a voltage V1 (from about 0.7 to 0.75 V) when the load 306b starts to a voltage V4 (a value lower than an open circuit voltage V2 (a value exceeding 0.9 V)) when the load 306 stops. Thereafter, the voltage of the cell 31b gradually decreases and finally reaches a voltage V3 of about 0 to 0.2 V.

Figure 14E:
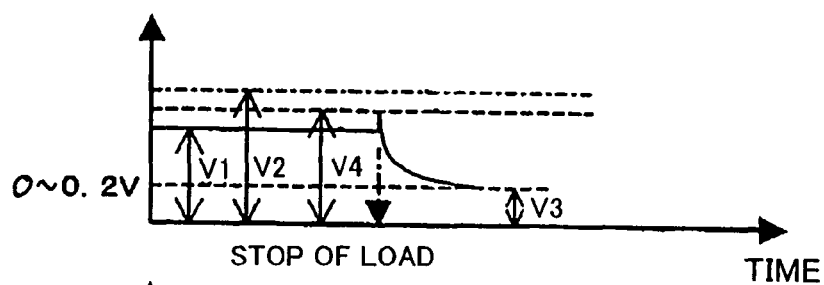
Figure 14F:
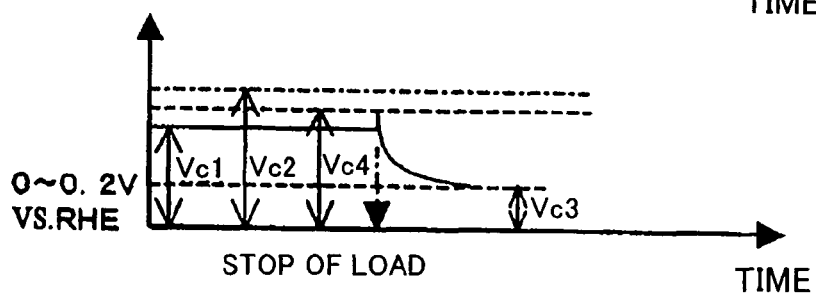

At this time, as shown in FIG. 14F, the potential of the cathode 33b changes likewise the voltage of the cell 31b. That is, the potential of the cathode 33b instantaneously rises from a potential Vc1 (from about 0.7 to 0.75 V) when the load 306 increases to a potential Vc4 (a value lower than an open circuit potential Vc2 (a value exceeding 0.9 V)) when the load 306b stops. Thereafter, the potential of the cathode 33b gradually decreases and finally reaches a potential Vc3 of from about 0 to 0.2 V.

By stopping feeding of the fuel gas and the oxidizing agent gas at the timing described previously, it is possible to decrease the potential of the cathode 33b by hydrogen ions having penetrated into the polyelectrolyte membrane in each cell 31b similarly to the Embodiment 2. As a result, reduction of oxidized Pt and elimination of adsorbed oxidation seeds proceed in the cathode 33b, whereby the catalytic activity of the catalyst layer is recovered.

In this embodiment, the decrease in voltage of the cell 31b and the decrease in potential of the cathode 33b proceed quickly as compared with the case of Embodiment 5. This is caused by the following reasons. That is, in the case of this embodiment, even after stopping feeding of the oxidizing agent gas, feeding of the fuel gas is continued, and therefore, the hydrogen concentration in the fuel gas is kept. Thus, the rate of hydrogen ions to diffuse and penetrate into the polyelectrolyte membrane is high as compared with the case of Embodiment 5, and as a result, the decrease in potential of the cathode 33b proceeds quickly.

Incidentally, in order to prevent the event that the voltage of the cell 31b immediately after it has become in the open circuit state exceeds V4, the fuel cell system of this embodiment should take the operations so as to repeat the connection and disconnection between the load 306b and the fuel cell stack 301b likewise the case of Embodiment 5.

Also, what the anode 32b is purged with an inert gas is the same as in the case of Embodiment 2.

EXAMPLE 7

Embodiment 7

In the fuel cell system according to Embodiment 7 of the invention, immediately before stopping of the load, feeding of the fuel gas is stopped, thereby avoiding degradation of the fuel cell.

Incidentally, since the construction of the fuel cell system of this embodiment is the same as in the case of Embodiment 2, its explanation is omitted. When the fuel cell stack 301b of the fuel cell system of this embodiment stops power generation, the timing of stopping feeding of the oxidizing agent gas and the fuel gas will be described below while referring to FIG. 9.

FIG. 15 is a timing chart to show the operations of the fuel cell system according to Embodiment 7 of the invention in the case where the fuel cell stack 301 stops power generation. In FIG. 15, FIGS. 15A to 15F correspond to FIGS. 10A to 10F in FIG. 10.

Figure 15A:
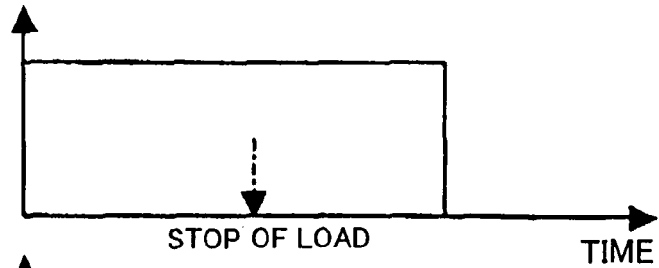
FIGS. 15A-F are timing charts illustrating the operations of a fuel cell system according to Embodiment 7 of the invention in the case where a fuel cell stack stops power generation.
Figure 15B:
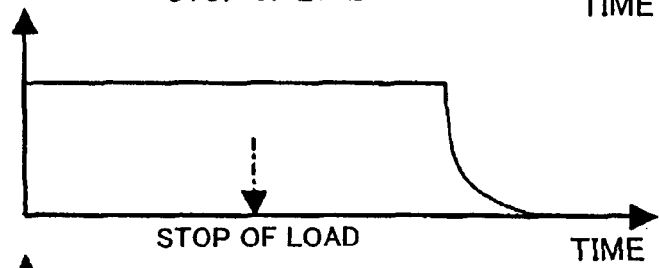

As shown in FIG. 15A, in this embodiment, the control unit 305b controls the operations of the oxidizing agent gas control unit 303b such that after disconnection between the fuel cell stack 301b and the load 306b, i.e., after stopping of the load 306b, feeding of the oxidizing agent gas into the cathode 33b is continued for a prescribed period of time. In this case, as shown in FIG. 15B, the amount of the oxidizing agent gas to be fed into the cathode 33b gradually decreases after stopping feeding of the oxidizing agent gas.

Figure 15C:
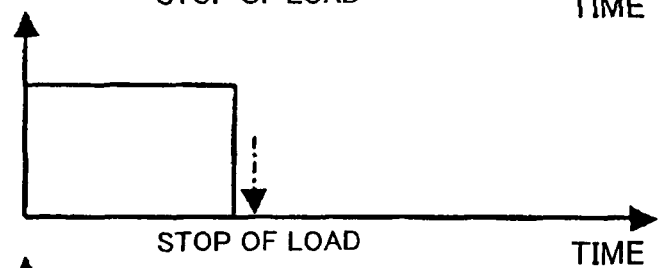
Figure 15D:
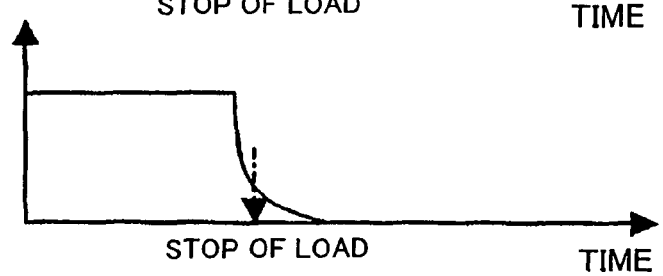

On the other hand, as shown in FIG. 15C, the control unit 305b controls the operations of the fuel gas control unit 302b such that feeding of the fuel gas into the anode 32b is stopped immediately before cutting between the fuel cell stack 301b and the load 306b, that is, stopping the load 306b. In this case, as shown in FIG. 15D, the amount of the fuel gas into the anode 32b gradually decreases after stopping feeding of the fuel gas.

When feeding of the oxidizing agent gas and the fuel gas is carried out in the way described previously, as shown in FIG. 15E, the voltage of the cell 31b instantaneously rises from a voltage V1 (from about 0.7 to 0.75 V) when the load 306 increases to a voltage V4 (a value lower than an open circuit voltage V2 (a value exceeding 0.9 V)) when the load 306b stops. Thereafter, the voltage of the cell 31b gradually decreases and finally reaches a voltage V3 of from about 0 to 0.2 V.

Figure 15E:
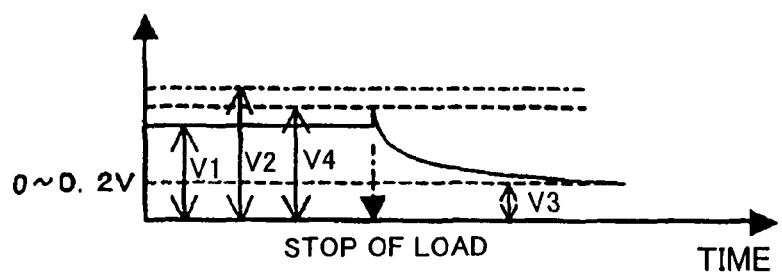
Figure 15F:
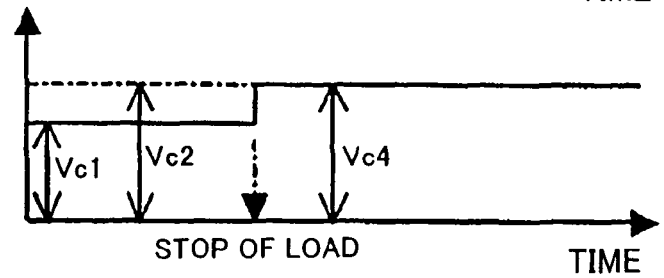

At this time, as shown in FIG. 15F, the potential of the cathode 33b instantaneously rises from a potential Vc1 (from about 0.7 to 0.75 V) when the load 306b increases to a potential Vc4 (a value lower than an open circuit voltage Vc2 (a value exceeding 0.9 V)) when the load 306b stops. Thereafter, since feeding of the oxidizing agent gas into the cathode 33b is continued, the potential of the cathode 33b keeps the value of potential Vc4.

Incidentally, as shown in FIG. 15E, the reason why after stopping of the load 306b, the voltage of the cell 31b decreases resides in the event that the potential of the anode 32b increases with a decrease in hydrogen concentration of the fuel gas. In this case, the decrease in voltage of the cell 31b proceeds slowly as compared with the cases of Embodiments 5 and 6.

In this embodiment, since it is possible to avoid the event that the voltage of the cell 31b becomes the open circuit voltage, it is possible to suppress degradation of the Pt catalyst and the like.

Incidentally, in order to prevent the event that the voltage of the cell 31b immediately after it has become in the open circuit state exceeds V4, the fuel cell system of this embodiment should take the operations so as to repeat the connection and disconnection between the load 306b and the fuel cell stack 301b likewise the case of Embodiment 5.

Also, what the anode 32b is purged with an inert gas is the same as in the case of Embodiment 2.

EXAMPLE 8

Evaluation Test

In order to evaluate the operation method of the fuel cell system of each of the foregoing embodiments, a fuel cell stack was prepared in the following manner. Then, the test was carried out using thus prepared fuel cell stack. The evaluation test will be described below by referring to FIG. 10.

First of all, acetylene black (Denka Black manufactured by Denki Kagaku Kogyo Kabushiki Kaisha, particle size: 35 nm) as a carbon powder was mixed with an aqueous dispersion of polytetrafluoroethylene (PTFE) (D1 manufactured by Daikin Industries, Ltd.), to prepare a water repellent ink containing 20% by weight of PTFE in terms of dry weight. This ink is coated on carbon paper (TGPH060H manufactured by Toray Industries, Inc.) as a substrate of a gas diffusion layer, dipped and then heat treated at 300° C. using a hot-air dryer, to form a gas diffusion layer having a thickness of about 200 μm.

On the other hand, 66 parts by weight of a catalyst substance (containing 50% by weight of Pt) obtained by carrying a Pt catalyst on Ketjenblack (Ketjecnblack EC manufactured by Ketjen Black International Company, particle size: 30 nm) as a carbon powder was mixed with 33 parts by weight of a perfluorocarbon sulfonic acid ionomer (a 5% by weight dispersion of Nafion manufactured by Aldrich Chemical Corporation, U.S.A.) (in terms of polymer dry weight) as a hydrogen ion conducting material and a binder, and the resulting mixture was molded to form a catalyst layer having a thickness of from 10 to 20 μm.

Figure 16A:
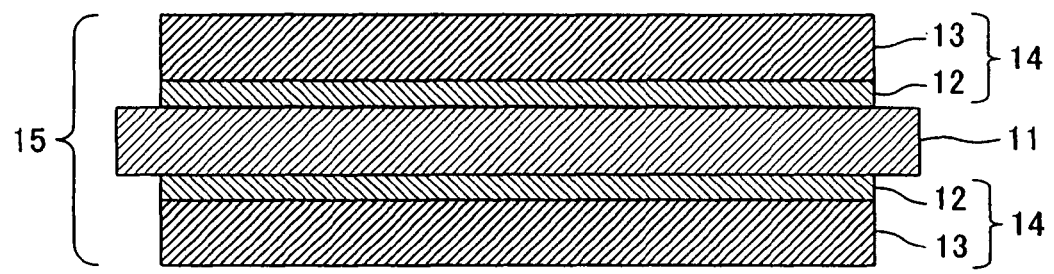
FIG. 16(a) is a sectional view to schematically show the construction of MEA (membrane electrode assembly) with which a cell of a solid polyelectrolyte type fuel cell is provided.
Figure 16B:
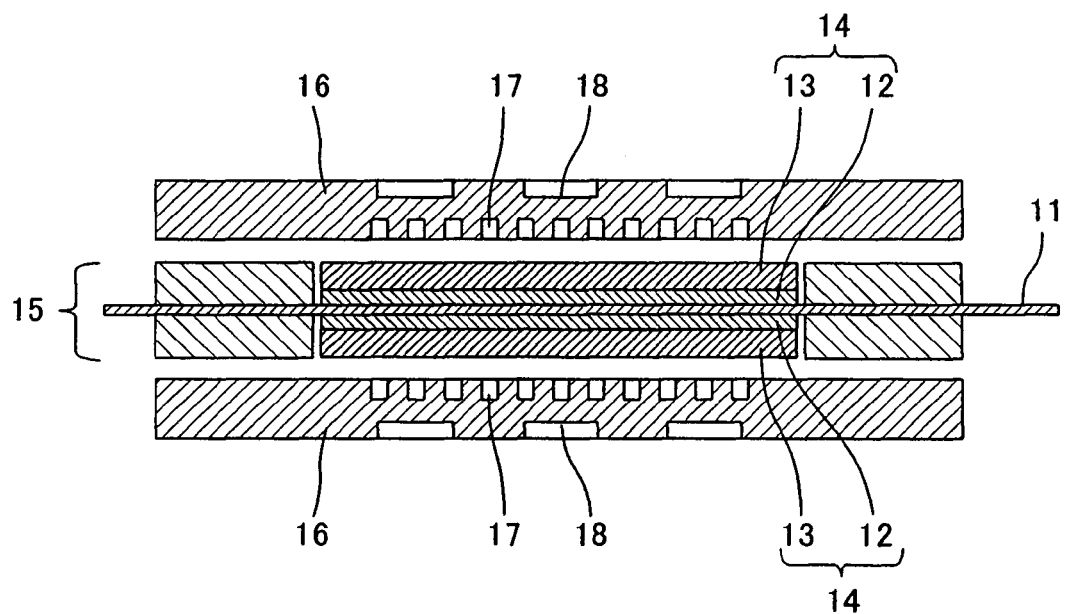
FIG. 16(b) is a sectional view to schematically show the construction of a cell provided with the MEA shown in FIG. 1.

The gas diffusion layer and catalyst layer thus obtained were welded on both surfaces of a polyelectrolyte membrane (a Nafion 112 membrane manufactured by DuPont de Nemours & Co., U.S.A.), to prepare MEA having the same construction as in that shown in FIG. 16. Here, an electrode comprising the gas diffusion layer and the catalyst layer disposed on one side of the polyelectrolyte membrane is the anode 32b, whereas an electrode comprising the gas diffusion layer and the catalyst layer disposed on the other side of the polyelectrolyte membrane is the cathode 33b.

Next, a rubber-made gasket plate was welded to a peripheral portion of the polyelectrolyte of the thus prepared MEA, to form a manifold hole through which cooling water, a fuel gas, and an oxidizing agent gas pass.

Also, a conductive separator plate made of graphite, having an outer size of 20 cm×32 cm×1.3 mm and having formed thereon a gas passage and a cooling water passage each having a depth of 0.5 mm, as obtained by impregnating with a phenol resin, was prepared. Using two separator plates, the separator plate having an oxidizing agent gas passage formed thereon was superimposed on one side of MEA, whereas the separator plate having a fuel gas passage formed thereon was superimposed on the other side of MEA, to obtain a cell.

On the surface opposite to the MEA side of the separator plate, a groove for a passage of cooling water was formed. By stacking two cells, a two cell-layered cell having a structure in which cooling water passes between the MEAs was obtained. By repeating this pattern, the fuel cell stack 301b comprising stacked 50 cells was prepared. Incidentally, at this time, a stainless steel-made collecting plate, an insulating plate of an electric insulating material, and an end plate were disposed in the both ends of the fuel cell stack 301b, and the whole was fixed by a fastening rod. At this time, the fastening pressure was 15 kgf/cm$^2$ per area of the separator plate.

Using the thus prepared fuel cell stack 301b, the following evaluation test was carried out.

First of all, the fuel gas control unit 302b fed a fuel gas obtained by modifying a 13A gas as a raw material gas by a modifier into the anode 32b, and the oxidizing agent gas control unit 303b fed air as an oxidizing agent gas into the cathode 33b. And a discharge test was carried out under the condition that the cell temperature of the fuel cell stack 301 was 70° C., the fuel gas utilization factor (Uf) was 70%, and the air utilization factor (Uo) was 40%. Incidentally, the fuel gas and air were moistened so as to have a dew point of 65° C. and 70° C., respectively.

Figure 17:
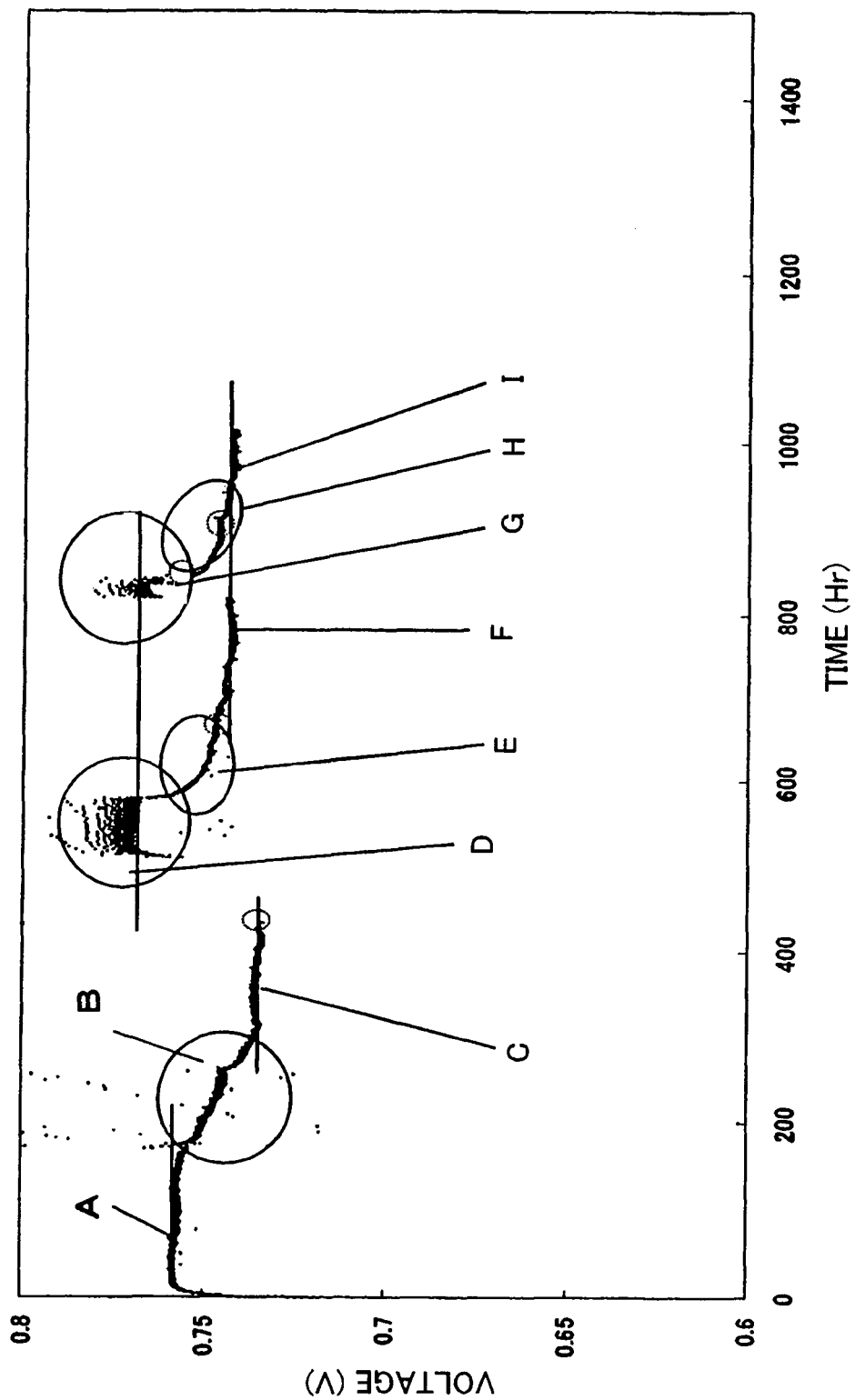
FIG. 17 is a graph to show the changes in voltage of a cell in the evaluation test.
Figure 18:
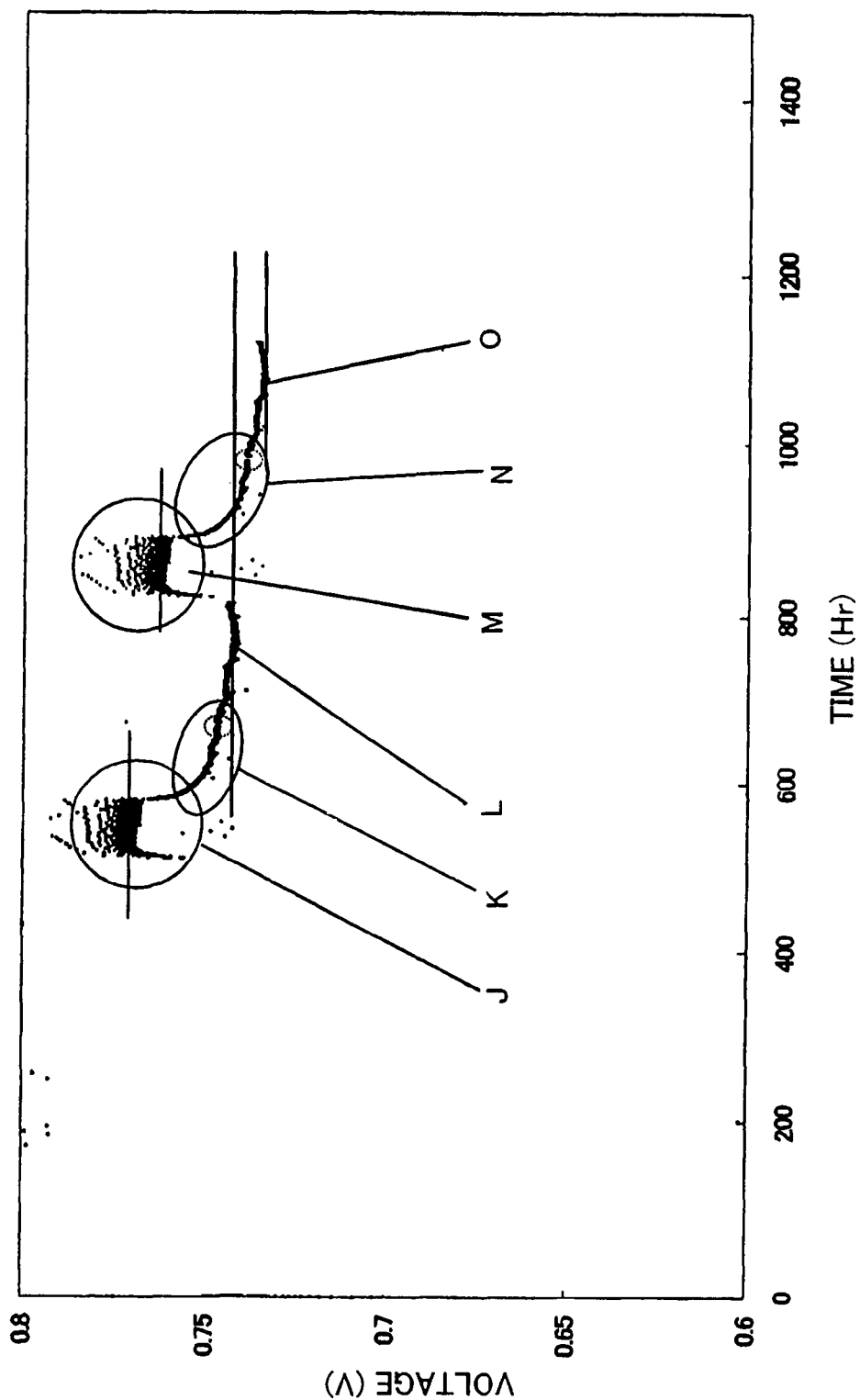
FIG. 18 is a graph to show the changes in voltage of a cell in the evaluation test.

FIGS. 17 and 18 are each a graph to show the changes in voltage of the cell 31*b* in the evaluation test. In a term A in FIG. 17, the fuel cell stack 301*b* was subjected to power generation under a continuous load with a current density of 200 mA/cm$^2$ in the state of continuously feeding a fuel gas and air into the anode 32*b* and the cathode 33*b*, respectively. The cell 31*b* had a voltage of about 0.76 V in the state of connection between the load 306*b* and the fuel cell stack 301*b*. In this term A, formed water and discharged water in the fuel cell stack 301*b* were subjected to ion analysis. As a result, the fluorine ion was not more than 0.2 µg/cm$^2$ per day. Thus, it was noted that no decomposition of the polyelectrolyte occurred.

In a term B in FIG. 17, the operation method of Embodiment 4 of the invention was carried out. The current-carrying time was 30 minutes; the time Tv when the voltage of the cell 31*b* became the open circuit voltage was 2 minutes; after a lapse of the time Tv, purge with moistened nitrogen was carried out for about 10 minutes likewise the fuel gas; and thereafter, the current carrying was restarted. Meanwhile, air was continuously fed into the cathode 33*b*. Such a series of operations was repeatedly carried out. As a result, the voltage of the cell 31*b* gradually decreases. At the time of completion of the term B about 120 hours after start of the term B, the voltage of the cell 31*b* decreased to 0.735 V. A degree of decrease in voltage of the cell 31 per one time of a series of operations was from 50 to 100 µV/1000 hours.

It is considered that the reason why the voltage of the cell 31*b* decreased in the term B resides in the event that the performance of the fuel cell stack 301*b* was deteriorated due to a decrease in reaction area by oxidation of Pt and accumulation of oxidation adsorption seeds in the cathode 33*b* and the like.

Also, in the term B, formed water and discharged water in the fuel cell stack 301*b* were subjected to ion analysis. As a result, the fluorine ion was about 1 µg/cm$^2$ per day. Thus, it was noted that decomposition of the polyelectrolyte occurred.

However, another test was carried out while setting the time Tv at 0.5 minutes in a series of operations as described previously. As a result, the degree of decrease in voltage of the cell 31*b* per one time of a series of operations was from 15 µV/time, and the amount of fluorine ion to be detected was not more than 0.5 µg/cm$^2$ per day. By shortening the time Tv to not more than one minute in this way, it was noted that there were brought effects of suppressing oxidation of Pt, adsorption of the oxidation seeds, and decomposition of the polyelectrolyte.

Figure 19:
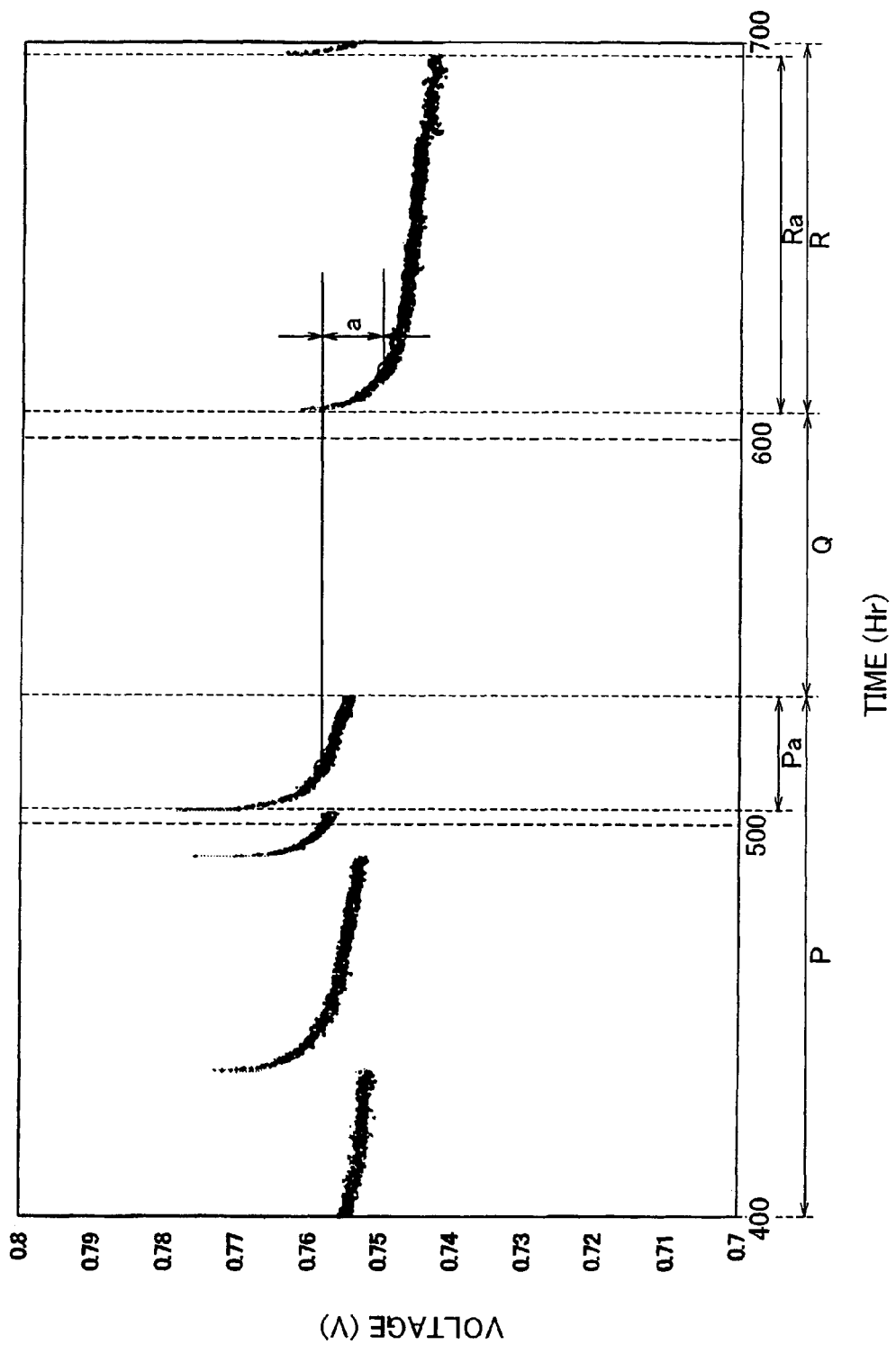
FIG. 19 is a graph to show the relationship between the time when the voltage of a cell becomes an open circuit voltage and the decrease in voltage.

Also, in still another test, the relationship between the time when the voltage of the cell 31*b* becomes the open circuit voltage and the decrease of the voltage was examined. As a result, there were obtained the results shown in FIG. 19. In FIG. 19, P and R each stands for a term when the fuel cell stack 301 is subjected to power generation under a continuous load with a current density of 200 mA/cm$^2$; and Q stands for a term when the voltage of the cell 31*b* becomes the open circuit voltage.

Incidentally, in the terms P and R, when the voltage of the cell 31*b* decreases to a prescribed value, by carrying out the recovery operation set forth in Embodiment 8 described later, a cycle of recovering the voltage of the cell 31*b* is repeated. In FIG. 19, a term Pa is a term of from recovery of the voltage of the cell 31*b* until decrease to a prescribed value and immediately before start of the term Q; and a term Ra is the same term but immediately after completion of the term Q. Also, in FIG. 19, a numeral reference a stands for a difference between an average value of the voltage of the cell 31 in the term Pa and an average value of the voltage of the cell 31*b* in the term Ra.

As shown in FIG. 19, the foregoing difference is about 8.5 mV. Also, the term Q is about 71 hours. It has been confirmed from these results that a decrease of 2 µV per minute of the time when the voltage of cell 31 became the open circuit voltage was caused.

From the viewpoint of realizing a practically useful fuel cell system, in the case where an operating time of the fuel cell system is about 10 years, it is desired that the decrease in voltage of the cell 31*b* is suppressed to not more than about 10% against the initial voltage of the cell 31*b*. Accordingly, for example, when the initial voltage of the cell 31 is defined to be 750 mV, it is desired that the decrease in voltage of the cell 31 is suppressed to not more than about 10%, i.e., not more than about 75 mV.

Now, in the case where a fuel cell system is started once A day over 10 years, start and stop of the fuel cell is carried out about 3,650 times. For this reason, for example, in the case where the time when the voltage of the cell 31*b* becomes the open circuit voltage is defined to be 10 minutes, the voltage of the cell 31 is decreased by [2 (µV/min)×10 (min)×3,650 (times)=73 mV]. Accordingly, in the case where the initial voltage of the cell 31*b* is defined to be 750 mV as described previously, in order to suppress the decrease in voltage of the cell 31*b* to not more than about 10%, i.e., not more than about 75 mV, the time when the voltage of the cell 31*b* becomes the open circuit voltage should be within 10 minutes.

In a term C in FIG. 17, the operation method was carried out in the same manner as in the term A. As a result, the voltage of the cell 31*b* at the time of completion of the term B was kept.

In a term D in FIG. 17, the operation method was carried out in the same manner as in the Embodiment 6 of the present invention. The voltages V4 and V5 shown in FIG. 13E were set up at 0.9 V and 0.5 V, respectively. Current carrying was continuously continued for 30 minutes, and feeding of air into the cathode 33*b* was stopped immediately before stopping of the load 306*b*. Thereafter, when the voltage of the cell 31*b* reached the voltage V3 (0.2 V), purge with moistened nitrogen was carried out for about 10 minutes likewise the fuel gas; feeding of the fuel gas and air was then started; and when the voltage of the cell 31*b* reached the voltage V4 (0.9 V), the current carrying was restarted. As a result of repeating such a series of operations for about 80 hours, the voltage of the cell 31*b* was kept at about 0.77 V.

It is considered that the reason why the voltage of the cell 31*b* could be kept at a relatively high value in the term D resides in the event that not only it is possible to avoid the event that the voltage of the cell 31*b* exceeds 0.9 V, and therefore, oxidation of Pt and adsorption of oxidation seeds are suppressed, but also the potential of the cathode 33*b* decreases to around 0.2 V, and therefore, it is possible to reduce and eliminate even slightly adsorbed oxidation seeds.

Also, in the term D, formed water and discharged water in the fuel cell stack 301*b* were subjected to ion analysis. As a result, the fluorine ion was not more than about 0.2 µg/cm$^2$ per day. Thus, it was noted that decomposition of the polyelectrolyte was suppressed.

In a term E in FIG. 17, the operation method was carried out in the same manner as in the term A. As a result, the voltage of the cell 31*b* gradually decreased in the term E. It is considered that this is caused from the following reasons. That is, first of all, since there is a difference in water content of the polyelectrolyte between the case of repeating current carrying and purge and the case of continuous current carrying, the wetting state of electrode is relieved, thereby resulting in a decrease in voltage of the cell 31. Secondly, even in the continuous current carrying state, since adsorption of oxidation seeds against the Pt catalyst occurs, the state gradually moves to the equilibrium adsorption state in the case of continuous current carrying, thereby resulting in a decrease in voltage of the cell 31b.

The foregoing decrease in voltage of the cell 31b was continued for a while, and the voltage of the cell 31b became stable at about 0.74 V from a point shown by an arrow reference F.

In a term G in FIG. 17, the operation method of Embodiment 5 of the invention was carried out while changing the voltage V4 shown in FIG. 13E within the range of from 0.85 to 0.92 V. As a result, the voltage of the cell 31b was kept at about 0.77 V likewise the case of the term D. Thereafter, in a term H, the operation was carried out likewise the case of the term E. As a result, the voltage of the cell 31b gradually decreased. And, likewise the case of the arrow reference F, the voltage of the cell 31b became stable at about 0.74 V from a point shown by an arrow reference I.

Also, in a term G, formed water and discharged water in the fuel cell stack 301b were subjected to ion analysis. As a result, the fluorine ion was not more than about 0.2 μg/cm² per day likewise the case of the term D. Thus, it was noted that decomposition of the polyelectrolyte was suppressed.

Even by repeating start and stop of the fuel cell stack 301b in this way, when the operation method of Embodiment 6 of the invention was carried out, it was confirmed that degradation of the fuel cell stack 301b could be prevented.

In a term J in FIG. 18, the same operation method as in the term D in FIG. 17 was carried out; and in a term K in FIG. 18, the same operation method as in the term E in FIG. 17 was carried out, respectively. As a result, the voltage of the cell 31b was kept at about 0.77 V in the term J, and thereafter, the voltage of the cell 31b gradually decreased in the term K. And the voltage of the cell 31b became stable at about 0.74 V from a point shown by an arrow reference L.

In a term M in FIG. 18, the same operation method as in the term D was carried out, except for setting up the voltage V4 shown in FIG. 8E at 0.95 V; and in a term N in FIG. 18, the same operation method as in the term E in FIG. 17 was carried out. As a result, the voltage of the cell 31b was kept at about 0.76 V in the term M, and thereafter, the voltage of the cell 31b gradually decreased in the term N. And the voltage of the cell 31b became stable at about 0.73 V from a point shown by an arrow reference O.

Thus, the voltage of the cell 31b in the term M is a value of about 0.01 V lower than that in the case of the term J. Similarly, the voltage of the cell 31b at the arrow reference O is a value of about 0.01 V lower than that in the case of the arrow reference O. It was noted from the test results that when the voltage V4 shown in FIG. 14E is set up at a value of 0.95 V in the vicinity of the open circuit voltage, the fuel cell stack 301b reveals tendency of degradation.

EXAMPLE 9

An assembly of an electrolyte membrane and electrodes (MEA) was produced with a polymer electrolyte membrane and one pair of electrodes sandwiching the electrolyte membrane. A separator plate was produced with a graphite plate by cutting gas flow paths therein. The MEA was sandwiched with one pair of separator plates to fabricate a unit cell for measuring characteristics to conduct tests.

The temperature of the unit cell was set at 70° C. A hydrogen gas having been humidified to have a dew point of 70° C. was fed to the fuel electrode, and air having been humidified to have a dew point of 70° C. was fed to the oxygen electrode, whereby electric power generation was carried out at a fuel utilization ratio of 80%, an oxygen utilization ratio of 40%, and an electric current density of 200 mA/cm².

In the case where the cell voltage was lowered to the threshold voltage value or lower, the electric power generation was continued under such a condition that air fed to the oxygen electrode was terminated, as the restoring operation, and after lowering the cell voltage to the restoring electric potential, the feed of air was restarted. In this example, the threshold voltage value was 0.75 V, and the restoring electric potential of the oxygen electrode was 0.2 V per one cell (with respect to the fuel electrode). The period of time required from termination of air until the cell voltage is lowered to the restoring electric potential was about 10 seconds.

Figure 20A:
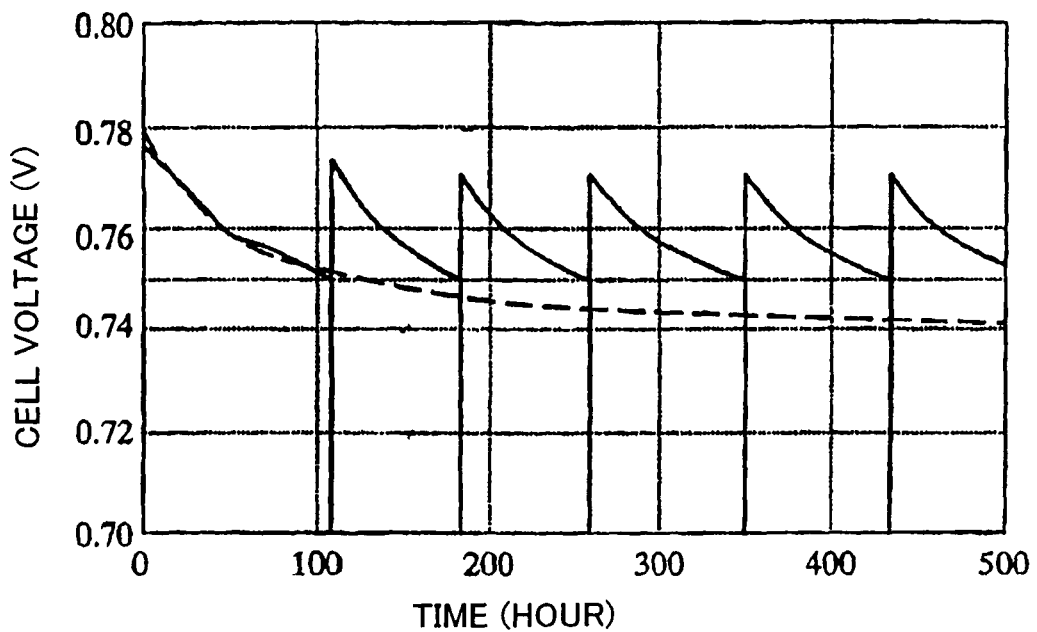
FIG. 20(a) is a graph showing time-lapse changes of cell voltages in Example 9 and a comparative example.
Figure 20B:
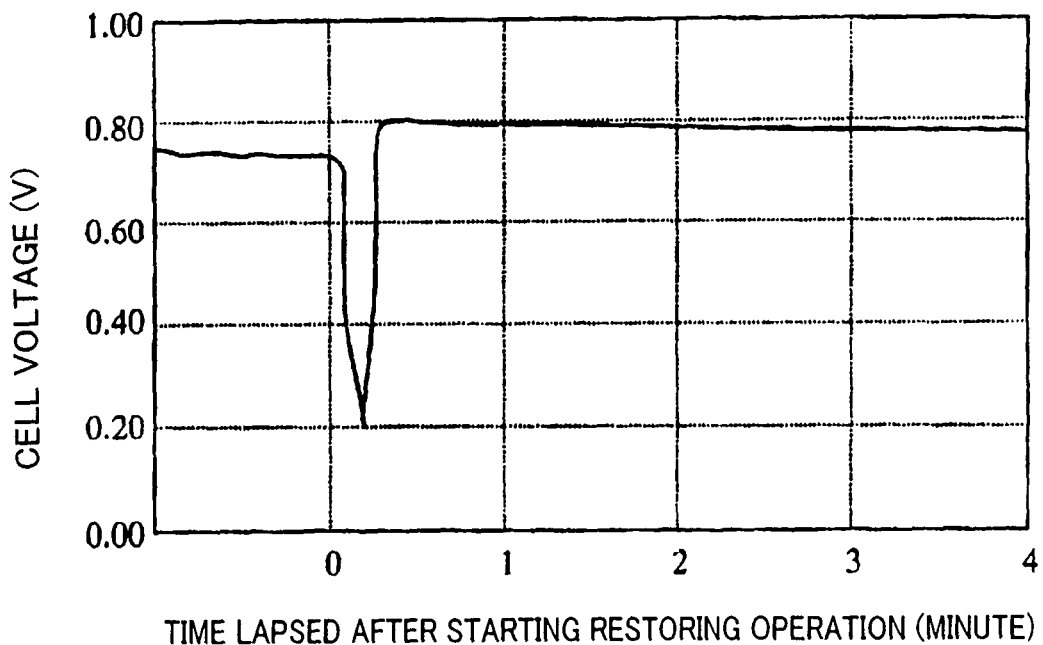
FIG. 20(b) is a graph showing behavior of a cell voltage on a restoring operation in Example 1.

FIG. 20(a) shows the time-lapse change of the cell voltage in this example with the solid line. FIG. 20(b) shows the change of the cell voltage during the restoring operation. FIG. 20(a) also shows, as a comparative example, the time-lapse change of the cell voltage in the case of continuous operation of the cell without the restoring operation. It is understood in this example that a high cell voltage can be maintained in comparison to the comparative example.

While the threshold voltage value in this example is 0.75 V, in the case where the threshold voltage value is set at a value higher than this value, the frequency of the restoring operation is increased to raise the average voltage. In the case where the threshold voltage value is set at a value lower than this value, on the other hand, the frequency of the restoring operation is decreased to lower the average voltage. The restoring operation in both cases can be carried out in the similar manner as in this example.

While the restoring electric potential of the oxygen electrode in this example was 0.2 V (with respect to the fuel electrode), the same effect was obtained when the restoring electric potential was changed within a range of 0.1 to 0.4 V (with respect to the fuel electrode). While the restoring operation was carried out when the cell voltage was lowered to the threshold voltage value or lower in this example, the same effect can be obtained when the restoring operation is carried out after lapsing a prescribed period of time from the preceding restoring operation, for example, every 48 hours.

EXAMPLE 10

A unit cell was constituted in the same manner as in Example 9, and electric power generation was carried out in the same manner as in Example 9.

In the case where the cell voltage was lowered to the threshold voltage value or lower, the electric power generation was continued under such a condition that the feeding amount of air to the oxygen electrode was decreased, as the restoring operation, and after lowering the cell voltage to the restoring electric potential, the feeding amount of air was restored. In this example, the threshold voltage value was 0.75 V, and the restoring electric potential of the oxygen electrode was 0.2 V per one cell (with respect to the fuel electrode). The feeding amount of air upon the restoring operation was such an amount that the oxygen utilization ratio was 100%, i.e., the value obtained by dividing four times the number of electrons flowing in the cell in a unit time by the number of oxygen molecules fed to the cell in a unit time was 100%.

Figure 21A:
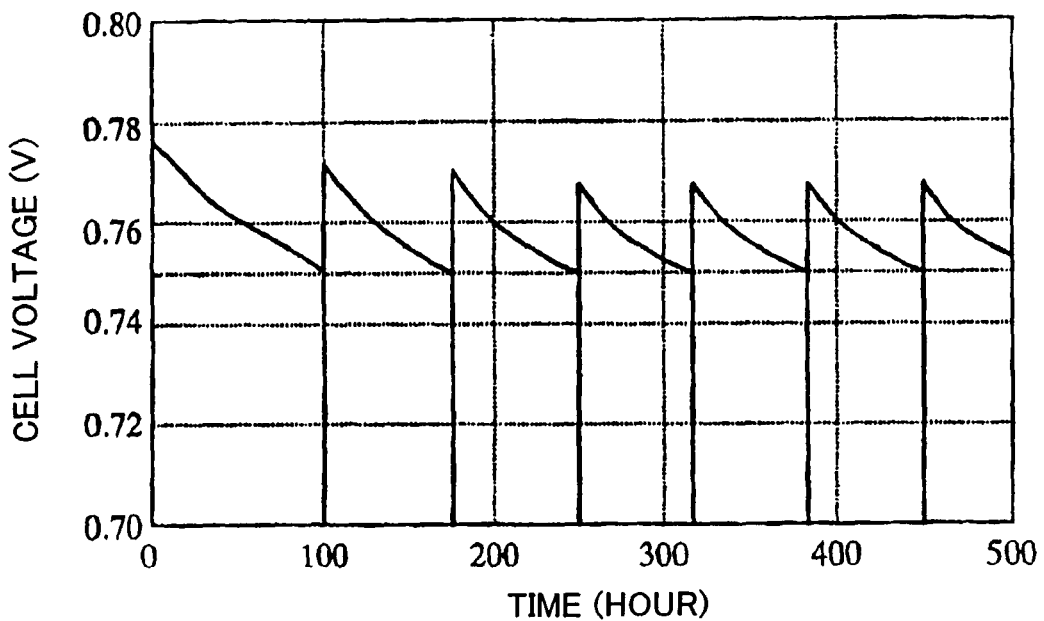
FIG. 21(a) is a graph showing a time-lapse change of a cell voltage in Example 10.

The period of time required from the decrease of the feeding amount of air until the cell voltage is lowered to the restoring electric potential was about 30 seconds. FIG. 21(a) shows the time-lapse change of the cell voltage in this example. A high cell voltage could be maintained similarly to Example 9. While the oxygen utilization ratio was 100% in this example, the same effect as in the case where the period of time until the cell voltage is lowered to the restoring electric potential was changed was obtained even in the case where the oxygen utilization ratio was changed from 70 to 120%.

EXAMPLE 11

60 of unit cells each having the same constitution as in Example 9 were accumulated to fabricate a stack. A fuel cell having the constitution described with reference to FIGS. 1 and 2 was produced by using the stack. Electric power generation was carried out under the same conditions as in Example 9, and the restoring operation was carried out every 48 hours. The restoring operation was carried out in such a manner that electric power generation was continued under such a condition that the feed of air to the cells of the stack was terminated one by one by using a gas blocking means provided in an air feeding manifold of the stack, and after the cell voltage of the cell, to which the feed of air had been terminated, was lowered to the restoring electric potential, the feed of air to the subsequent cell was terminated to restore the subsequent cell, whereby the cells were sequentially restored. The restoring electric potential of the oxygen electrode was 0.2 V (with respect to the fuel electrode) per one cell.

Figure 21B:
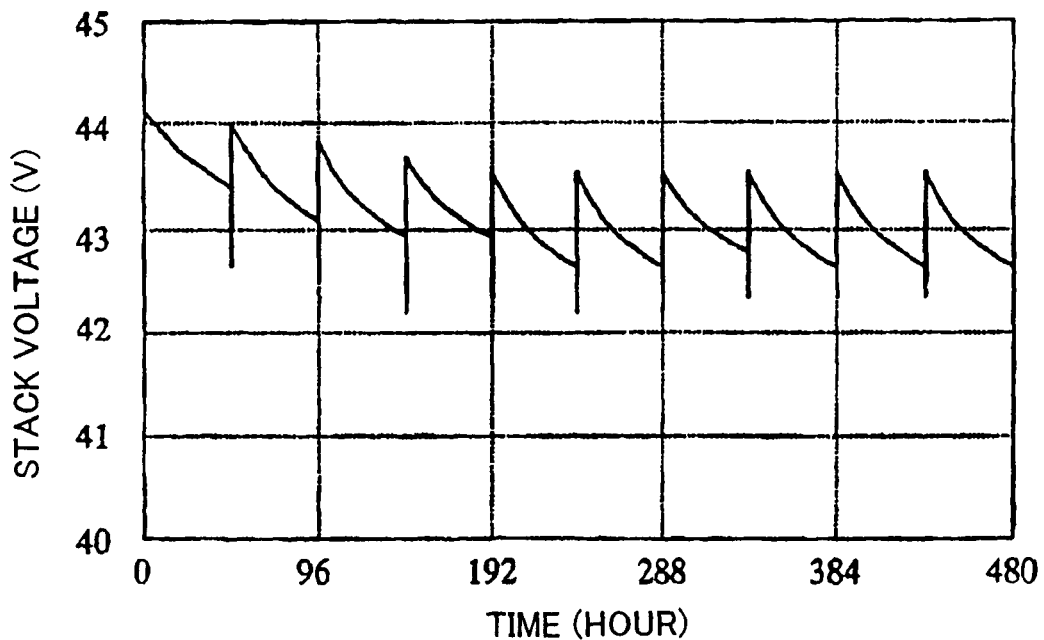
FIG. 21(b) is a graph showing a time-lapse change of a stack voltage in Example 11.

FIG. 21(*b*) shows the time-lapse change of the voltage of the entire stack. Since the restoring operation was carried out for the respective cells constituting the stack in this example, the restoring operation of all the cells can be certainly completed, and the system using the fuel cell can be continuously operated because the voltage of the entire stack is not largely decreased even upon the restoring operation.

While the restoring operation is carried out by terminating the feed of air to every cell, the same effect can be obtained by terminating feed of air to plural cells to effect the restoring operation.

EXAMPLE 12

Figure 22:
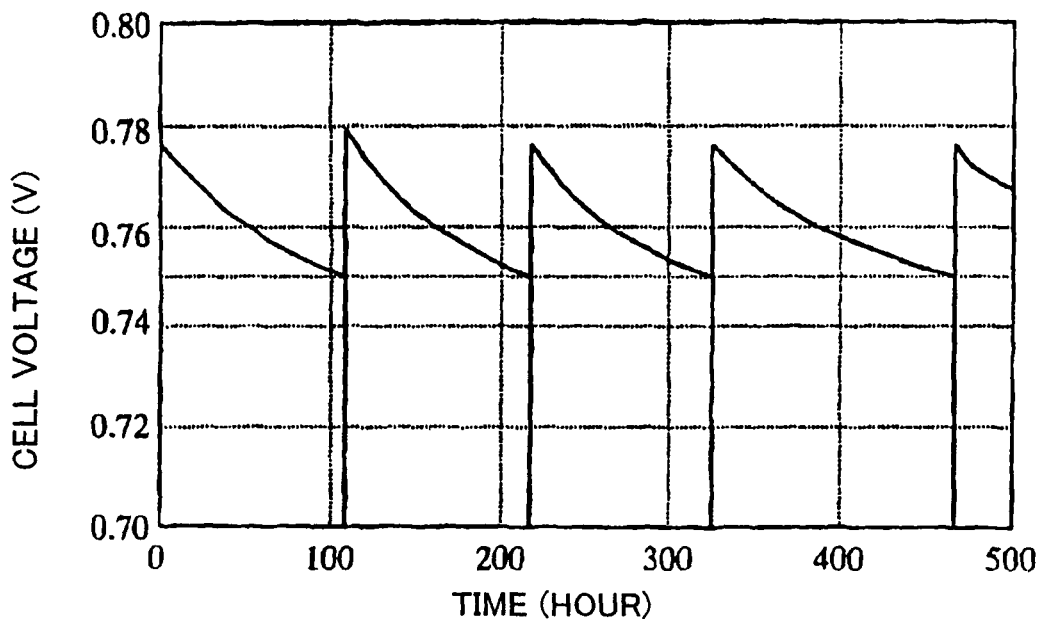
FIG. 22 is a graph showing a time-lapse change of a cell voltage in Example 12.

A unit cell was constituted in the same manner as in Example 9, and electric power generation was carried out in the same manner as in Example 9. As the restoring operation, the electric current was terminated, and nitrogen as the inert gas was fed to the oxygen electrode instead of air which had been fed to the oxygen electrode, and after lowering the cell voltage to the restoring electric potential, the feed of air was restarted. The threshold voltage value was 0.75 V, and the restoring electric potential of the oxygen electrode was 0.2 V per one cell (with respect to the fuel electrode). The feeding amount of nitrogen was the same as the feeding amount of air. FIG. 22 shows the time-lapse change of the cell voltage. A high cell voltage could be maintained as similar to Example 9.

While nitrogen is used as the inert gas in this example, the same effect is obtained by feeding a desulfurized city gas or water vapor. While the electric power generation is terminated upon the restoring operation in this example, the same effect is obtained when the electric power generation is continued.

EXAMPLE 13

Figure 23:
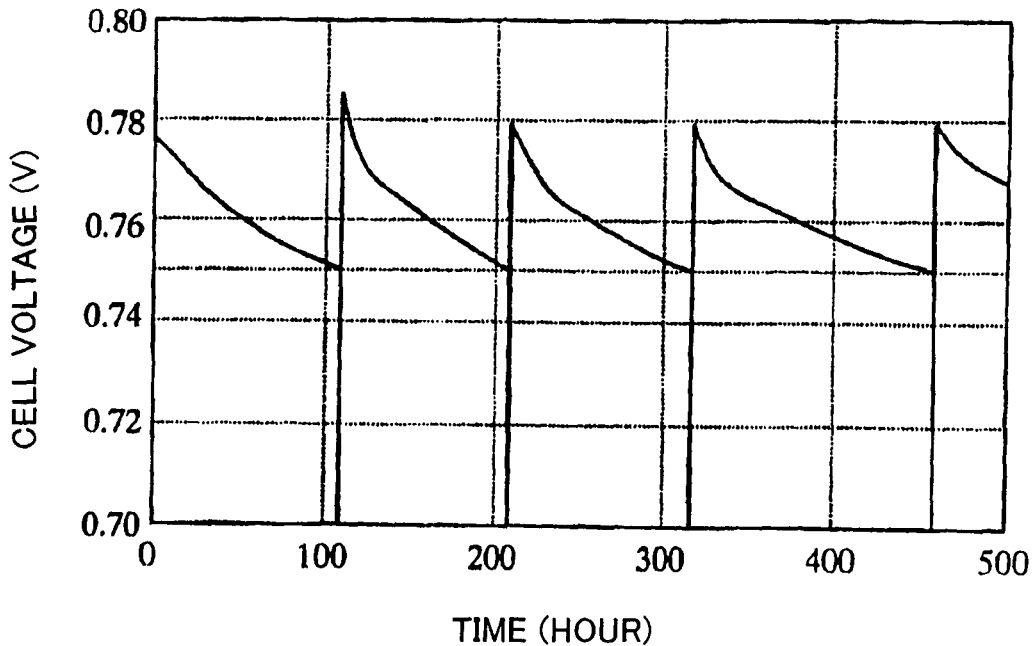
FIG. 23 is a graph showing a time-lapse change of a cell voltage in Example 13.

A unit cell was constituted in the same manner as in Example 9, and electric power generation was carried out in the same manner as in Example 9. As the restoring operation, the electric current was terminated, and water was fed to the oxygen electrode instead of air which had been fed to the oxygen electrode, and after lowering the cell voltage to the restoring electric potential, the feed of air was restarted. The threshold voltage value was 0.75 V, and the restoring electric potential of the oxygen electrode was 0.2 V per one cell (with respect to the fuel electrode). The feeding amount of water was the same as such an amount that fills the gas flow path of the cell. FIG. 23 shows the time-lapse change of the cell voltage. A high cell voltage could be maintained as similar to Example 9.

EXAMPLE 14

A stack was fabricated by accumulating 60 unit cells as similar to Example 11. Electric power generation was carried out under the same conditions as in Example 9, and the restoring operation was carried out every 48 hours. The restoring operation was carried out in such a manner that water was fed to every two cells in the stack by using a water feeding means provided in the air feeding manifold of the stack, and after the cell voltage of the cell, to which water had been fed, was lowered to the restoring electric potential (with respect to the fuel electrode), water was fed to the other cells to restore them, whereby the cells were sequentially restored. The restoring electric potential of the oxygen electrode was 0.2 V (with respect to the fuel electrode) per one cell.

Figure 2:
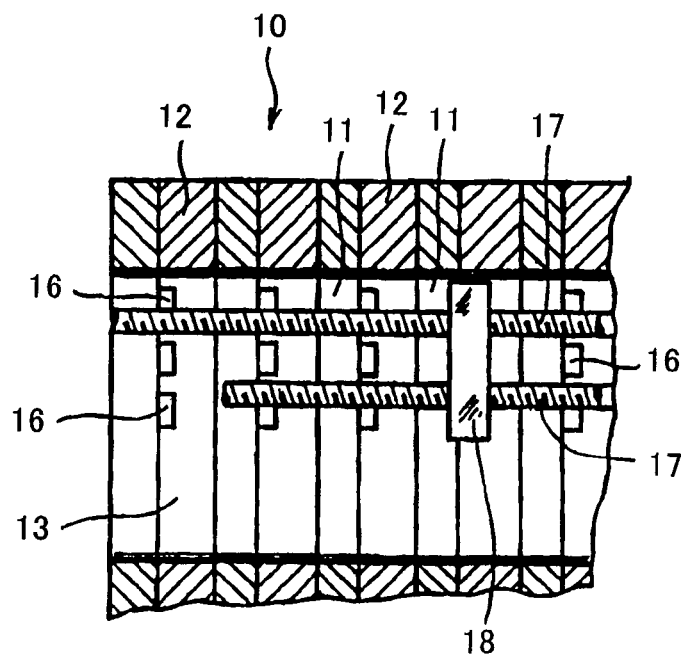
FIG. 2 is a cross sectional view of the embodiment shown in FIG. 1 on line II II'.
Figure 24:
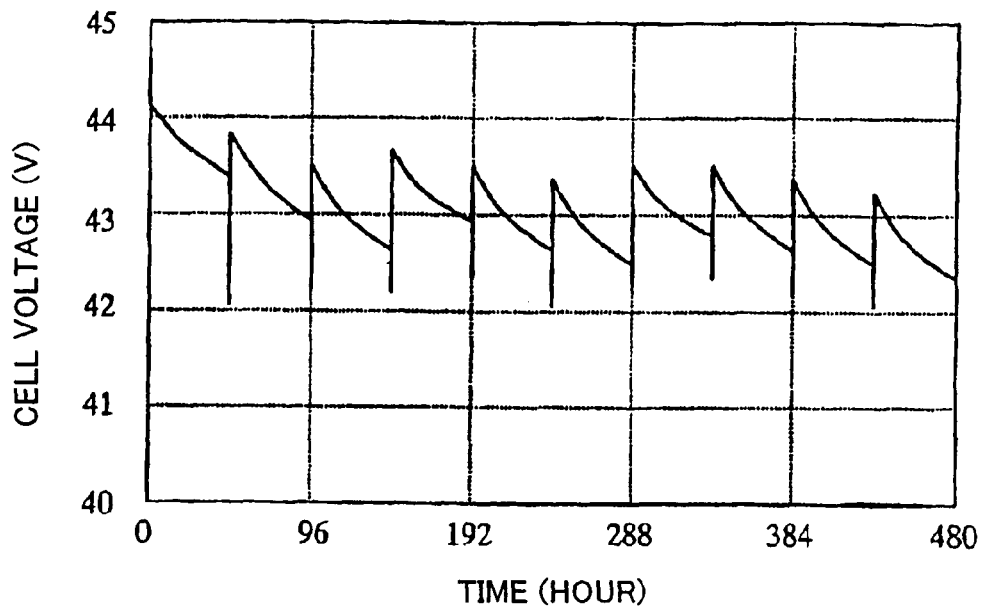
FIG. 24 is a graph showing a time-lapse change of a stack voltage in Example 14.

The water feeding means was constituted in such a manner that a water feeding pipe 19 was provided as shown in FIG. 1, and water was poured from the pipe to the gas flow paths 16 of the adjacent two cells through the manifolds. FIG. 24 shows the time-lapse change of the voltage of the entire stack. According to this example, the restoring operation could be carried out without large decrease of the voltage of the entire stack as similar to Example 11.

EXAMPLE 15

A unit cell was constituted in the same manner as in Example 9, and electric power generation was carried out in the same manner as in Example 9. As the restoring operation, the electric current was terminated, and aqueous solution containing 1% of a sodium borohydride was fed to the oxygen electrode instead of air which had been fed to the oxygen electrode, and after lowering the cell voltage to the restoring electric potential (with respect to the fuel electrode), the feed of air was restarted. The threshold voltage value was 0.75 V, and the restoring electric potential of the oxygen electrode was 0.2 V per one cell (with respect to the fuel electrode). The feeding amount of the aqueous solution was the same as such an amount that fills the gas flow path of the cell.

Figure 25:
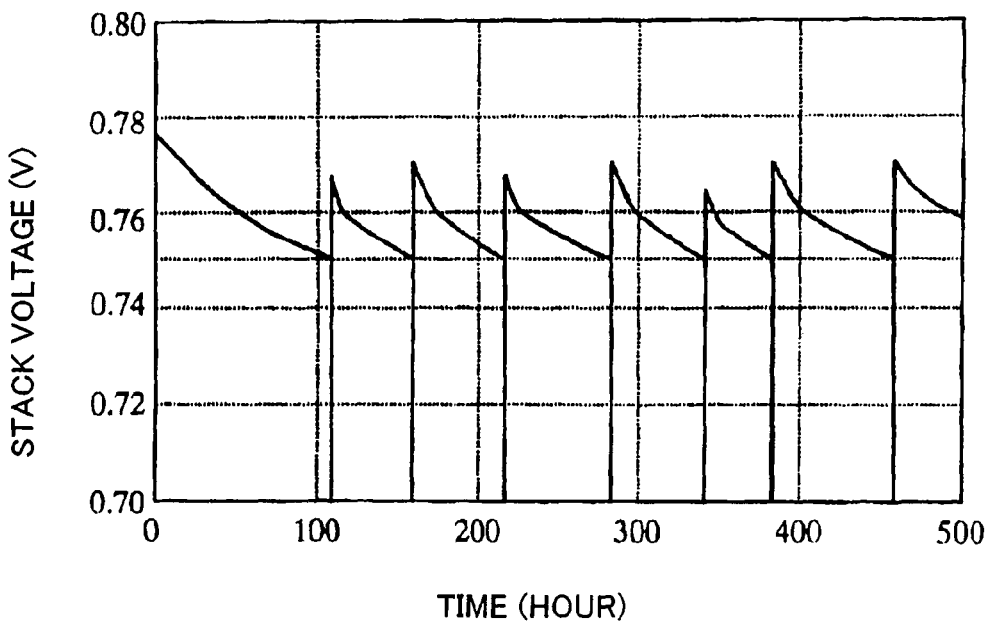
FIG. 25 is a graph showing a time-lapse change of a cell voltage in Example 15.

FIG. 25 shows the time-lapse change of the cell voltage in this example. A high cell voltage could be maintained as similar to Example 9. While a sodium borohydride aqueous solution is used in this example, the same effect is obtained by feeding an aqueous solution containing hydrazine instead.

EXAMPLE 16

Figure 26:
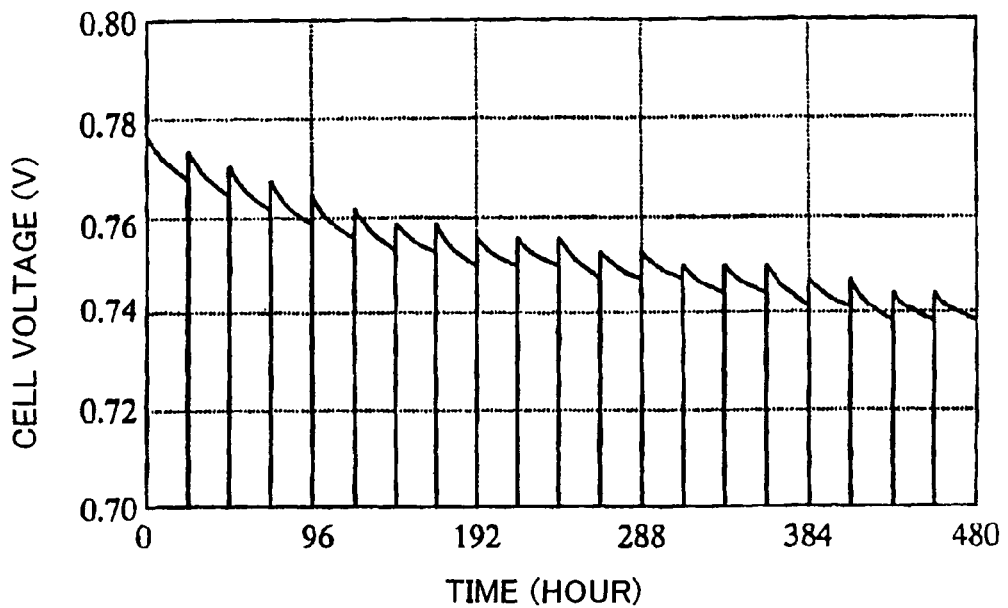
FIG. 26 is a graph showing a time-lapse change of a cell voltage in Example 16.

A unit cell was constituted in the same manner as in Example 9, and electric power generation was carried out in the same manner as in Example 9. As the restoring operation, electric power generation was continued by increasing twice the feeding amount of hydrogen and increasing twice the electric current every 24 hours, and after 30 seconds, the feeding amount of hydrogen and the electric current were restored. Upon the restoring operation, the cell voltage was temporarily lowered to 0.6 V. FIG. 26 shows the time-lapse change of the cell voltage in this example. A high cell voltage could be maintained as similar to Example 9.

EXAMPLE 17

Figure 27:
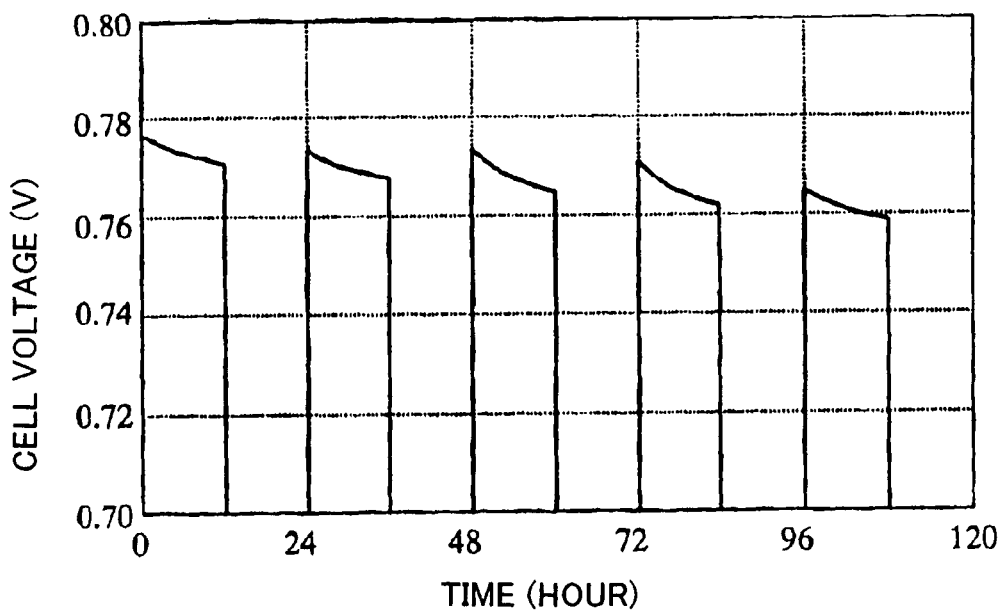
FIG. 27 is a graph showing a time-lapse change of a cell voltage in Example 17.

A unit cell was constituted in the same manner as in Example 9, and electric power generation was carried out in the same manner as in Example 9. Every 12 hours, the electric current was terminated, and nitrogen as the inert gas was fed to the oxygen electrode instead of air which had been fed to the oxygen electrode. After lowering the cell voltage to the restoring electric potential (with respect to the fuel electrode), the feed of hydrogen to the hydrogen electrode was terminated, and nitrogen was also fed to the hydrogen electrode to effect purge. Thereafter, the feed of gases to both the electrodes was terminated. The cell was cooled to room temperature in a forced manner or by standing. After 12 hours from the termination of the operation, the feed of hydrogen and air was restarted under heating the cell to 70° C., so as to restart electric power generation. Upon repeating the foregoing procedures, a high cell voltage could be maintained. FIG. 27 shows the time-lapse change of the cell voltage in this example.

According to the invention as described in the foregoing, the high generation effeciency is maintained for a long period of time by carrying out a restoring operation for restoring the generated voltage by decreasing the electric potential of the oxygen electrode upon decreasing of the generated voltage of the fuel cell.

EXAMPLE 18

Example 18 will be described below by referring to FIG. 6 and FIG. 7.

As Example 1, the fuel cell stack 301*a* was prepared in the following manner.

Acetylene black (Denka Black manufactured by Denki Kagaku Kogyo Kabushiki Kaisha, particle size: 35 nm) as a carbon powder was mixed with an aqueous dispersion of polytetrafluoroethylene (PTFE) (D1 manufactured by Daikin Industries, Ltd.), to prepare a water repellent ink containing 20% by weight of PTFE in terms of dry weight. This ink is coated on carbon paper (TGPH060H manufactured by Toray Industries, Inc.) as a substrate of a gas diffusion layer, dipped and then heat treated at 300° C. using a hot-air dryer, to form a gas diffusion layer having a thickness of about 200 μm.

On the other hand, 66 parts by weight of a catalyst substance (containing 50% by weight of Pt) obtained by carrying a Pt catalyst on Ketjenblack (Ketjecnblack EC manufactured by Ketjen Black International Company, particle size: 30 nm) as a carbon powder was mixed with 33 parts by weight of a perfluorocarbon sulfonic acid ionomer (a 5% by weight dispersion of Nafion manufactured by Aldrich Chemical Corporation, U.S.A.) (in terms of polymer dry weight) as a hydrogen ion conducting material and a binder, and the resulting mixture was molded to form a catalyst layer having a thickness of from 10 to 20 μm.

The gas diffusion layer and catalyst layer thus obtained were welded on the both surfaces of a polyelectrolyte membrane (a Nafion 112 membrane manufactured by DuPont de Nemours & Co., U.S.A.), to prepare MEA having the same construction as in that shown in FIG. 16. Here, an electrode comprising the gas diffusion layer and the catalyst layer disposed on one side of the polyelectrolyte membrane is the anode 32*a*, whereas an electrode comprising the gas diffusion layer and the catalyst layer disposed on the other side of the polyelectrolyte membrane is the cathode 33*a*.

Next, a rubber-made gasket plate was welded to a peripheral portion of the polyelectrolyte membrane of the thus prepared MEA, to form a manifold hole through which cooling water, a fuel gas, and an oxidizing agent gas pass.

Also, a conductive separator plate made of graphite, having an outer size of 20 cm×32 cm×1.3 mm and having formed thereon a gas passage and a cooling water passage each having a depth of 0.5 mm, as obtained by impregnating with a phenol resin, was prepared. Using two separator plates, the separator plate having an oxidizing agent gas passage formed thereon was superimposed on one side of MEA, whereas the separator plate having a fuel gas passage formed thereon was superimposed on the other side of MEA, to obtain a cell.

On the surface opposite to the MEA side of the separator plate, a groove for a passage of cooling water was formed. By stacking two cells, a two cell-layered cell having a structure in which cooling water passes between the MEAs was obtained. By repeating this pattern, the fuel cell stack 301*a* comprising stacked 50 cells was prepared. Incidentally, at this time, a stainless steel-made collecting plate, an insulating plate of an electric insulating material, and an end plate were disposed in the both ends of the fuel cell stack 301*a*, and the whole was fixed by a fastening rod. At this time, the fastening pressure was 10 kgf/cm$^2$ per area of the separator plate.

Using the thus prepared fuel cell stack 301*a*, the following evaluation test was carried out.

First of all, the fuel gas control unit 302*a* fed a fuel gas obtained by modifying a 13A gas as a raw material gas by a modifier into the anode 32*a*, and the oxidizing agent gas control unit 303*a* fed air as an oxidizing agent gas into the cathode 33*a*. And a discharge test was carried out under the condition that the cell temperature of the fuel cell stack 301*a* was 70° C., the fuel gas utilization factor (Uf) was 75%, and the air utilization factor (Uo) was 40%. Incidentally, the fuel gas and air were moistened so as to have a dew point of 65° C. and 70° C., respectively.

In the state in which air and the fuel gas were continuously fed, by repeating the state that the fuel cell stack 301*a* caused power generation at a continuous load with a current density of 200 mA/cm$^2$ and the non-power generation state, a voltage of each cell 31*a* of the fuel cell stack 301*a* before and after start and stop of the power generation was measured.

Figure 28:
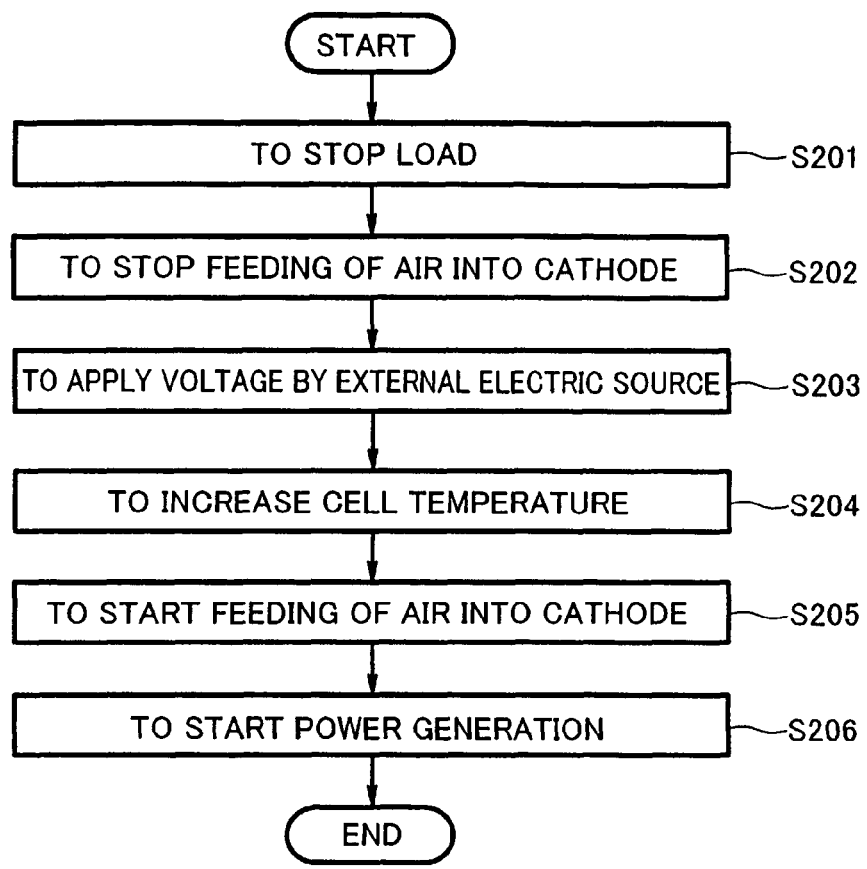
FIG. 28 is a flow chart to show the flow of operation of a fuel cell system in the evaluation test of Example 1.

FIG. 28 is a flow chart to show the flow of operation of the fuel cell system in the evaluation test of Example 1. First all, the fuel cell stack 301*a* was made to cause power generation, an electric power was fed against the load 306*a* for one hour, and the load 306*a* was then stopped (S201). Next, the control unit 305*a* controlled the motions of the oxidizing agent gas control unit 303*a* so as to stop feeding of air into the cathode 33*a* of each cell 31*a* (S202). At this time, feeding of the fuel gas into the anode 32*a* was continued.

Next, a prescribed voltage was applied between the anode 32*a* and the cathode 33*a* of each cell 31 using the external electric source 307*a* such that a potential difference between the anode 32*a* and the cathode 33*a* became a prescribed value (S203).

The state in which the potential difference between the anode 32*a* and the cathode 33*a* became a prescribed value as described previously was continued for one hour. As a result, the cell temperature of the fuel cell stack 301*a* dropped to 40° C.

Thereafter, the cell temperature of the fuel cell stack 301*a* was increased (S204); when the cell temperature reached 65° C., the control unit 305*a* controlled the motions of the oxidizing agent gas control unit 303*a* so as to feed air into the cathode 33*a* (S205); and power generation of the fuel cell stack 301*a* was started (S206).

The foregoing steps of from S201 to S206 were repeated, thereby repeating start and stop of the fuel cell stack 301a.

Figure 29:
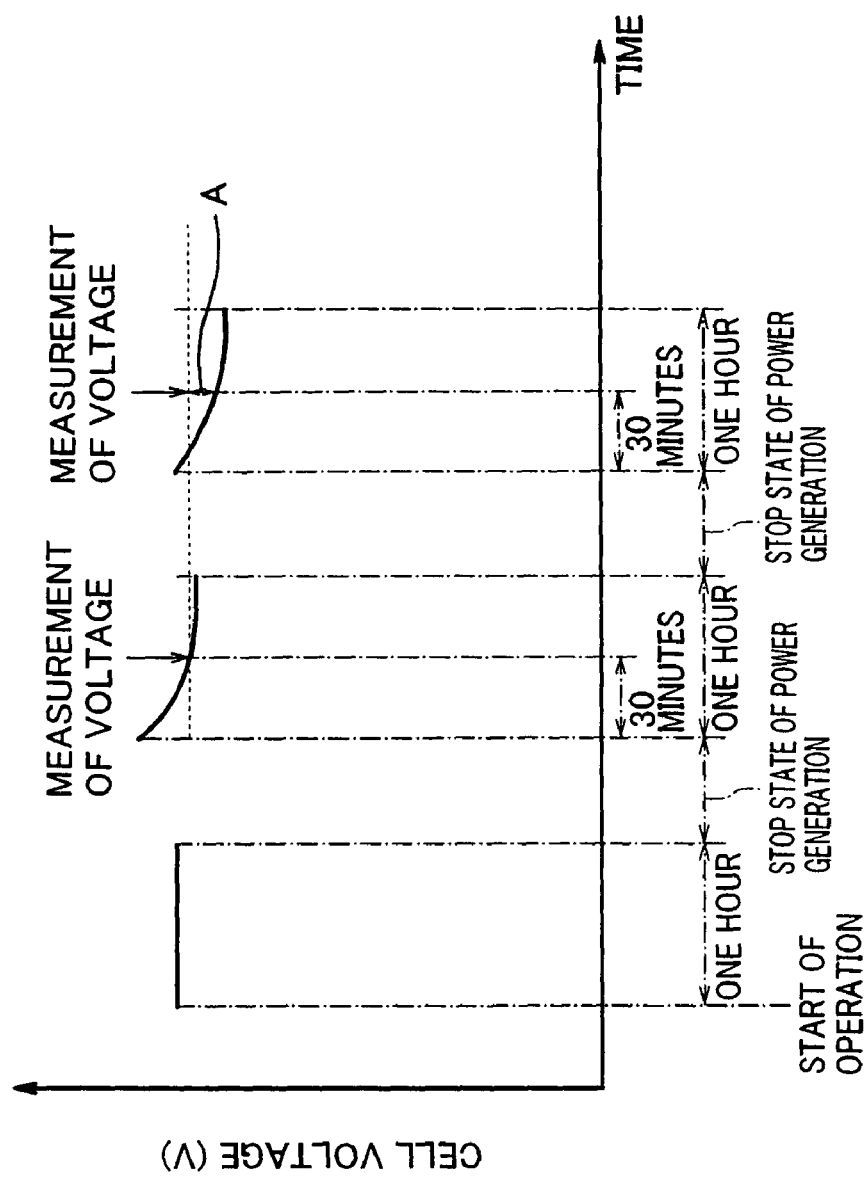
FIG. 29 is an explanatory graph at the time of measuring a voltage of a cell.

FIG. 29 is an explanatory graph at the time of measuring a voltage of a cell 31a. In FIG. 29, the ordinate stands for a voltage of the cell 31a, and the abscissa stands for an elapsed time, respectively. As described previously, one hour after starting the power generation of the fuel cell stack 301a, the power generation was stopped, and thereafter, when the cell temperature of the fuel cell stack 301a reached 65° C., the power generation was started. And, as shown in FIG. 29, 30 minutes after starting the power generation, a voltage of the cell 31a was measured.

In FIG. 29, A stands for a reduction amount of voltage as a difference in voltage of the cell 31a between the preceding measurement time and the present measurement time. Here, a reduction amount of voltage per start and stop of the fuel cell stack 301a is defined as a voltage deterioration factor.

The steps of from S201 to S206 were repeated 200 times in the prescribed step S203 while setting a voltage to be applied between the anode 32a and the cathode 33a, in other words, a voltage held by the cell 31a, at 0.2 V, 0.4 V, 0.6 V, 0.7 V, 0.8 V and 0.9 V, respectively. As a result, the relationship between the holding voltage and the voltage deterioration factor of the resulting cell 31 is shown in Table 1.

TABLE 1

| | Holding voltage (V) | | | | | |
|---|---|---|---|---|---|---|
| | 0.2 | 0.4 | 0.6 | 0.7 | 0.8 | 0.9 |
| Voltage deterioration factor (μV/time) | 28 | 26 | 9 | 4 | 10 | 150 |

As is clear from Table 1, when the holding voltage of the cell 31a exceeds 0.8 V, the voltage before and after start and stop of the fuel cell stack 301a is greatly lowered. Also, in this case, since reduction of Pt does not occur in the cathode 33a, recovery of the catalytic activity does not occur. Accordingly, by repetition of start and stop of the fuel cell stack 301a, deterioration of the voltage of the cell 31a proceeds.

On the other hand, when the holding voltage of the cell 31a is not more than 0.7 V, since recovery of the catalytic activity occurs due to reduction of Pt of the cathode 33a before and after start and stop of the fuel cell stack 301a, the voltage of the cell 31a rises immediately after starting the power generation of the fuel cell stack 301a. Also, when the holding voltage of the cell 31a is not more than 0.6 V, the similar recovery of the catalytic activity is remarkable.

However, by repetition of start and stop of the fuel cell stack 301a, there is confirmed a phenomenon in which the degree of recovery is gradually lowered. It is considered that this is caused by the degradation of the Pt catalyst by repetition of oxidation and reduction of Pt. For this reason, in the case where the holding voltage of the cell 31a is smaller than 0.6 V, the deterioration of the voltage of the cell 31a proceeds.

In the case of this embodiment, as described previously, when the fuel cell stack 301a stops the power generation, a voltage of from 0.6 V to 0.8 V is applied between the anode 32a and the cathode 33a using the external electric source 307a. In this case, though the foregoing recovery of the catalytic activity is small as compared with the case where the holding voltage of the cell 31a is less than 0.6 V, since the voltage deterioration factor is low, not more than 10 μV/time, it is considered that the degradation of the fuel cell stack 301a is smallest in the long term.

EXAMPLE 19

In the fuel cell power generation system according to Embodiment 2, when the fuel cell stops power generation, a potential of the cathode is controlled only for a prescribed period of time, and thereafter, the anode and the cathode are purged with air. Incidentally, when the purge is carried out using an inert gas such as nitrogen as in the related art, a gas cylinder of an inert gas is necessary, leading to problems such as enlargement in size of the fuel cell system. However, according to this embodiment, since the purge is carried out using air, such problems do not occur.

Figure 30:
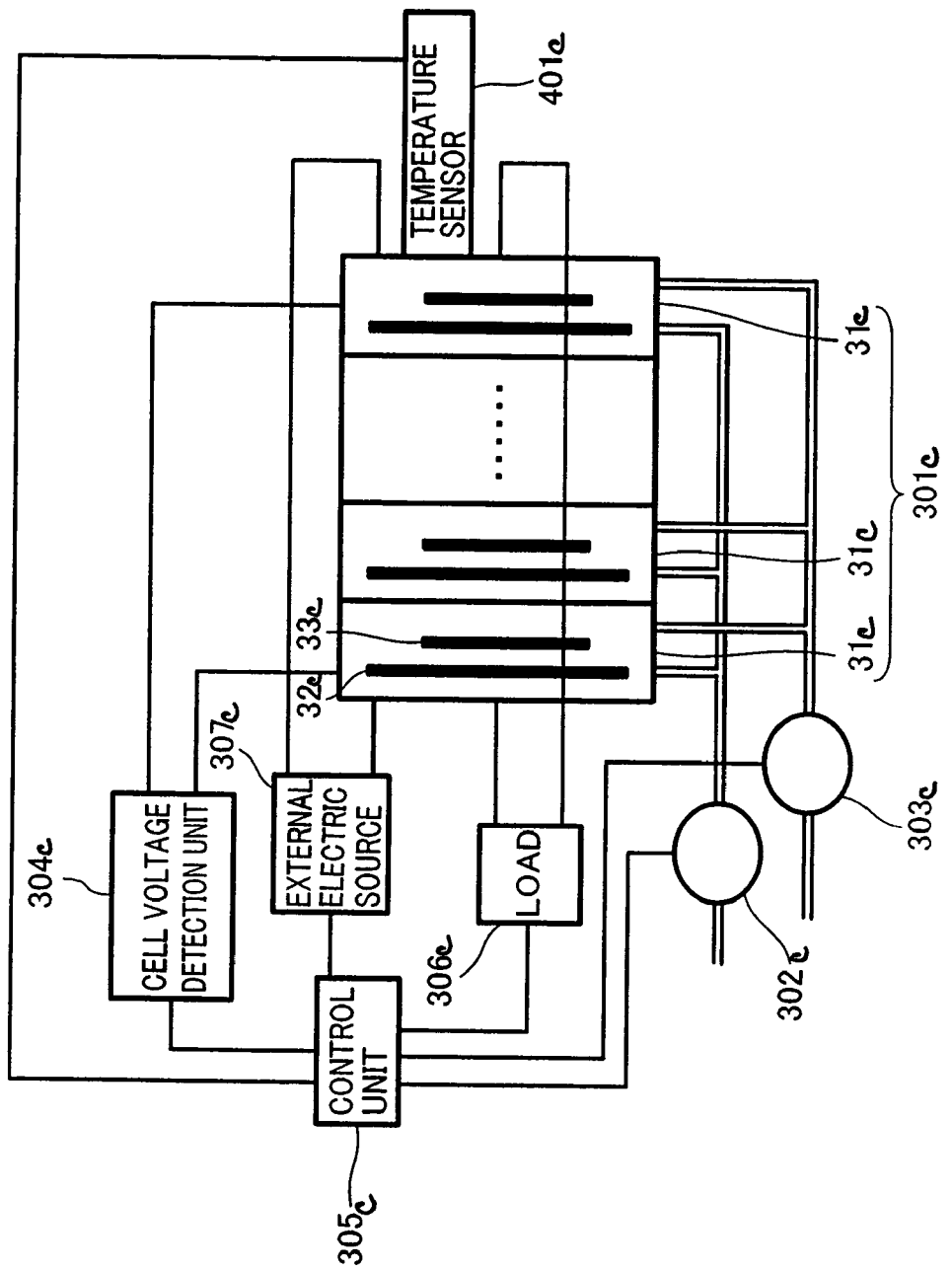
FIG. 30 is a block diagram to show one example of the construction of a fuel cell system according to Embodiment 2 of the invention.

FIG. 30 is a block diagram to show one example of the construction of the fuel cell system according to Embodiment 2 of the invention. In FIG. 30, 401c stands for a temperature sensor for detecting the cell temperature of the fuel cell stack 301c. The temperature sensor 401 is connected to the control unit 305c. The control unit 305c receives a signal showing the cell temperature of the fuel cell stack 301c output from the temperature sensor 401c and on a basis of the received signal, stops the processing for controlling the potential of the cathode and purges with air the anode 32c and the cathode 33c with air as described later.

The system construction shown in FIG. 30 is an example in which in the case of controlling the potential of the cathode 33c, the voltage of the whole of the fuel cell stack 301c is controlled. However, needless to say, there may be employed a system construction in which the voltage of each cell 31c can be controlled similarly to the case of Embodiment 1.

Incidentally, since other constructions of the fuel cell system of this embodiment are the same as in Embodiment 1, explanation thereof is omitted.

In the fuel cell system thus constructed of this embodiment, after the fuel cell stack 301c stops power generation, a fuel gas is fed into the anode 32c, and a prescribed voltage is applied between the anode 32c and the cathode 33c using the external electric source 307 similarly to the case of Embodiment 1. Thereafter, in the fuel cell system of this embodiment, when the cell temperature of the fuel cell stack 301c drops to a prescribed temperature, the anode 32c and the cathode 33c of the cell 31 are purged with air.

Figure 31:
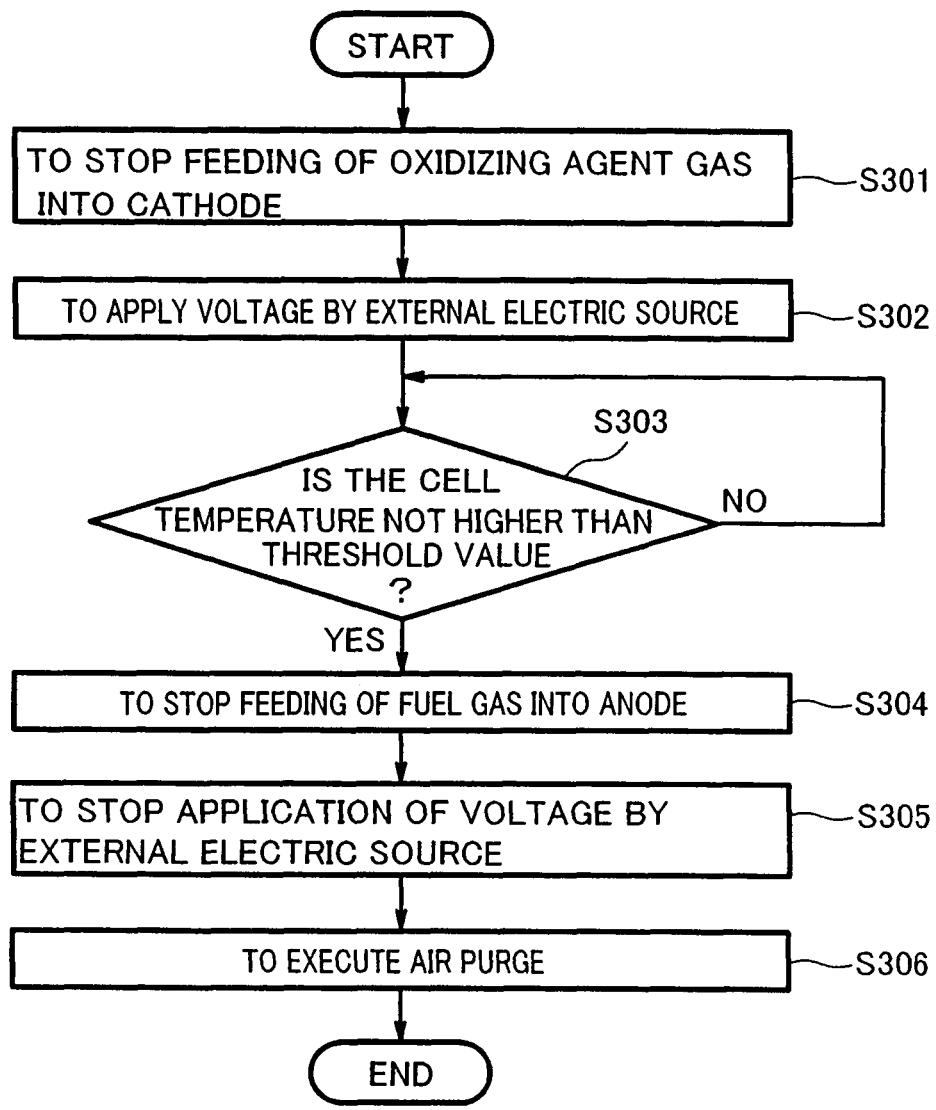
FIG. 31 is a flow chart to show the processing procedures of a control unit with which a fuel cell system according to Embodiment 2 of the invention is provided in the case where a fuel cell stack stops power generation.

FIG. 31 is a flow chart to show the processing procedures of the control unit 305c with which the fuel cell system according to Embodiment 2 of the invention is provided in the case where the fuel cell stack stops power generation. First of all, similarly to the case of Embodiment 1, the control unit 305c controls the motions of the oxidizing agent gas control unit 303c so as to stop feeding of the oxidizing agent gas into the cathode 33c (S301) and then controls the motions of the external electric source 307c so as to apply a voltage of 0.6 V to 0.8 V between the anode 32c and the cathode 33c (S302). As a result, the cathode 33 of each cell 31c has a potential of from about 0.6 V to 0.8 V against SHE.

Next, the control unit 305c specifies the cell temperature of the fuel cell stack 301c on a basis of a signal output from the temperature sensor 401c at a proper timing and judges whether or not the cell temperature is below a prescribed threshold value (S303).

In the step S303, in the case where the cell temperature of the fuel cell stack 301c is judged to be higher than the prescribed threshold value (NO in S303), the control 305c again executes the step S303 on a basis of a signal output from the temperature sensor 401c. On the other hand, in the case where the cell temperature of the fuel cell stack 301 is judged to be below the prescribed threshold value (YES in S303), the control unit 305c controls the motions of the fuel gas control unit 302c so as to stop feeding of the fuel gas into the anode 32c (S304) and controls the motions of the external electric source 307c so as to stop application of a voltage between the anode 32c and the cathode 33c (S305).

Next, the control unit 305c executes air purge with dry air against the anode 32c and the cathode 33c (S306). By carrying out the air purge against the anode 32c and the cathode 33c in this way, it is possible to avoid the event that oxygen and hydrogen react with each other to render the inner pressure of the fuel cell stack 301c negative.

How the threshold value should be set up will be described below. As described previously, by controlling the potential of the cathode 33c within the range of from 0.6 V to 0.8 V against SHE, it is possible to avoid the degradation of Pt of the cathode 33c. Accordingly, it is preferable that a period of time of controlling the potential of the cathode 33c is as long as possible.

However, since the potential of the cathode 33c is controlled by the external electric source 307c, the longer the time period of controlling the potential of the cathode 33c, the larger the energy loss is.

Also, although the cell temperature of the fuel cell stack 301c becomes low corresponding to the time period of controlling the potential of the cathode 33c, the anode 31c is more likely poisoned with a trace amount of carbon monoxide contained in the fuel gas with a reduction in the cell temperature of the fuel cell stack 301c.

Then, in the case of the fuel cell system of this embodiment, the threshold value is set up at 50° C.; the cathode 33c is controlled so as to have a potential within a definite range during a period of time until the cell temperature of the fuel cell stack 301c drops to 50° C. after the fuel cell stack 301c stops the power generation; and thereafter, such control is stopped, and air purge is executed against the anode 32c and the cathode 33c. In this way, it is possible to avoid degradation of the fuel cell stack 301c while suppressing an energy loss due to the external electric source 307c.

EXAMPLE 20

The following evaluation test was carried out using the fuel cell stack 301c prepared in the same manner as in the case of Example 19.

First of all, the fuel gas control unit 302c fed a fuel gas obtained by modifying a 13A gas as a raw material gas by a modifier into the anode 32c, and the oxidizing agent gas control unit 303c fed air as an oxidizing agent gas into the cathode 33c. And a discharge test was carried out under the condition that the cell temperature of the fuel cell stack 301c was 70° C., the fuel gas utilization factor (Uf) was 75%, and the air utilization factor (Uo) was 40%. Incidentally, the fuel gas and air were moistened so as to have a dew point of 65° C. and 70° C., respectively.

In the state in which air and the fuel gas were continuously fed, by repeating the state that the fuel cell stack 301c caused power generation at a continuous load with a current density of 200 mA/cm$^2$ and the non-power generation state, a voltage of each cell 31c of the fuel cell stack 301c before and after start and stop of the power generation was measured.

Figure 32:
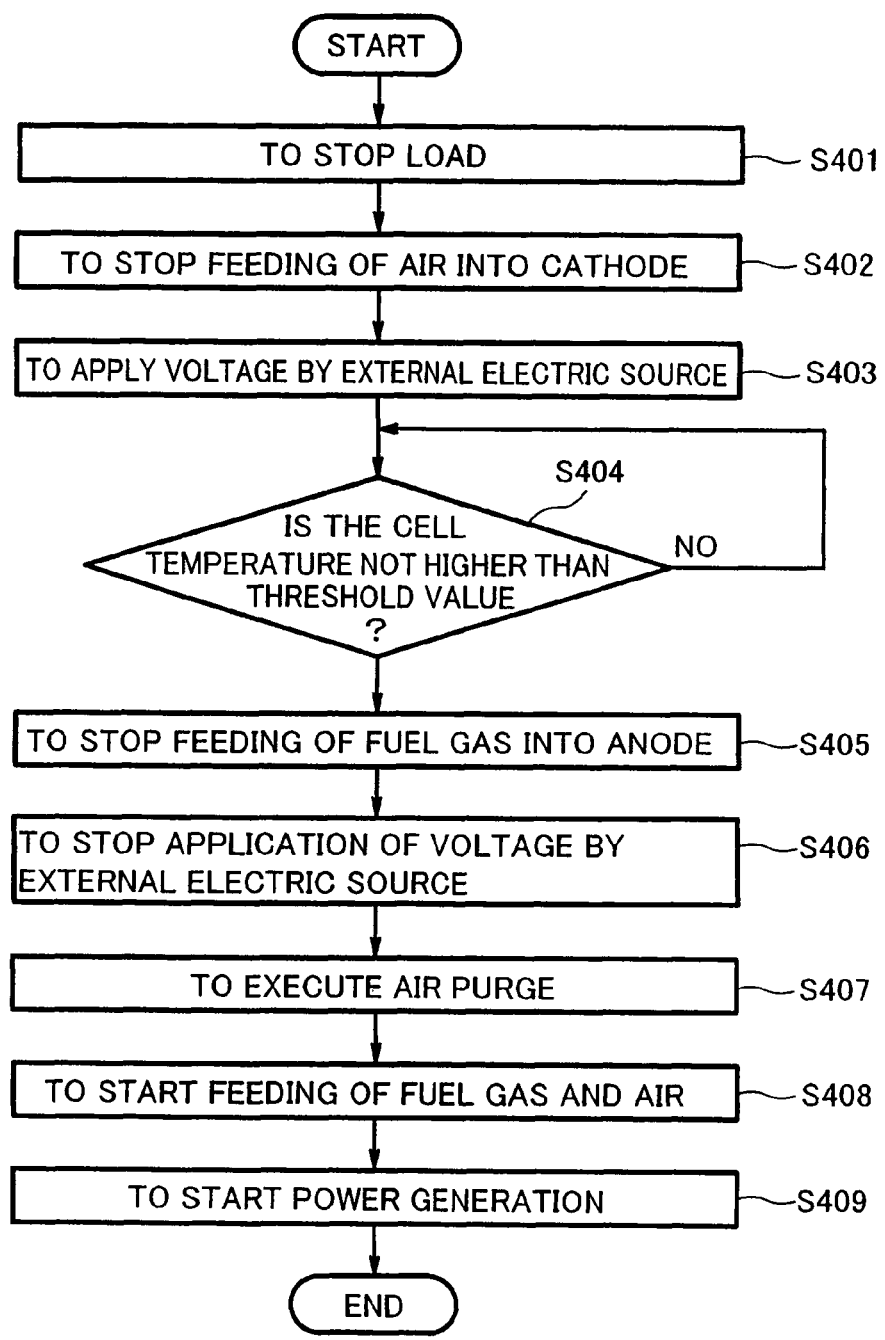
FIG. 32 is a flow chart to show the flow of operation of a fuel cell system in the evaluation test of Embodiment 2.

FIG. 32 is a flow chart to show the flow of operation of the fuel cell system in the evaluation test of Example 19. First all, the fuel cell stack 301c was made to cause power generation, an electric power was fed against the load 306c for one hour, and the load 306c was then stopped (S401). Next, the control unit 305 controlled the motions of the oxidizing agent gas control unit 303c so as to stop feeding of air into the cathode 33c of each cell 31c (S402). At this time, feeding of the fuel gas into the anode 32c was continued.

Next, a prescribed voltage was applied between the anode 32 and the cathode 33c of each cell 31c using the external electric source 307c such that a potential difference between the anode 32c and the cathode 33c became a prescribed value (S403). In this way, the state in which the potential difference between the anode 32c and the cathode 33c became a prescribed value was continued.

Next, the control unit 305c judged whether or not the cell temperature of the fuel cell stack 301c was below the prescribed threshold value on a basis of a signal output from the temperature sensor 401c (S404), and the step S404 was repeatedly executed until the cell temperature of the fuel cell stack 301c was judged to be below the prescribed threshold value (YES in S404).

In the case where the cell temperature of the fuel cell stack 301c was judged to be below the prescribed threshold value (YES in S404), the control unit 305c controlled the motions of the fuel gas control unit 302c so as to stop feeding of the fuel gas into the anode 32c (S405) and controlled the motions of the external electric source 307c so as to stop application of a voltage between the anode 32c and the cathode 33c (S406). Thereafter, air purge with dry air was executed for 30 c minutes against the anode 32c and the cathode 33c (S407).

Next, the control unit 305c controlled the motions of the fuel gas control unit 302c and the oxidizing agent gas control unit 303 so as to feed a fuel gas into the anode 32 and feed air into the cathode 33c, respectively, making the fuel cell stack 301c start power generation (S409).

The foregoing steps of from S401 to S408 were repeated 200 times while setting the threshold value at 30° C., 40° C., 50° C., 60° C., and 70° C., respectively in the foregoing step S404. Here, similarly to the case of Example 19, the voltage of cell 31c was measured 30 minutes after the fuel cell stack 301c started power generation. As a result, the relationship between the threshold value and the voltage deterioration factor is shown in Table 2.

TABLE 2

| | Threshold value (° C.) | | | | |
|---|---|---|---|---|---|
| | 30 | 40 | 50 | 60 | 70 |
| Voltage deterioration factor (μV/time) | 8 | 13 | 20 | 63 | 140 |

As shown in Table 2, the lower the threshold value is, the lower the voltage deterioration factor is. However, as described previously, the lower the threshold value is, the larger the energy loss by the external electric source 307c is. Accordingly, by setting up the threshold value at 50° C. as in this embodiment, it is possible to avoid degradation of the fuel cell stack 301c while suppressing the energy loss by the external electric source 307c.

EXAMPLE 21

In Example 21, the air purge with dry air is executed against the anode 32c and the cathode 33c. In Example 21, for the sake of comparing the case of executing the air purge with moistened air against the anode 32c and the cathode 33c with the case of executing it with dry air, the following evaluation test was carried out.

Similarly to the case of Example 20, after stopping the load 306c and stopping feeding of air into the cathode 33c of each cell 31c, a prescribed voltage was applied between the anode 32c and the cathode 33c of each cell 31c using the external electric source 307c such that a potential difference between the anode 32c and the cathode 33c became a prescribed value.

In this way, the state that the potential difference between the anode 32*c* and the cathode 33*c* became a prescribed value was continued.

And when the cell temperature of the fuel cell stack 301*c* droped to 40° C., feeding of the fuel gas into the anode 32*c* and application of a voltage between the anode 32*c* and the cathode 33*c* were stopped. Next, air purge with moistened air and dry air was executed against the anode 32*c* and the cathode 33*c*, followed by standing for 120 hours. Thereafter, a cycle of restarting of the fuel cell stack 301*c* to start power generation and measuring the voltage of the cell 31*c* was repeated 10 times.

The results of the evaluation test are shown in Table 3.

TABLE 3

|  | Dry air | Moistened air |
|---|---|---|
| Voltage deterioration factor ($\mu$V/time) | 7 | 23 |

As shown in Table 3, in the case of executing the air purge with dry air, the voltage deterioration factor was low as compared with the case of executing the air purge with moistened air. It is considered that this is caused by the matter that in the case of executing the air purge with dry air, the moisture in the catalyst layer of each of the anode 32*c* and the cathode 33*c* is low, resulting in suppressing the oxidation reaction of Pt.

It is understood from the foregoing results that in this embodiment, when the air purge is carried out against the anode 32*c* and the cathode 33*c*, it is desired to use dry air rather than moistened air.

In the operation method of a fuel cell system and the fuel cell system according to the invention, even in the case where the fuel cell repeats the power generation state and the non-power generation state, it is possible to avoid degradation of the fuel cell. Accordingly, the invention is especially useful for automobile fuel cell systems in which start and stop is frequently carried out and fuel cell systems in which start and stop is carried out every day.

In this disclosure there is described only the preferred embodiments of the invention and but a few examples of its versatility. It is to be understood that the invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances and procedures described herein. Such equivalents are considered to be within the scope of this invention, and are covered by the following claims.

What is claimed is:

1. A method for operating a fuel cell comprising an electrolyte, an anode and a cathode sandwiching the electrolyte, and one pair of separator plates each having a gas flow path for feeding and discharging a fuel gas to the anode and for feeding and discharging an oxygen-containing gas to the cathode, the method comprising the steps of carrying out a restoring operation including:
(A) operating the fuel cell while feeding the oxygen-containing gas to the cathode,
(B) terminating feeding of the oxygen-containing gas to the cathode, and
(C) feeding a hydrocarbon gas that is a city gas desulfurized with a desulfurizer, a propane gas or a butane gas to the cathode instead of the oxygen-containing gas which has been fed to the cathode, to decrease a potential of the cathode after terminating feeding of the oxygen-containing gas to the cathode.

\* \* \* \* \*